United States Patent
Collins et al.

(10) Patent No.: US 9,756,014 B2
(45) Date of Patent: Sep. 5, 2017

(54) SYSTEM AND METHOD FOR RESPONDING TO AGGRESSIVE BEHAVIOR ASSOCIATED WITH WIRELESS DEVICES

(71) Applicant: Jasper Technologies, Inc., Santa Clara, CA (US)

(72) Inventors: Daniel Collins, McKinney, TX (US); Jack McGwire, Sunnyvale, CA (US); Rakesh Kumar, Sunnyvale, CA (US); Terrence Poon, Fremont, CA (US); Scott Potter, Los Gatos, CA (US); Andrew Privett, Norfolk (GB); Dusko Zgonjanin, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/881,641

(22) Filed: Oct. 13, 2015

(65) Prior Publication Data
US 2016/0036779 A1     Feb. 4, 2016

Related U.S. Application Data

(63) Continuation of application No. 14/706,782, filed on May 7, 2015, now Pat. No. 9,166,950, which is a
(Continued)

(51) Int. Cl.
*H04W 4/00*     (2009.01)
*H04L 29/06*    (2006.01)
(Continued)

(52) U.S. Cl.
CPC .... *H04L 63/0227* (2013.01); *G06F 17/30876* (2013.01); *H04L 43/00* (2013.01);
(Continued)

(58) Field of Classification Search
CPC ..... H04L 41/0631; H04L 43/06; H04L 43/10; H04L 41/0677; G01R 31/08; H04W 12/08; H04W 24/02
(Continued)

(56) References Cited

U.S. PATENT DOCUMENTS 5,353,340 A   10/1994  Kunz
5,379,423 A    1/1995  Mutoh et al.
(Continued)

FOREIGN PATENT DOCUMENTS

EP      1229751 A1   8/2002
EP      1392077 A1   2/2004
(Continued)

OTHER PUBLICATIONS

3GPP TS 03.20 V9.0.0 (Jan. 2000) 3rd Generation Partnership Project: Digital Cellular Telecommunication System (Phase 2+) Security related network functions (Release 2000).
(Continued)

*Primary Examiner* — Mounir Moutaouakil
(74) *Attorney, Agent, or Firm* — Ronald S. Fernando

(57) ABSTRACT

An embodiment of the invention describes a wireless device comprising a Subscriber Identity Module (SIM) further comprising a memory for storing program code for performing a plurality of operations, and a processor for processing the program code to execute the plurality of operations, the operations including receiving over-the-air instructions via a wireless network from a control center to create a rules set in the SIM, wherein the rules set defines an acceptable behavior of the wireless device, monitoring requests from a wireless modem of the wireless device for access files stored in the SIM, detecting an aggressive behavior of the wireless device based on the rules set, and blocking the wireless modem from generating traffic in the wireless network.

12 Claims, 36 Drawing Sheets

Related U.S. Application Data continuation of application No. 14/604,450, filed on Jan. 23, 2015, now Pat. No. 9,100,851, which is a continuation of application No. 14/320,319, filed on Jun. 30, 2014, now Pat. No. 8,942,181, which is a continuation of application No. 14/189,847, filed on Feb. 25, 2014, now Pat. No. 8,767,630, which is a continuation of application No. 13/948,916, filed on Jul. 23, 2013, now Pat. No. 9,167,471, which is a continuation-in-part of application No. 13/766,622, filed on Feb. 13, 2013, now Pat. No. 8,565,101, which is a continuation of application No. 12/387,962, filed on May 7, 2009, now Pat. No. 8,391,161, said application No. 13/948,916 is a continuation-in-part of application No. 13/544,497, filed on Jul. 9, 2012, now Pat. No. 8,837,370, and a continuation-in-part of application No. 13/670,191, filed on Nov. 6, 2012, now Pat. No. 8,531,972, which is a continuation of application No. 12/652,694, filed on Jan. 5, 2010, now Pat. No. 8,325,614.

(60) Provisional application No. 61/746,468, filed on Dec. 27, 2012, provisional application No. 61/505,951, filed on Jul. 8, 2011.

(51) Int. Cl.

| | | |
|---|---|---|
| *H04W 12/08* | (2009.01) | |
| *H04W 12/06* | (2009.01) | |
| *H04W 28/02* | (2009.01) | |
| *H04L 12/26* | (2006.01) | |
| *H04L 29/08* | (2006.01) | |
| *H04W 24/08* | (2009.01) | |
| *H04W 8/18* | (2009.01) | |
| *H04W 48/06* | (2009.01) | |
| *G06F 17/30* | (2006.01) | |
| *H04W 12/12* | (2009.01) | |

(52) U.S. Cl.
CPC ............ *H04L 43/16* (2013.01); *H04L 63/10* (2013.01); *H04L 67/10* (2013.01); *H04L 67/22* (2013.01); *H04W 4/001* (2013.01); *H04W 8/183* (2013.01); *H04W 12/06* (2013.01); *H04W 12/08* (2013.01); *H04W 12/12* (2013.01); *H04W 24/08* (2013.01); *H04W 28/0215* (2013.01); *H04W 48/06* (2013.01)

(58) Field of Classification Search
USPC ........ 370/242, 263, 332, 351, 352; 715/700; 455/405, 406, 414.02; 379/114.17, 32.04
See application file for complete search history.

(56) References Cited

U.S. PATENT DOCUMENTS

| | | |
|---|---|---|
| 5,495,521 A * | 2/1996 | Rangachar ............... H04M 3/36 379/145 |
| 5,495,524 A | 2/1996 | Gunell |
| 5,627,886 A | 5/1997 | Bowman |
| 5,633,857 A | 5/1997 | Kim |
| 5,706,338 A | 1/1998 | Relyea et al. |
| 5,734,699 A | 3/1998 | Lu et al. |
| 5,757,895 A | 5/1998 | Aridas et al. |
| 5,802,145 A | 9/1998 | Farris et al. |
| 5,854,982 A | 12/1998 | Chambers et al. |
| 5,943,619 A | 8/1999 | Coyne et al. |
| 5,946,379 A | 8/1999 | Bhusri |
| 6,124,799 A | 9/2000 | Parker |
| 6,393,113 B1 | 5/2002 | Karras |
| 6,584,310 B1 | 6/2003 | Berenzweig |
| 6,662,017 B2 | 12/2003 | McCann et al. |
| 6,711,127 B1 | 3/2004 | Gorman et al. |
| 6,760,421 B2 | 7/2004 | Heilmann et al. |
| 6,956,820 B2 | 10/2005 | Zhu et al. |
| 6,999,480 B2 | 2/2006 | Subrahmanyan et al. |
| 7,027,813 B2 | 4/2006 | Hicks et al. |
| 7,103,805 B2 | 9/2006 | Belschner |
| 7,155,206 B2 | 12/2006 | Allison et al. |
| 7,184,768 B2 | 2/2007 | Hind et al. |
| 7,190,969 B1 | 3/2007 | Oh et al. |
| 7,266,371 B1 | 9/2007 | Amin et al. |
| 7,274,933 B2 | 9/2007 | Zinn et al. |
| 7,342,906 B1 | 3/2008 | Calhoun |
| 7,366,510 B2 | 4/2008 | Gunaratnam et al. |
| 7,369,528 B2 | 5/2008 | Tian |
| 7,395,083 B2 | 7/2008 | Buckley |
| 7,483,694 B2 | 1/2009 | Varanda |
| 7,522,996 B2 | 4/2009 | Jung et al. |
| 7,610,045 B2 | 10/2009 | Little et al. |
| 7,620,162 B2 | 11/2009 | Aaron et al. |
| 7,624,267 B2 | 11/2009 | Huang |
| 7,668,573 B2 | 2/2010 | Laroia et al. |
| 7,860,648 B2 | 12/2010 | Jung et al. |
| 7,885,636 B2 | 2/2011 | Taglienti et al. |
| 7,987,449 B1 | 7/2011 | Marolia et al. |
| 8,000,715 B2 | 8/2011 | Melpignano et al. |
| 8,018,955 B2 | 9/2011 | Agarwal et al. |
| 8,023,425 B2 | 9/2011 | Raleigh |
| 8,036,664 B2 | 10/2011 | Khetawat et al. |
| 8,086,254 B2 | 12/2011 | Silver et al. |
| 8,099,078 B2 | 1/2012 | Lazaridis |
| 8,107,953 B2 | 1/2012 | Zimmerman et al. |
| 8,122,062 B2 | 2/2012 | Brendle et al. |
| 8,214,536 B2 | 7/2012 | Zhao |
| 8,229,812 B2 | 7/2012 | Raleigh |
| 8,250,207 B2 | 8/2012 | Raleigh |
| 8,264,687 B2 | 9/2012 | Lundquist et al. |
| 8,295,817 B2 | 10/2012 | Alfano et al. |
| 8,306,534 B2 | 11/2012 | Vach et al. |
| 8,346,225 B2 * | 1/2013 | Raleigh ............... H04L 41/0806 370/230 |
| 8,351,898 B2 | 1/2013 | Raleigh |
| 8,355,337 B2 | 1/2013 | Raleigh |
| 8,379,531 B2 | 2/2013 | Farris et al. |
| 8,391,834 B2 | 3/2013 | Raleigh |
| 8,407,769 B2 | 3/2013 | Salmela et al. |
| 8,411,604 B2 | 4/2013 | Reif |
| 8,522,344 B2 * | 8/2013 | Ormazabal ........... H04L 63/107 726/22 |
| 8,613,040 B2 | 12/2013 | Barile |
| 8,725,123 B2 | 5/2014 | Raleigh |
| 8,937,910 B2 | 1/2015 | Mohammed et al. |
| 9,026,127 B2 | 5/2015 | Ngai |
| 2001/0030957 A1 | 10/2001 | McCann et al. |
| 2002/0154632 A1 | 10/2002 | Wang et al. |
| 2002/0197991 A1 | 12/2002 | Anvekar et al. |
| 2003/0022689 A1 | 1/2003 | McElwain et al. |
| 2003/0027581 A1 | 2/2003 | Jokinen et al. |
| 2003/0037755 A1 | 2/2003 | Nomura |
| 2003/0041131 A1 | 2/2003 | Westerinen et al. |
| 2003/0064723 A1 | 4/2003 | Thakker |
| 2003/0083078 A1 | 5/2003 | Allison et al. |
| 2003/0086425 A1 | 5/2003 | Bearden et al. |
| 2003/0157935 A1 | 8/2003 | Kauhanen |
| 2003/0228008 A1 | 12/2003 | Betts et al. |
| 2004/0043752 A1 | 3/2004 | Matsumura |
| 2004/0049394 A1 | 3/2004 | Burger et al. |
| 2004/0097230 A1 | 5/2004 | Natarajan et al. |
| 2004/0113929 A1 | 6/2004 | Matsuzaki |
| 2004/0133806 A1 | 7/2004 | Joong et al. |
| 2004/0203744 A1 | 10/2004 | Hicks et al. |
| 2004/0260752 A1 | 12/2004 | Chundra et al. |
| 2005/0020243 A1 | 1/2005 | Benco et al. |
| 2005/0037755 A1 | 2/2005 | Hind et al. |
| 2005/0060250 A1 | 3/2005 | Heller et al. |
| 2005/0075106 A1 | 4/2005 | Jiang |
| 2005/0079863 A1 | 4/2005 | Macaluso |
| 2005/0097595 A1 | 5/2005 | Lipsanen et al. |
| 2005/0113088 A1 | 5/2005 | Zinn et al. |

(56) References Cited

U.S. PATENT DOCUMENTS

| | | |
|---|---|---|
| 2005/0185777 A1 | 8/2005 | Russell et al. |
| 2005/0233733 A1 | 10/2005 | Roundtree et al. |
| 2005/0266825 A1 | 12/2005 | Clayton |
| 2006/0019647 A1 | 1/2006 | Muhonen et al. |
| 2006/0030315 A1 | 2/2006 | Smith et al. |
| 2006/0035631 A1 | 2/2006 | White et al. |
| 2006/0173976 A1 | 8/2006 | Vincent et al. |
| 2006/0203739 A1 | 9/2006 | Padmanabhan et al. |
| 2006/0205434 A1 | 9/2006 | Tom et al. |
| 2007/0026861 A1 | 2/2007 | Kuhn et al. |
| 2007/0133602 A1* | 6/2007 | Russell ............. H04L 12/585 370/467 |
| 2007/0245238 A1 | 10/2007 | Fugitt et al. |
| 2007/0268361 A1 | 11/2007 | Ren |
| 2007/0268631 A1 | 11/2007 | Guo et al. |
| 2008/0052393 A1* | 2/2008 | McNaughton ......... H04L 12/66 709/224 |
| 2008/0076419 A1 | 3/2008 | Khetawat et al. |
| 2008/0084993 A1 | 4/2008 | Peddireddy et al. |
| 2008/0096550 A1 | 4/2008 | Mandelin |
| 2008/0260149 A1 | 10/2008 | Gehrmann |
| 2009/0029684 A1 | 1/2009 | Rosenblatt et al. |
| 2009/0055736 A1 | 2/2009 | Yoon |
| 2009/0061839 A1 | 3/2009 | Zimmerman et al. |
| 2009/0075646 A1 | 3/2009 | Lohlein et al. |
| 2009/0098867 A1 | 4/2009 | Varanda |
| 2009/0150218 A1 | 6/2009 | Brunner et al. |
| 2009/0168660 A1 | 7/2009 | Bhatia et al. |
| 2009/0170528 A1 | 7/2009 | Bull et al. |
| 2009/0191857 A1 | 7/2009 | Horn et al. |
| 2009/0260078 A1 | 10/2009 | Nakazawa |
| 2009/0325543 A1 | 12/2009 | Dubois et al. |
| 2010/0010922 A1 | 1/2010 | Foottit et al. |
| 2010/0056114 A1 | 3/2010 | Roundtree et al. |
| 2010/0125495 A1 | 5/2010 | Smith et al. |
| 2010/0159902 A1 | 6/2010 | Roundtree et al. |
| 2010/0192062 A1 | 7/2010 | Anwar |
| 2010/0248690 A1 | 9/2010 | Biggs et al. |
| 2010/0273456 A1 | 10/2010 | Wolovitz et al. |
| 2010/0278056 A1 | 11/2010 | Meloche et al. |
| 2010/0332072 A1 | 12/2010 | Ishiko et al. |
| 2011/0014939 A1 | 1/2011 | Ravishankar et al. |
| 2012/0004974 A1 | 1/2012 | Burger et al. |
| 2012/0028620 A1 | 2/2012 | Roundtree et al. |
| 2012/0101952 A1 | 4/2012 | Raleigh et al. |
| 2016/0344604 A1* | 11/2016 | Raleigh ............... H04L 43/0876 |

FOREIGN PATENT DOCUMENTS

| | | |
|---|---|---|
| EP | 1672945 A1 | 6/2006 |
| FR | 2970161 A1 | 8/2000 |
| FR | 2814029 A1 | 3/2002 |
| GB | 2389745 A1 | 12/2003 |
| WO | 0070900 A1 | 11/2000 |
| WO | 0137602 A1 | 5/2001 |
| WO | 0221872 A1 | 3/2002 |
| WO | 02067563 A1 | 8/2002 |

OTHER PUBLICATIONS

ETSI TS 100 922 V7.1.1 (Jul. 1999) Digital Cellular Telecommunication Systems (Phase 2+); Subscriber Identity Modules (SIM) (GSM 02.17 version 7.1.1 Release 1998).

Extended European search report from corresponding EP application No. 13866744.9 dated Mar. 30, 2016.

\* cited by examiner

| | Time | Event Type | Device | Network Element | Comments |
|---|---|---|---|---|---|
| 1510 | 12:30PM on JAN 1, 1901 | A | 1 | D | |
| 1512 | 12:45PM on JAN 1, 1901 | B | 1 | E | |
| 1514 | 12:50PM on JAN 1, 1901 | A | 2 | E | |

Columns: 1500, 1502, 1504, 1506, 1508

FIG. 15B

SYSTEM AND METHOD FOR RESPONDING TO AGGRESSIVE BEHAVIOR ASSOCIATED WITH WIRELESS DEVICES

CROSS-REFERENCE TO RELATED APPLICATIONS

The present application is a continuation of U.S. patent application Ser. No. 14/706,782 filed on May 7, 2015 which is a continuation of U.S. patent application Ser. No. 14/604,450 filed on Jan. 23, 2015 and issued as U.S. Pat. No. 9,100,851 on Aug. 4, 2015, which is a continuation of U.S. patent application Ser. No. 14/320,319 filed on Jun. 30, 2014 and issued as U.S. Pat. No. 8,942,181 on Jan. 27, 2015, which is a continuation of U.S. patent application Ser. No. 14/189,847 filed Feb. 25, 2014 and issued as U.S. Pat. No. 8,767,630 on Jun. 26, 2014, which is a continuation of U.S. patent application Ser. No. 13/948,916 filed Jul. 23, 2013, which claims the benefit of priority for prior U.S. Provisional Patent Application No. 61/746,468, filed on Dec. 27, 2012. U.S. patent application Ser. No. 13/948,916 is a continuation-in-part of U.S. patent application Ser. No. 13/766,622 filed on Feb. 13, 2013 and issued as U.S. Pat. No. 8,565,101 on Oct. 22, 2013, which is a continuation of U.S. patent application Ser. No. 12/387,962 filed on May 7, 2009 and issued as U.S. Pat. No. 8,391,161 on Mar. 5, 2013. U.S. patent application Ser. No. 13/948,916 is also a continuation-in-part of U.S. patent application Ser. No. 13/544,497 filed on Jul. 9, 2012 and issued as U.S. Pat. No. 8,837,370 on Sep. 16, 2014, which is the non-provisional filing of 61/505,951 filed Jul. 8, 2011. U.S. patent application Ser. No. 13/948,916 is also a continuation-in-part of U.S. patent application Ser. No. 13/670,191 filed on Nov. 6, 2012 issued as U.S. Pat. No. 8,531,972 on Sep. 10, 2013 which is a continuation of U.S. patent application Ser. No. 12/652,694 filed on Jan. 5, 2010 issued as U.S. Pat. No. 8,325,614 on Dec. 4, 2012.

FIELD OF THE INVENTION

Embodiments of the invention relate to services provided to consumers and operators of wireless networks.

BACKGROUND

The deployment of wireless networks is a very expensive proposition. There is a direct correlation between economics and network planning. One cannot have wireless networks of infinite capacity and bandwidth. Wireless networks are designed for the pre-determined capacity and performance depending upon many factors such as geography, economics, demography, etc. All wireless networks have planned redundant or idle capacity in advance to counter any bursts or unprecedented traffic. This planning allows the operator to meet sudden demand without impacting the user experience. Alongside, many network nodes can be running licensed software which is directly proportional to planned network capacity and performance. In a nutshell, wireless network resources are planned based upon expected device behavior patterns.

If a wireless network observes step changes in utilization of network nodes by a handful of rogue or aggressive devices, negative network performance may manifest itself in various forms, such as service degradation, performance impact, network nodes running over planned capacity, service outage, etc. An example of such a rogue device is an aggressive mobile device. A mobile device shows aggressive behaviors when it is constantly trying to connect to a wireless network even though its service requests are repeatedly denied by the wireless network. A wireless network can deny or may be unable to cater to the service requests due to any number of valid or invalid reasons. For example, the wireless network may be under maintenance, the user of the mobile device has not paid the bill, certain network nodes in the wireless network are overwhelmed with service requests, the user has not subscribed for a particular service that he is trying to access, etc.

Instead of looking into the reasons for service denial, an aggressive mobile device may act unintelligently by perpetually retrying to connect. Such device behavior consumes excessive power in the mobile device, can cause an excessive signaling load on the wireless network, degrade the capacity and performance of the wireless network, and cause service outages. Aggressive behaviors can trigger a chain reaction among the network nodes in wireless networks. As a result, certain network services may be degraded or even fail. Restoring the network services is a challenging and daunting task.

Aggressive behavior may be caused by any mobile device (e.g., smartphone, Machine-to-Machine (M2M) device, etc.), including any hardware/software/firmware modules in the mobile device; e.g., a wireless modem, application and modem/modules driver script. For example, an M2M device may generally be considered a black box, which may be programmed once to run forever and does not require user intervention for its operation. It has been observed that a certain portion of M2M devices are implemented with a very aggressive service acquisition retry mechanism, which may result in network abusive behavior. With continuous, repetitive attempts to acquire specific service, these devices are occupying and wasting a large portion of network resources of the serving networks and the backend infrastructure.

BRIEF DESCRIPTION OF THE DRAWINGS

The present invention is illustrated by way of example and not limitation in the figures of the accompanying drawings, in which like references indicate similar elements and in which:

FIG. 15B is a diagram illustrating an embodiment of a table of communication data stream information.

DETAILED DESCRIPTION

Figure 1A:
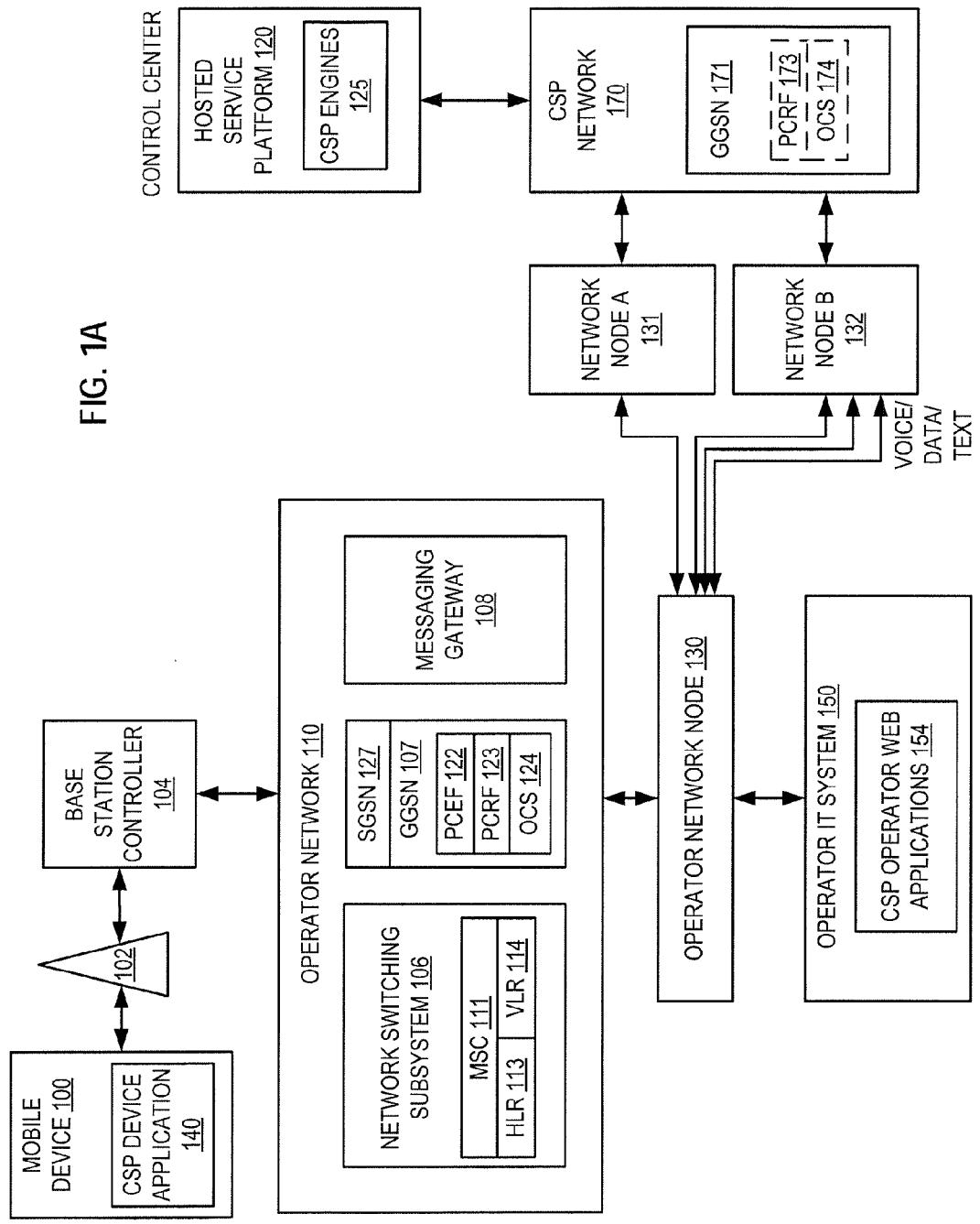
FIG. 1A is a block diagram of one embodiment of network architecture in which a mobile device may operate.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The system and method described herein provide an immediate global solution for the aggressive behavior problems caused by mobile/wireless devices. In one embodiment, a cloud based control center (CC) utilizes software agents strategically placed within a Subscriber Identity Module (SIM) to monitor and/or control aggressive behavior of a mobile/wireless device. In an alternative embodiment, software agents may be strategically placed at Signal Transfer Points (STP) to monitor and/or control aggressive behavior of mobile devices. An example of an STP includes a Cisco IP Transfer Point (ITP). The Cisco IP Transfer Point (ITP) is a product for transporting Signaling System 7 (SS7) traffic over IP (SS7oIP) networks. The software agent at an STP monitors the SS7 traffic on a per device basis based on, for example, device International Mobile Subscriber Identity (IMSI) number. In yet another embodiment, the aggressive behavior of mobile devices can be detected and managed by the control center (e.g., the control center 280 of FIG. 1B and FIG. 2) which maintains 24/7 running records of device behavior in log files.

In either of the first two embodiments, the SIM software agent or the STP software agent (collectively referred to as a "software agent") reports aggressive behavior to the cloud based control center server.

In one embodiment, the software agent is able to compare known signature behavior of a mobile device to current data traffic patterns (per IMSI) to determine if the mobile device is acting aggressively. The signature behavior or patterns may be developed using a fully automated self-certification process that is tailored to each type/category of a wide range of mobile devices (including smartphones, M2M devices, etc.). The known device signatures are then compared to current data traffic patterns (per IMSI) utilizing a sliding window concept, taking into account the most recent data transmissions and expected future data transmissions.

In one embodiment, after the software agent determines that a mobile device may be acting aggressively, the software agent communicates with the control center and control center diagnostic processors diagnose and determine a proper course of action to mitigate the effects of the aggressive behavior. The control center then implements a solution by actively controlling various network nodes/elements, STP, Home Location Register (HLR), GPRS Support Node (GGSN), RADIUS, Short Message Service Center (SMSC), etc., or the aggressive mobile device itself if needed.

In one embodiment, if the control center diagnostic processors determine that the aggressive device must be controlled directly, the control center can send over-the-air (OTA) instructions to a SIM applet operating on the aggressive device to actively modify the aggressive behavior. Alternatively, the control center can send over-the-air (OTA) instructions to the STP software agent to actively modify the aggressive behavior transmissions emanating from the aggressive device.

Aggressive behaviors of mobile devices impact at least two broad areas of an operator's network: (1) GSM/SS7 signaling and (2) IP capacity/IP plane. Typically, the GSM/SS7 signaling impact is due to one or more of the following factors: purged or retired SIMs (e.g., SIMs removed from the HLR database), frequent power cycling of mobile devices (or SIMs) including M2M devices, the SIM is in a location in which it is barred for service, chatty devices (e.g., smartphone applications request for radio resources asynchronously), jail-broken devices (e.g., a mobile device unlocked without operator's authorization, a mobile device that runs uncertified applications, etc.), and application specific behaviors.

Any of the above factors may cause an excessive number of SAI (Send Authentication Information) Requests from the Mobile Switching Center (MSC) to the HLR, Location Update (LU)/Triplet Requests, and/or other types of network traffic. The areas of impact with respect to the GSM/SS7 signaling include HLR capacity and licensing, STP capacity, SS7 cost, and other areas of the network system. For example, HLR licensing is based on volume of active devices per day. If a mobile device with a purged SIM still tries to attach to the network and consumes capacity of the network node, this mobile device will be counted as one active device for the purpose of HLR licensing even though the mobile device cannot function properly with the purged SIM.

With respect to the impact on IP capacity/IP plane, the cause of such impact may include one or more of the following factors: wrong Access Point Name (APN), Domain Name Server (DNS) issues (APN context-resolve APN), no traffic (e.g., device data does not reach the destination server due to IP routing issues in the Internet), frequent tearing down of a session at the device level (e.g., miscalculated device behavior to save battery life, or medical devices that try to conserve radio capacity, GGSN licensed for a given number of active sessions, etc.), frequent tearing down of accounting record by GGSN or RADIUS. The areas of impact with respect to the IP capacity/IP plane include: an excessive number of allowed Packet Data Protocol (PDP) context, an excessive number of denied PDP context, backlog in processing of billing records due to capacity constraints, and other areas of the network system.

The following description provides the details of a system and method for detecting and resolving aggressive behaviors of mobile devices. The mobile device described herein can be a cellular telephone, a smartphone with data transfer and messaging capability, a tablet computer, a personal digital assistant (PDA), a video-camera, a gaming device, a global positioning system (GPS), an e-Reader, an M2M device (i.e., an application-specific telemetry device that collects data using sensors and transmits the data to a destination such as a server over a network), a hybrid device with a combination of any of the above functionalities, or any other wireless mobile devices capable of sending and receiving voice, data and/or text messages.

FIG. 1A is a block diagram illustrating an embodiment of a wireless network system. In the embodiment shown, a mobile device 100 communicates with an operator network 110 through a base station 102 and a base station controller 104. Mobile device 100 communicates with operator network 110 using wireless protocols, such as GSM, 3GPP, (3G) UMTS, (4G) LTE, EDGE, Bluetooth, IEEE 802.11-based wireless protocols (e.g., Wi-Fi), and the like. Mobile device 100 may be used by a consumer (equivalently, a subscriber or a user). Operator network 110 is a wireless cellular network that includes a voice network (e.g., a global system for mobile communications (GSM) network), a data network (e.g., a general packet radio service (GPRS) network), and a messaging network (e.g., a short message service (SMS) network). It is understood that operator network 110 can include voice, data and messaging networks that are different from the GSM network, GPRS network and SMS network. In the embodiment shown, the voice network is represented by a network switching subsystem 106, the data network is represented by a Serving GPRS Support Node (SGSN) 127, a Gateway GPRS Support Node (GGSN) 107, and the messaging network is represented by a messaging gateway 108. It is understood that operator network 110 includes various other network components, which are omitted herein for simplicity of illustration. Operator network 110 allows a user of mobile device 100 to engage in voice, data and messaging communications with devices coupled to operator network 110 through external networks (not shown).

In one embodiment, base station 102 includes a radio transmitter and receiver for communicating with cellular devices (e.g., mobile device 100), and a communications system for communicating with base station controller 104. Base station controller 104 controls base station 102 and enables communication with operator network 110. In various embodiments, base station controller 104 can control any number of base stations.

Network switching subsystem 106 controls voice network switching, maintains a register of cellular device locations, and connects operator network 110 with an external voice network, such as a public switched telephone network, a private voice telephony network, or any other appropriate voice telephony network. In one embodiment, network switching subsystem 106 includes a mobile switching center (MSC) 111, a home location register (HLR) 113, and a visitor location register (VLR) 114. MSC 111 controls, sets up and releases a voice connection using signaling protocols such as signaling system No. 7 (SS7). In some embodiments, MSC 111 additionally tracks the time of a voice connection for the purposes of charging cellular devices, decrementing available usage, tracking monetary balance, monitoring battery status, and other purposes. In one embodiment, operator network 110 may include any number of MSCs. Each of these MSCs serves cellular devices within a network area, which may include one or more base stations and one or more base station controllers. Some of the cellular devices may be registered to use this network area as their "home network," and some of the other cellular devices may be registered to use other network areas as their home networks. HLR 113 maintains a list of cellular devices whose home network is served by MSC 111. VLR 114 maintains a list of cellular devices that have roamed into the area served by MSC 111. When a cellular device leaves its home network (e.g., the network area served by MSC 111), the VLR ("target VLR") of the network ("target network") to which the device has roamed communicates with HLR 113 in the home network of the device. When HLR 113 has confirmed to the target VLR that it can allow the device to use the target network, the device is added to the target VLR, and the MSC in the target network sets up the communication for the roaming cellular device.

SGSN 127 and GGSN 102 are two of the main components in the core data network of operator network 110. SGSN 127 is responsible for the delivery of data packets from and to the cellular devices within its geographical service area. The tasks of SGSN 127 include packet routing and transfer, mobility management (attach/detach and location management), logical link management, authentication and charging functions. GGSN 107 controls data communications switching and connects operator network 110 with an external data network, such as a local area network, a wide area network, a wired network, a wireless network, the Internet, a fiber network, a storage area network, or any other appropriate networks. In some embodiments, GGSN 107 is one of the core components in the core data network of operator network 110. Although not shown in FIG. 1A, the core data network of operator network 110 may also include various other network switching components. GGSN 107 serves as an interface between operator network 110 and external data networks, and translates data packets into the appropriate formats for the devices on each side. In the embodiment shown, GGSN 107 also performs policy and charging enforcement and control via the functionalities of: Policy and Charging Enforcement Function (PCEF) 122, Policy and Charging Rules Function (PCRF) 123 and Online Charging System (OCS) 124. PCRF 123 performs policy control and flow-based charging control. To that end, PCRF 123 authorizes Quality of Service (QoS) resources and operations, e.g., service redirection and other policy-based actions. Ultimately, PCRF 123 resembles a collection controller in that it collects the subscriber's subscription data and allows PCEF 122 to enforce the policies and the charging. OCS 124 facilitates the online charging process by collecting charging information about network resource usage concurrently with that resource usage. OCS 124 also approves authorization for the network resource usage prior to the actual commencement of that usage. The approval may be limited in terms of data volume or in terms of duration. PCEF 122 performs policy enforcement, service data flow detection, and flow-based charging functionalities. The policy control indicated by the PCRF 123 is enforced by PCEF 122. To that end, the PCEF 122 will permit the service data flow to pass through PCEF 122 only if there is a corresponding active Policy and Charging Control (PCC) rule and if OCS 124 has authorized credit for the charging key used for online charging. Ultimately, PCEF 122 ensures that service is provided with the appropriate QoS and that the subscriber is charged in accordance with the charging rate set for the subscriber.

Messaging gateway 108 provides short messages transit between cellular devices and other communication devices. Messaging gateway 108 can be a Short Message Service Center (SMSC), a multi-media messaging center (MMSC), or a network node coupled to the SMSC or MMSC. Messaging gateway 108 delivers text messages through operator network 110 to/from external networks via standard protocols such as Short Message Peer-to-Peer Protocol (SMPP) or Universal Computer Protocol (UCP).

In some embodiments, operator network 110 is coupled to a hosted service platform 120 via a Core Service Platform (CSP) network 170 and a number of network nodes. Hosted service platform 120 serves as a service management platform for wireless communication devices such as mobile device 100. Hosted service platform 120 may include multiple data centers in multiple geographical locations with each data center including multiple server computers. Hosted service platform 120 includes a number of server computers (e.g., CSP engines 122) that provide a suite of functions to automate both the sales and support processes towards wireless users. Hosted service platform and CSP network 170, as well as software hosted thereon, form a CSP system.

CSP network 170 provides connections between the data centers in the hosted service platform 120 and operator network 110. In one embodiment, CSP network 170 includes a GGSN 171 that implements PCRF 173 and OCS 174. Depending on the agreements between the operator/owner of operator network 110 and operator/owner of CSP network 170, both sets of (PCRF 123, OCS 124) and (PCRF 173, OCS 174) can be active at the same time or at different stages of service deployment. In some alternative embodiments, CSP network 170 does not implement PCRF 173 and OCS 174. Instead, host service platform 120 collects subscription data, policy and charging information from operator network 110.

The network nodes between operator network 110 and CSP network 170 are represented in FIG. 1A as operator network node 130, network node A 131 and network node B 132. These network nodes (130, 131 and 132) can include switches, routers, bridges, and other network components. There can be any number of network nodes between operator network 110 and CSP network 170. In the embodiment shown, operator network node 130 communicates with network node A 131 via an integrated connection, while it communicates with network node B 132 via three separate connections for voice, data and text messaging.

In some embodiments, an operator IT system 150 is coupled to operator network 110 via operator network node 130. Operator IT system 150 receives subscribers' data and usage from operator network 110, and provides the functions of Customer Relationship Management (CRM)/care, provisioning/order entry, billing/mediation (or payments), and reporting/data warehouse (DWH) (or business intelligence). Operator IT system 150 also provides a user interface (such as a desktop interface or a Web interface) for a system administrator to monitor and manage these functions. In one embodiment, operator IT system 150 hosts CSP operator Web applications 154. CSP operator Web applications 154 allow an operator to manage its marketing campaign, offers (equivalently, rate plans), pricing, billing and customer care in an integrated environment.

A CSP system, including hosted service platform 120, CSP network 170, and the software hosted thereon, interacts with operator network 110, operator IT system 150, and mobile device 100 in real time. Through CSP device application (CDA) 140 and CSP operator Web applications 154, the CSP system provides or enables the functions of on-device application, self-care, diagnostics, store-front, alert management, policy control, payment handling, offer management, campaign management, analytics, reporting engine, and data rating.

Although the wireless network system hereinafter is described in the context of 2/3G Global System for Mobile Communication (GSM) network technology, it is understood that other network technologies, such as Code Division Multiple Access 2000 (CDMA2000), 4G Long Term Evolution (LTE), LTE Advanced, etc., can be used to support the techniques described herein. It is also understood that embodiments of the invention can be adapted to work with future versions of the network protocols, technologies and standards as these protocols, technologies and standards develop.

The wireless network system of FIG. 1A may be deployed globally to provide services to multiple network operators. In the embodiment to be described below in connection with FIG. 1B, a control center may include and perform the functions of the hosted service platform 120 of FIG. 1A. The control center is coupled to a global platform provider network, which may include and perform the functions of the CSP network 170. The global platform provider network is further coupled to one or more operator networks operated by one or more network operators (also referred to as network carriers).

Figure 1B:
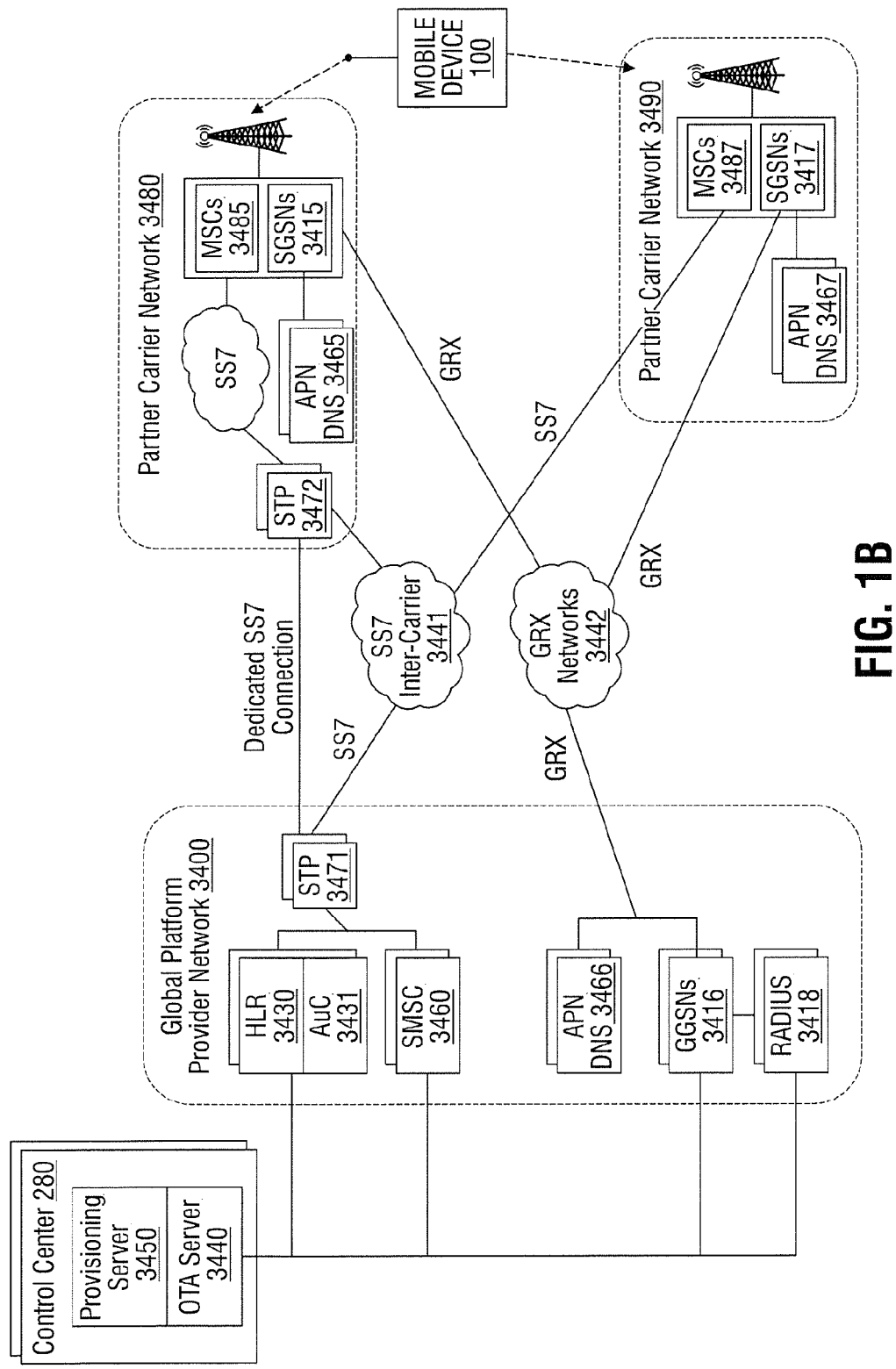
FIG. 1B is a block diagram of another embodiment of network architecture in which a mobile device may operate.

Referring to FIG. 1B, a global platform provider operates to provide network services to mobile devices (e.g., the mobile device 100 of FIG. 1A) that may roam from one partner carrier network to another partner carrier network. The global platform provider is allocated with a set of multiple subscriber identifiers, such as the international mobile subscriber identifier (IMSIs). Although IMSI is used in the following description, it is understood that other subscriber identifier types can be used instead of IMSI.

The mobile device 100 having one of these IMSIs programmed in its SIM can avoid or reduce its roaming charges in regions that are operated by network carriers partnered with the global platform provider. The mobile device 100 may incur temporary roaming charges after leaving its home network and entering a partner carrier network (e.g., partner carrier network 4480 or 4490). However, at some point in time when one or more pre-determined allocation rules are satisfied, the mobile device 100 can be provisioned with a new IMSI that is local to the partner carrier network or an IMSI that is predetermined by the global platform provider to be preferred for that visited country. With this new IMSI, the mobile device can transmit and receive wireless packets in the partner carrier network without incurring roaming charges and without having the transmissions routed through its home network.

The determination of whether the mobile device 100 can switch to a local or otherwise preferred IMSI can be made by a control center 280 based on a set of allocation rules. The control center is coupled to a global platform provider network 4400 and includes at least a provisioning server 4450 and an over-the-air (OTA) server 4440. Both the control center 280 and the global platform provider network 4400 are operated by the global platform provider.

The control center 280 and the global platform provider network 4400 can include multiple servers, multiple storage devices and multiple network nodes distributed across multiple geographical areas.

In one embodiment, the global platform provider network 4400 includes a HLR 4430 that includes one or more servers and databases for managing and storing mobile subscriber information. The mobile subscriber information includes the IMSI, the MSISDN, location information (e.g., the identity of the currently serving Visitor Location Register (VLR) to enable the routing of mobile-terminated calls) and service subscription and restrictions. The HLR 4430 is coupled to an authentication center (AuC) 4431 for performing authentication of a mobile device that requests a network connection.

The HLR 4430 is operated and updated by the global platform provider. The HLR 4430 communicates with the partner carrier networks (4480, 4490) via Signaling System 7 (SS7) messages through Signal Transfer Points (STPs) (4471, 4472), or via Internet Protocol (IP) messages through Mobility Management Entities (MMEs). The SS7/IP messages can be sent via dedicated SS7/IP connections and/or SS7/IP inter-carrier networks 4441. In some embodiments, the HLR 4430 shown herein is a logical representation. Physically, the HLR 4430 can be distributed across multiple geographical areas. In some embodiments, the HLR 4430 can include distributed segments of the HLRs owned by multiple partner carriers. Thus, in these embodiments the HLR 4430 can be the sum of multiple HLR segments, with each HLR segment owned by a different partner carrier. For example, a partner carrier may own and operate an HLR, and a segment of the HLR can be read and updated by the global platform provider. The updates performed by the global platform provider can include adding/provisioning and removing/purging IMSIs, and setting and editing subscriber wireless service permissions. The IMSIs that can be added and removed by the global platform provider are within a set of IMSIs that are allocated to the global platform provider. That is to say, the HLR 4430 stores and manages the IMSIs that belong to the set of IMSIs allocated to the global platform provider. In one embodiment, when a new IMSI is provisioned to a subscriber, the subscriber may also be changed to a new billing account owner. That is, the contractual ownership for the subscriber's wireless service may change with the provision of a new IMSI. After the provision of a new IMSI, the subscriber may receive a billing statement from a new partner carrier in addition to or instead of the original carrier.

In the embodiment of FIG. 1B, each of the partner carrier networks (4480, 4490) includes one or more MSCs (4485, 4487) and one or more SGSNs (4415, 4417). The MSCs (4485, 4487) are responsible for routing circuit-switched voice calls, fax, data and short message service (SMS). The MSCs (4485, 4487) can forward outgoing circuit-switched signals from a mobile device to a circuit-switched network (not shown), and can forward outgoing short messages to an SMS center (SMSC) 4460. The circuit-switched network and the SMSC 4460 then deliver the signals/messages to their intended destinations. In addition, the MSCs (4485, 4487) are responsible for requesting the HLR 4430/AuC 4431 to authenticate a mobile device when the mobile device requests for a network connection.

The SGSNs (4415, 4417) are responsible for routing data packets. Each SGSN (4415, 4417) is identified by an Access Point Name (APN), which can be used in a Domain Name Server (DNS) query to resolve the IP address of a GGSN (e.g., GGSN 4416) that serves the SGSN (4415, 4417). The APN resolution function is shown as the APN DNS (4465, 4467). The GGSN 4416 then delivers outgoing data packets from the mobile device 100 to their destination(s) via a packet-switched network (e.g., the Internet). Before granting access to the packet-switched network, the GGSN 4416 can use Remote Authentication Dial In User Service (RADIUS) protocol to provide Authentication, Authorization, and Accounting (AAA) management (shown as RADIUS 4418). For incoming data packets destined for the mobile device 100, the GGSN 4416 resolves the IP address of the destination SGSN using the SGSN's APN in a DNS query (shown as the APN DNS 4466). The communication between the SGSN (4415, 4417) and the GGSN 4416 can be provided by a GPRS roaming exchange (GRX) network 4442 for inter-carrier connections. In some embodiments, the communication between the SGSN (4415, 4417) and its associated GGSN can be provided by an intra-carrier connection.

In the embodiment of FIG. 1B, the HLR 4430, the SMSC 4460, the GGSNs 4416 and the RADIUS 4418 are within the global platform provider network 4400. In alternative embodiments, one or more of the HLR 4430, the SMSC 4460, the GGSNs 4416 and the RADIUS 4418 can be located within and operated by one or more of partner carrier networks (4480, 4490). Regardless of their locations and ownership, the control center 280 has access to each of the HLR 4430, the SMSC 4460, the GGSNs 4416 and the RADIUS 4418 to manage the information of the mobile subscribers, who directly or indirectly (e.g., through a partner carrier, or through a customer organization having a contract with a partner carrier or with the global platform provider) subscribes to the service of the global platform provider.

Having described the network environments in which a mobile device may operate, the following discussion describes systems and methods for detecting and handling aggressive behaviors of mobile devices according to embodiments of the invention. In order to acquire specific network services, a mobile device interacts with the wireless network infrastructure on various network events. If any of these network events is occurring in excessive numbers, the mobile device will be consuming network resources above the amounts dimensioned according to best practices, and may bring the network to resource exhaustion and cause widespread service impacts. The network nodes or resources that may be impacted by the aggressive behaviors of a mobile device include, but are not limited to: STP, HLR, GGSN, RADIUS, SMS and GRX, as well as the storage and CPU of the network processors in these network nodes.

The types of network events and event frequencies that are considered to be aggressive behaviors may depend on the purpose of the mobile device. Although some behaviors cannot be tolerated no matter what the business purpose of the mobile device is, it is noted that mobile devices aimed for different purposes are typically expected to have different behaviors. What may be considered an aggressive behavior for a mobile device with one business purpose (e.g., a smartphone) may not be aggressive for another mobile device (e.g., M2M device). Thus, the criteria or rules for detecting aggressive behaviors need to be tailored to the purpose of the mobile device. In order to determine these criteria or rules appropriate for a given type or category of a mobile device, the mobile device may need to undergo a self-certification process such that its signature behavior can be determined.

Network events triggered by aggressive behaviors may occur either while a service request is made (i.e., before the service is rendered) or after the service is granted. Those network events that occur while a service request is made include, but are not limited to: a mobile device which is GSM barred (i.e., disallowed to access the GSM service) on a network and is trying to perform GSM registration, a mobile device which is GPRS barred on a network and is trying to attach to GPRS data service, a mobile device is in a barred location of a network and is trying to perform GSM or GPRS registration, a mobile device is trying to register to a wireless network against the recommended Public Land Mobile Network (PLMN) order on its SIM, etc.

Those network events that occur after the service is granted include, but are not limited to: a mobile device that sets up and tears down a voice/data session very frequently, synchronized activities such as a large number of mobile devices programmed to generate traffic at the same or substantially the same time, a mobile device that sends bursts of mobile originated (MO) SMS messages in a short period of time, bursty Internet Protocol (IP) traffic, a mobile device application that tries to steer the traffic against a network preference, etc.

To detect the occurrence of the aggressive behavior of a mobile device, the mobile device's signature behavior may need to be qualified first. During field operation when the behavior of the mobile device deviates from the signature behavior, a trigger is generated to signal the detection of an aggressive behavior. The trigger may be generated by the mobile device, by one of the network nodes (e.g., STP) or by the control center processors/servers. In one embodiment, the signature behavior of a mobile device may be qualified by an automated self-certification process. The self-certification process is a process in which a customer runs field scenarios on his mobile device. The customer can be an end user; alternatively, the customer can be a provider of mobile devices.

To start the self-certification process, a customer logs onto a web portal provided by the control center. The customer connects his mobile device to the wireless network such that the mobile device's behavior on the wireless network can be tested. The results of the test can be visualized on the web portal.

Figure 2:
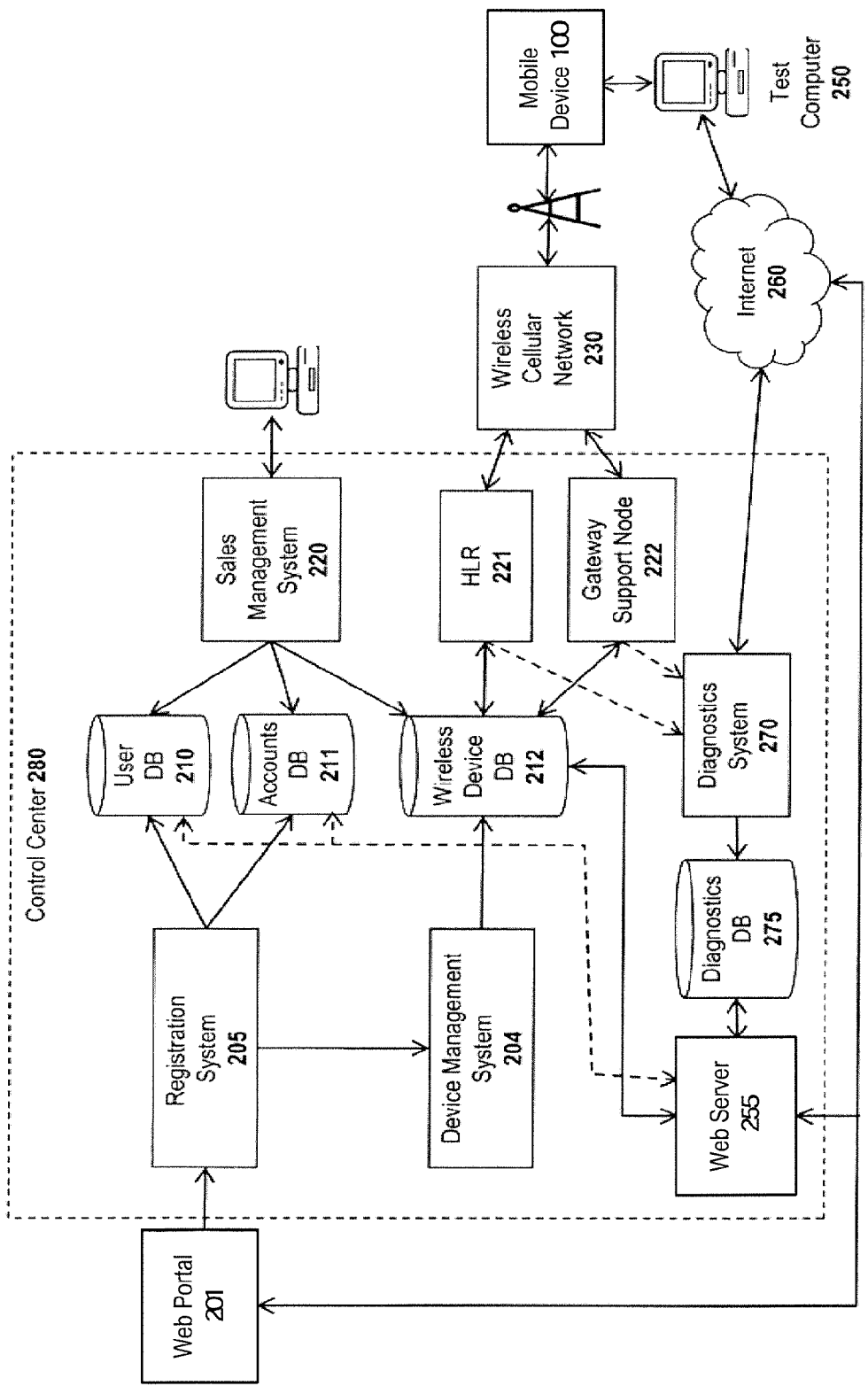
FIG. 2 is a block diagram of yet another embodiment of network architecture in which a mobile device may operate.

A system architecture for supporting the certification process according to one embodiment is illustrated in FIG. 2. In this embodiment, the control center 280 is communicatively coupled to a test computer 250 over a wireless network 230 operated by a wireless service provider. The control center 280 may also be coupled to the test computer 250 through an Internet connection 260, if one is available. This Internet connection is sometimes referred to as a "direct channel" between the test computer 250 and the control center 280. The control center 280 includes a plurality of servers for implementing the various functional modules 204, 205, 220, 221, 222, 255 and 270 illustrated in FIG. 2 (e.g., by executing program code designed to perform the various functions). The control center 280 also includes a plurality of databases 210, 211, 212 and 275 for storing data related to users and wireless devices.

In operation, a prospective wireless data customer visits a web portal 201 hosted by the web server 255, and requests a trial SIM for a mobile device under test through a web-based graphical user interface. An example of the mobile device is the mobile device 100 of FIG. 1A and FIG. 1B. Via the user interface, the customer selects a wireless module to be tested, enters contact information (e.g., user name, address, etc.), account information (for specifying a user name and password for a new user account), a referral code, payment information (e.g., credit card data), billing information, and shipping information. In one embodiment, the web portal 201 includes data verification logic to ensure that the data entered in the various data fields is in the correct data format. In addition, in one embodiment the web portal 201 includes a connection to a credit card issuer system to verify the credit card payment information entered by the customer. While various different platforms may be used to implement the web portal 201 (and other Web-based user interface features described herein), in one embodiment, the web portal 201 is provided by an Apache Tomcat web server running on Linux with software programmed in Java using an Oracle database.

Upon entering all requested information, the web portal 201 verifies the transaction and transmits the user and device data to a registration system 205. In one embodiment, the registration system 205 exposes an Application Programming Interface (API) to the web portal 201 and the web portal 201 communicates data to the registration system 205 using the API. The interactions between the web portal 201 and the registration system 205 may be formatted as a Web services-based transaction, with user data embedded in one or more Extensible Markup Language (XML) files using the SOAP protocol. However, various other data communication protocols may be employed while still complying with the underlying principles of the invention.

In response to receipt of the user data, the registration system 205 establishes a new user account and executes a series of database operations to open new record(s) in a user database 210 and an accounts database 211. For example, the user's name and contact information may be stored in the user database 210 and a new account may be opened for the user in the accounts database 211 (including an account number, wireless device profile, wireless device identification codes, etc.). In one embodiment, the various databases shown in FIG. 2 are not actually separate databases but, rather, separate data structures (e.g., tables) within a single relational database.

In one embodiment, a device management system 204 automatically provisions SIMs on behalf of the user within a wireless device database 212. As part of the provisioning process, an identification code for each SIM is automatically associated with data services offered by the wireless service provider. Each SIM includes a unique serial number, international unique number of the mobile user (e.g., IMSI), security authentication and ciphering information, temporary information related to the local network, a list of services to which the user is provided access and password data. In one embodiment, the SIMs are initially provisioned with limited functionality for application development and testing purposes. For example, in one embodiment, data transmission thresholds are set to limit the amount of data which the SIMs may utilize during the testing period. In addition, in one embodiment, the SIMs are provisioned to operate only for a specified time period. At the end of the time period, the SIMs are automatically disabled and/or de-provisioned and will no longer be permitted access to the wireless service provider network. In an alternative embodiment, the SIMs are provisioned with full functionalities ready for field use.

As part of the provisioning process, the SIMs are automatically registered with the HLR 221 of the wireless service provider 230. An HLR is a central database containing details of each mobile data subscriber authorized to use the wireless network. While the HLR 221 is illustrated in FIG. 2 within the domain of the control center 280, in one embodiment, the HLR 221 communicates with a central HLR maintained by the wireless service provider. Alternatively, in one embodiment, the entire HLR 221 is maintained by the service provider and the service provider is provided access to the data stored within the wireless device database 212 during the provisioning process. The underlying principles of the invention are not limited to any particular HLR/database configuration.

Following the automatic provisioning of the SIMs and registration of the user, the owner/operator of the control center 280 sends a wireless development kit to the user containing one or more SIMs with application software (referred to as testing and monitoring program code) and instructions for testing, configuration and certification. After the customer receives the SIMs, he can log into the web portal 201 to start the self-certification process. In one embodiment, the testing and monitoring software may be installed on the test computer 250; alternatively, the testing and monitoring software may be installed on the mobile device 100.

The self-certification process includes testing one or more of the following certification scenarios: purge the SIM from the HLR, place a restriction on the SIM such that all operators are blocked, place a restriction on the HLR with respect to which operators are allowed or not allowed for the SIM, change the network access mode of the SIM (sometimes referred to as "NAM the SIM") with "GSM not allowed," change the network access mode of the SIM with "GPRS not allowed," cause the SIM to establish connection with the wrong APN, and cause the mobile device to perform one or more of the following: send traffic to a destination server whose IP is blocked by the control center operator's firewall, send traffic to a destination server which has either crashed or gone down, be unable to identify the destination server IP address using the DNS, send the content to a destination server when the server is overloaded or the response is delayed, send the content to a wrong server port, send a mobile originated (MO) SMS and expect an acknowledgement in mobile terminated (MT) SMS which is not working, send an MO message to a Short Message Peer-to-Peer (SMPP) client's short code when the SMPP client is down, switch off when the SMPP client is trying to send a message to the mobile device, and send multiple SMS messages in quick session with no back-off.

For each of the certification scenarios, the web portal 201 provides detailed instructions and progress of the certification for display on the customer's test computer 250. If there is any setup issues, probable causes and remedies are also displayed. After the customer completes all of the necessary tests, he will be given a certificate instantly from the web portal 201 (e.g., via email or other electronic delivery means). The results of the certification are analyzed to generate the criteria or rules that define the signature behavior of the mobile device 100. In some embodiments, pictorial analytics of the device behavior may be shown on the display of the test computer 250.

Figure 3:
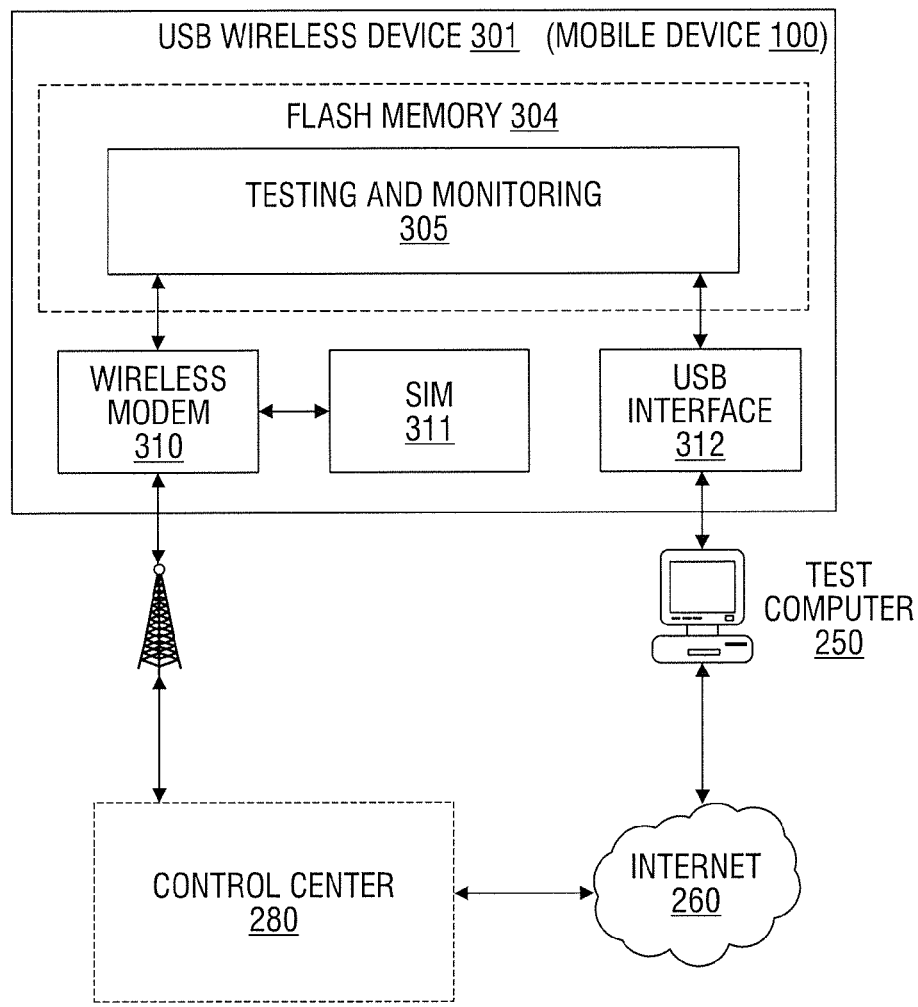
FIG. 3 is a block diagram of one embodiment of a mobile device to be tested and certified.

As illustrated in FIG. 3, one embodiment of the mobile device 100 is a wireless device 301 with a Universal Serial Bus ("USB") interface 312 for connecting to the USB port of a standard computer system (e.g., the test computer 250 of FIG. 2). In an alternative embodiment, the mobile device 100 may be an independent, stand-alone wireless device such as a Windows Mobile device, and the testing and monitoring program code may be executed directly on the mobile device 100 (e.g., loaded from non-volatile to volatile memory and executed by the mobile device's processor). Consequently, there is no need for an additional computer system executing the testing and monitoring program code in this alternative embodiment.

Although an USB interface is described herein, it is understood that the underlying principles of the invention are not limited to any particular interface type. Other interface types which may be used in lieu of USB include, by way of example and not limitation, IEEE 1394b ("Firewire") and eSATA. For simplicity, the following discussion will refer to a USB device 301; however, the wireless device 301 may be any type of wireless device without limitation.

In one embodiment, the test computer 250 is a Windows-based computer with an Intel® Core-2 Duo®, Core i7®, or similar x86-based processor, 2-4 GBytes of DDR2 or DDR3 memory, and a 250 GByte (or larger) Serial ATA hard drive. Various other computer configurations may also be used while still complying with the underlying principles of the invention. For example, in one embodiment, the test computer 250 is a Macintosh® computer system such as a Macbook Pro® or Mac Pro® desktop.

One embodiment of the USB device 301 includes a flash memory 304 for storing testing and monitoring program code 305. The flash memory 304 may be integrated directly within the USB device 301 or may take the form of a memory card coupled to a memory card slot within the USB device 301 (e.g., a Secure Digital card slot). In one embodiment, the USB device 301 includes a wireless modem module 310 pre-configured to communicate over the wireless network and a SIM interface into which the pre-provisioned SIM 311 may be connected for configuring, testing and debugging wireless applications. Once inserted into the SIM interface, the SIM 311 authorizes the USB device 301 to communicate over the wireless service provider's network 230 (according to the provisioning parameters associated with the SIM 311).

In one embodiment, when the USB device 301 is initially inserted into the USB port of the test computer 250, auto-installation logic (e.g., an automatic installation script) is executed and (upon authorization by the end user), the testing and monitoring program code 305 is automatically installed and executed on the test computer 250.

In an alternative embodiment, the mobile device 100 may be an independent, stand-alone wireless device such as a Windows Mobile device, and the testing and monitoring program code 305 may be executed directly on the mobile device 100 (e.g., loaded from non-volatile to volatile memory and executed by the mobile device's processor). Consequently, there is no need for an additional computer system executing the code 305 in this implementation.

In the embodiment of FIG. 3, the USB device 301 is preconfigured with the Access Point Name (APN)—i.e., the network address used to identify a GGSN 222 at the control center 280. During the testing and configuration process, all wireless cellular communication with the control center 280 is routed through the GGSN 222. In addition to the APN, the USB device 301 is also configured with the hostname of the control center diagnostics system 270, which includes one or more test servers used for IP traffic testing.

In one embodiment, the provisioning parameters for each SIM include a communication profile specifying the wireless services allocated to the SIM (e.g., whether SMS or voice functionality is permitted, roaming restrictions, etc.). The provisioning parameters also include the rate plan associated with the SIMs including the financial parameters (i.e., the price), the amount of data permitted under the financial parameters, overage rates, etc. As previously described, in one embodiment, each trial SIM is allocated a limited amount of data usage for testing and troubleshooting purposes, and is not provided with voice or SMS communication services. In one embodiment, even though the SIM is not provisioned for voice service, the SIM is provided with GSM functionality in order to be authorized with GSM network, prior to connecting to the GPRS network. In another embodiment, the SIM may be provisioned with voice, data, and/or SMS communication services.

The testing and monitoring program code 305 can automatically establish a connection with the control center 280 over the wireless cellular network 230 and/or a direct channel through the Internet 260 and executes a series of automated tests, thereby saving the end user a significant amount of time and effort in the process of developing new wireless applications. Moreover, because the SIMs received by the end user are pre-provisioned and the USB device 301 may be pre-configured by the control center 280, the USB device 301 is capable of establishing a wireless connection with minimal effort on the part of the prospective customer.

In one embodiment, the testing and monitoring program code 305 automatically checks for updates prior to executing the various tests and troubleshooting steps. The updates may include patches and additional tests/troubleshooting operations. If an update is available, the testing and monitoring software automatically installs the update (upon confirmation by the end user) and then executes the tests.

Figure 4:
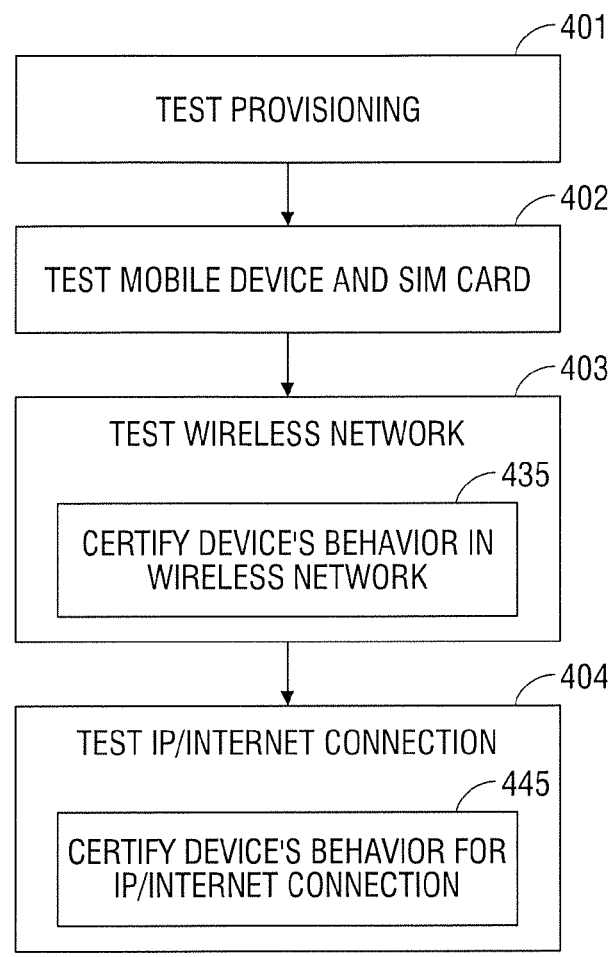
FIG. 4 is a flow diagram of one embodiment of a method for testing and certifying a mobile device.

One embodiment of a computer-implemented method for the mobile device 100 to perform the self-certification process is illustrated in FIG. 4. At step 401, the testing and monitoring program code 305 tests the provisioning of the USB device 301 with a particular SIM installed. In one embodiment, this involves checking the following parameters to determine whether traffic is allowed using the given SIM: the SIM's state must be "Activation Ready" or "Activated;" (b) the SIM must not have been blocked. An activation ready state allows a SIM to be ready to be activated. An activation ready state will authenticate and authorize with the HLR and AAA server of the provider system, but no billing will occur. An activated state allows a SIM, or a device with a SIM, to be used by a user. In an activated state the SIM will authenticate and authorize on the HLR and AAA server of the provider system. Billing commences immediately on changing to this state.

Assuming that the foregoing conditions are met, the USB device 301 with the SIM passes the provisioning test step 401. A test failure indicates that one or more of the foregoing conditions were not met. For example, if the SIM's state is not "Activation Ready" or "Activated," or if the SIM has been blocked due to excessive signaling or excessive data usage, then the USB device 301 with the SIM 311 will fail the provisioning step 401. In response, one embodiment of the testing and monitoring program code 305 performs troubleshooting operations to fix the problem and/or notifies the user of troubleshooting steps to be taken. For example, if the SIM's status is not "Active" or "Activation Ready" then the testing and monitoring program code 305 may check to ensure that the SIM's status is correctly reflected in the wireless device database 212.

At step 402, the testing and monitoring program code 305 tests the USB device 301 and the SIM 311. In one embodiment, this test involves determining whether the given USB device 301 and SIM 311 are available on the network based on one of two factors (whichever comes first): (a) reporting from the device via "direct channel" diagnostics, or (b) any detected wireless signaling activity. With respect to (a), the direct channel comprises the direct connection of the test computer 250 to the diagnostics system 270 through the Internet 260. In one embodiment, the testing and monitoring program code 305 reports its status to the diagnostics system 270 periodically through the direct channel. These reports may include local wireless statistics such as signal strength and data usage. If the USB device 301 is unable to connect wirelessly due to lack of coverage or low signal strength, the direct channel provides valuable diagnostic information that would otherwise be unavailable to the diagnostics system.

If a direct channel connection or wireless connection is detected, then the USB device 301 and SIM 311 pass the device/SIM testing step 402 illustrated in FIG. 4. In one embodiment, if neither connection is detected, then troubleshooting steps are implemented including instructing the user to confirm that the SIM 311 is inserted properly and determining whether wireless coverage exists at the test location. For example, in one embodiment, the control center 280 and/or the testing and monitoring program code 305 maintains a database of service coverage locations. If the current location of the wireless device is outside of the coverage location, then the testing and monitoring program code 305 may notify the user that coverage is not available at the current location. The user's current location may be determined manually (e.g., by requesting the current address or zip code for the user) or automatically (using GPS if the customer's test computer 250 is equipped with GPS capabilities).

The customer may also be asked to verify that the USB device 301 has adequate signal strength (e.g., greater than 1 bar or a RSSI of 5 or more); verify that the device's antenna is properly connected; verify the USB device 301 is configured with the proper frequency bands (850 & 1900 MHz for the US, and 900 & 1800 MHz for Europe); and/or verify whether other wireless devices (e.g., GSM/GPRS cell phones) in the proximity are working. Upon verification of one or more of the above variables, the testing and monitoring program code 305 may re-execute step 402 in FIG. 4 to re-test the USB device 301 and SIM 311.

At step 403, the testing and monitoring program code 305 tests the USB device's wireless network connection. In one embodiment, this involves checking the HLR 221 to determine whether there has been any recent wireless signaling from the USB device 301. There are three types of wireless signaling which may be detected: a GSM authorization request; a Mobile Switching Center (MSC) Location Update; and/or a Serving GPRS Support Node (SGSN) Location Update. The presence of any of these signaling events indicates that the USB device 301 has successfully registered on the GSM (voice) network and/or the GPRS (data) network. As such, if any of these signaling events are detected, the testing and monitoring program code 305 indicates that the USB device 301 has passed the wireless network testing step 403 in FIG. 4.

If none of these signaling events are detected, then the testing and monitoring program code 305 may initiate one or more troubleshooting operations. For example, in one embodiment, the control center 280 may transmit an SMS message to the USB device 301. If the SMS message is successful, then GSM service is available (but perhaps not the GPRS service). In addition, the testing and monitoring program code 305 may check the GSM and GPRS registration using AT commands sent to the wireless modem 310 (e.g., to verify GSM registration, the "AT+CREG?" command should return "+CREG:x,1" or "+CREG:x,5"; where "x" is 0, 1 or 2; to verify GPRS registration, the "AT+CGATT?" command should return "+CGATT:1" and "AT+CGREG?" should return "+CGREG:x,1" or "+CGREG:x, 5"; where "x" is 0, 1 or 2). Finally, the testing and monitoring program code 305 may perform a soft reset of the USB device 301 or the end user may be prompted to perform a hard reset of the USB device 301.

During the test step 403, one or more aforementioned certification scenarios may be tested at a subset 435 and the behavior of the USB device 301 is monitored by the testing and monitoring program code 305. For example, the network access mode of the SIM 311 may be changed to "GSM barred" and the behavior of the USB device 301 is monitored to establish its signature behavior.

Returning to FIG. 4, at step 404, the testing and monitoring program code 305 tests the IP/Internet connection of the USB device 301. In one embodiment, this test includes two parts: (1) Check the GGSN to determine whether the USB device 301 has initiated a Packet Data Protocol (PDP) session. PDP session context data will be present in the GGSN when the USB device 301 has established an active session. Consequently, the existence of a PDP session data indicates that the device was able to resolve the APN to a GGSN and start a PDP session with that GGSN. (2) Run test traffic from the USB device 301 to a control center test server within the diagnostics system 270 and check the GGSN for real-time IP traffic statistics. This test fails if the USB device 301 has no upload/download bytes at all (which suggests a problem with the USB device's IP capabilities) or if it has upload bytes but no download bytes (which suggests a problem reaching the test server).

Assuming that the above conditions are met, the testing and monitoring program code 305 confirms that the USB device 301 has passed the IP/Internet test step 404. If these conditions have not been met, the possible reasons include: the APN is not configured properly; the USB device 301 is unable to open ports or sockets; the IP address is incorrect; and/or the IP data cannot flow bi-directionally.

During the test step 404, one or more aforementioned certification scenarios may be tested at a subset 445 and the behavior of the USB device 301 is monitored by the testing and monitoring program code 305. For example, the testing and monitoring program code 305 may cause the USB device to send traffic to a destination server whose IP address is blocked by the control center operator's firewall, and the behavior of the USB device 301 is monitored to establish its signature behavior.

In one embodiment, the testing and monitoring program code 305 automatically performs the following troubleshooting operations and/or instructs the user to manually perform these operations: check whether the USB device 301 has been configured with the correct APN; verify that all sockets and ports on the USB device 301 are closed and free to use; and verify that the destination IP address programmed in the USB device 301 is accurate.

In one embodiment, the results of all of the foregoing tests, certification and troubleshooting steps are stored within a diagnostics database 275. If necessary, the results may be reviewed by personnel within the control center 280 to provide guidance to the prospective customer when troubleshooting new wireless applications. In one embodiment, local environment statistics are transmitted to the diagnostics database 275 such as wireless signal strength of the trial device. The local environment statistics (and other test data) are then usable for performing diagnostics for the trial device and/or aggregated across different trial devices to construct an estimate of the conditions in a given geographical area.

Moreover, in one embodiment, the testing and monitoring software automatically checks for updates prior to executing the various tests and troubleshooting steps described above. The updates may include patches and additional tests/troubleshooting operations. If an update is available, the testing and monitoring software automatically installs the update (upon confirmation by the end user) and then executes the tests.

In one embodiment, the signature behavior of a mobile device obtained by the above self-certification process can be stored in the mobile device 100, in the control center database, and/or a network node. The signature behavior can be used to create a rules set defining the thresholds between the acceptable and aggressive behaviors of the mobile device 100. Based on the rules set, the aggressive behavior of the mobile device can be detected, blocked, or throttled, in real time. In one embodiment, a software agent is installed in the SIM 311. The software agent (also referred to as "agent" or SIM applet) may be a SIM applet that controls the behavior of the mobile device 100, independent of the device modules and mobile applications. The control can be performed without the mobile device 100 asking the customer to change the application configuration or the control center 280 pushing new firmware and/or software onto the mobile device 100. Via the software agent, an operator of the control center 280 is given control to (1) access the critical files in the SIM 311 which are required to operate the modem, (2) disable ("nuke") the mobile device 100 or the SIM 311 for a period of time called "quasi-dead" period and (3) enable/disable the services provided to the SIM 311.

In one embodiment, the software agent or SIM applet may not have any dependency on SIM Application Toolkit (SAT) commands (commands between a SIM and a modem) or modem modules type/versions/release. In an alternative embodiment, the software agent may utilize the SAT to interface with the modem.

Before describing the software agent in further detail, it is helpful to explain the basic file structure of the SIMs. A SIM contains both a processor (CPU) and an operating system. SIMs also have Electrically Erasable Programmable Read Only Memory (EEPROM), Random Access Memory (RAM) for controlling program execution, and persistent Read Only Memory (ROM) which stores user authentication, data encryption algorithms, the operating system, and other applications.

A SIM contains a hierarchical file system which resides in the EEPROM. The file structure consists of a Master File (MF), which is the root of the file system, Dedicated Files (DFs), and Elementary Files (EFs). Dedicated Files are subordinate directories under the MF. Subordinate to each of the DFs are supporting EFs which contain the actual data. While all the files have headers, only the EFs contain data. The first byte of the header identifies the file type. Headers contain the security and meta-information related to the structure and attributes of the file, such as length of record. The body of the EFs contains information related to mobile applications. Files can be either administrative or application specific and access to stored data is controlled by the operating system. A SIM card's MF, DFs, and EFs all contain security attributes. One security attribute, the access conditions, are constraints upon the execution of commands. These access conditions filter every execution attempt, thus ensuring that only those with the proper authorization can access the requested functionality controlled by the DFs or EFs. Access conditions can be thought of as somewhat analogous to the user rights associated with the file/directory attributes found in computer operating systems. According to one embodiment of the invention, the control center 280 can send over-the-air (OTA) instructions and content to change the SIM file contents.

Figure 5:
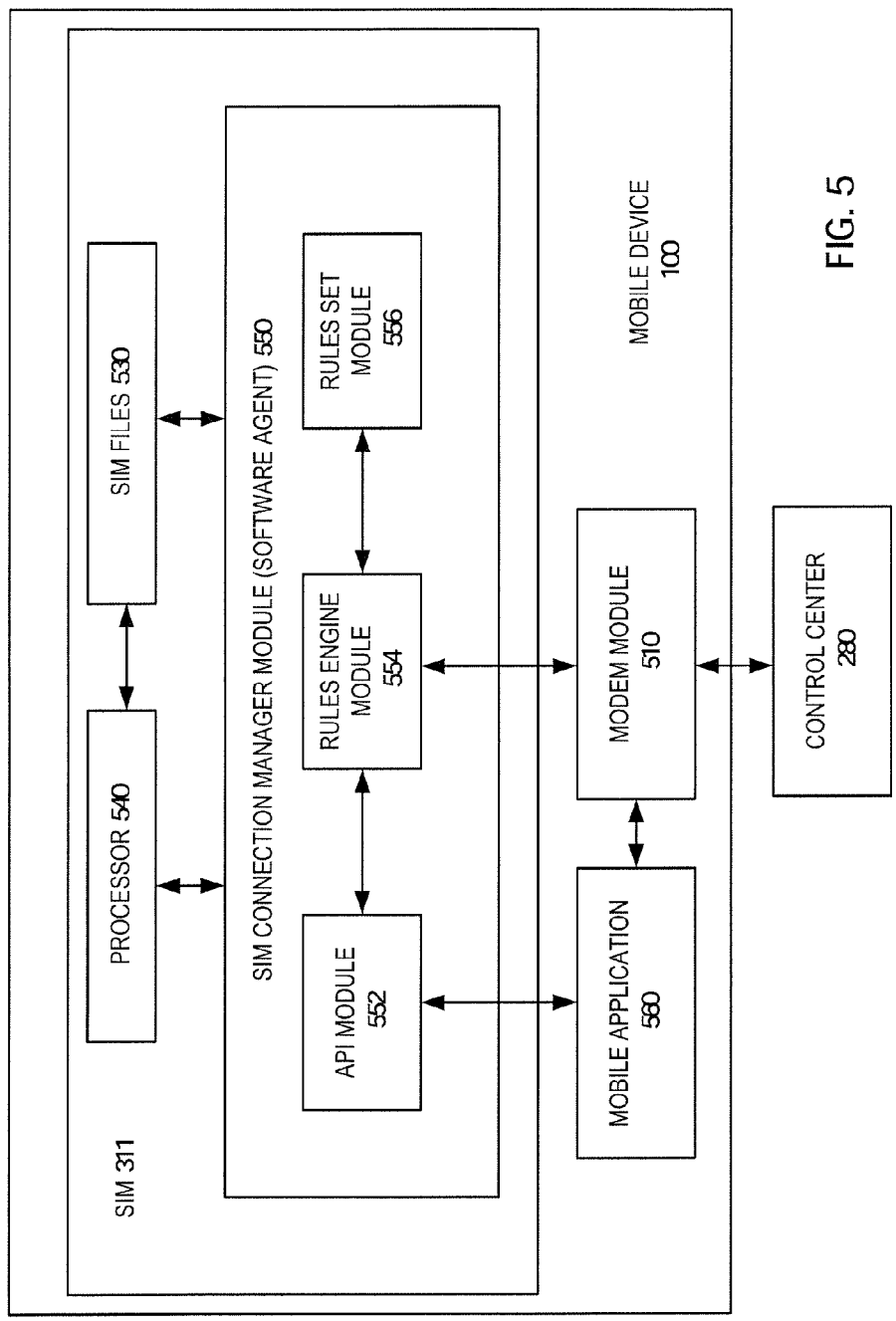
FIG. 5 is a block diagram of one embodiment of a mobile device including a software agent.

In the embodiment illustrated in FIG. 5, the SIM 311 includes a processor 540 and stores SIM files 530 in memory. The software agent described above is shown in this embodiment as a SIM connection manager module (SIM CMM) 550 residing in the SIM 311. The SIM CMM 550 is privy to all communication occurring between a modem module 510 and the SIM 311. In one embodiment, the SIM CMM 550 uses or includes running counters and timers which are derived from a configurable rules set. The SIM CMM 550 can intercept the communication between the modem module 510 and the SIM 311, and block the communication if needed. The SIM CMM 550 controls the access to the SIM files 530 (e.g., the EFs) in the SIM 311. According to one embodiment, the SIM CMM 550 can invalidate and rehabilitate any of the EFs based upon event counters or running timers. When an access condition for invalidating an EF is satisfied, the agent 550 sets the respective flag in the file status accordingly. An invalidated file is no longer available to the mobile application 560 (or modem module 510) for any function except for the select function and the rehabilitate functions (unless the file status of the EF indicates that read and update are allowed). When an access condition for rehabilitating an invalidated EF is satisfied, the agent 550 sets the respective flag in the file status accordingly.

In one embodiment, the control center 280 sends a rules set file containing one or more rules sets as over-the-air (OTA) messages to the SIM 311. The rules file can be stored in a Rules Set module 556 in the SIM 311. The rules file specifies, among other things, the number of successive accesses allowed for a particular SIM file, and the length of the disabling period (which may be indicated as a timer value or a counter value) when an aggressive behavior of the mobile device 100 is detected. The SIM CMM 550 uses counters to count the number of accesses to the SIM files 530 (e.g., $EF_{LOCI}$, $EF_{IMSI}$, $EF_{SST}$, etc.). If the access to any of these files goes beyond a threshold, the SIM CMM 550 will block the access temporarily or turn off features in the $EF_{SST}$ that determine access to network service controlled via the modem module 510.

In one embodiment, the rules file includes a white sequence defining a pattern of allowed device behavior, and/or a black sequence defining a pattern of disallowed device behavior (including aggressive behaviors). In one embodiment, the rules file defines that upon detection of aggressive behavior, the mobile device 100 is placed into a "quasi-dead" state by enabling pin 1 in an EF file or invalidating SIM files 530. The SIM may be revived by the user, control center administrator, control center automated processor, or network operator by entering a PIN or validating any of the invalidated SIM files 530.

When the modem module 510 powers up, the modem module 510 requests access to the SIM 311 for various purposes. The modem module 510 may not access the SIM 311 until power cycled. However, if the SIM 311 has to be disabled temporarily (e.g. due to detected aggressive behavior of the mobile device 100), the SIM CMM 550 can perform one of the following actions to prevent the modem module 510 from generating excessive traffic on the wireless network: (1) Answer-to-Reset (ATR) response: the SIM CMM 550 can monitor the RESETs coming from the modem module 510 and ignore the requests for a certain number of times. Ignoring the requests gives a false sense to the modem module 510 that the SIM 311 is dead (i.e., non-functional). (2) Disable the modem module 510 via $EF_{SST}$ (SIM Service Table): $EF_{SST}$ is one of the SIM files 530. $EF_{SST}$ indicates which services are allocated, and whether, if allocated, the service is activated. If a service is not allocated or not activated in the SIM 311, the service should not be selected. The SIM CMM 550 can enable/disable the modem module 510 by validating/invalidating the entire $EF_{SST}$ or validate/invalidate any of the services to allow/block access to the wireless network. (3) Block access to $EF_{IMSI}$: $EF_{IMSI}$ is one of the SIM files 530. $EF_{IMSI}$ contains the IMSI. If the modem module 510 cannot read the IMSI in $EF_{IMSI}$, it will not try to register on the wireless network and result in an "Invalid SIM" response.

In an alternative embodiment, the SIM CMM 550 is embedded software within the SIM 311 that controls the modem module 510, ensures that a connection is established and maintained, enables external network-initiated connections, and provides remote control options and diagnostic functions (e.g. via the control center 280). The SIM CMM 550 includes platform-independent software/code and platform adaptation components. In the embodiment of FIG. 5, the SIM CMM 550 includes an Application Programming Interface (API) module 552, a Rules Engine Module 554, and a Rules Set Module 556.

The API module 552 provides an interface to a mobile application 560 that allows M2M or mobile application developers to rapidly develop and deploy mobile applications without detailed knowledge of wireless networking or AT commands. Ultimately, this results in a faster time to market and a robust wireless solution.

The SIM CMM 550 platform-independent software/code manages all communications utilizing the Rules Engine Module 154 which comprises a generic configurable state machine. The SIM CMM 550 also utilizes the Rules Set Module 556, which comprises rules sets that provide connection logic that defines operation of the modem module 510. The rules sets may be created, revised, updated, and tested and can be distributed remotely by various means, including generation and distribution by the control center 280. In one embodiment, the rules sets are created, at least in part, based on results of the certification process described above.

The Rules Engine Module 554 including the configurable state machine may be configured by rules set files that direct the modem module 510 in setting up and maintaining connections. Rules sets may be maintained and distributed from the control center 280. The control center 280 may create rules sets specific to each of the major wireless modules. Rules sets may also be obtained from alternative sources other than the control center 280. A collection of rules in the rule set drives the state transitions either unconditionally or in response to events. Events are raised based on modem module 510 responses, connectivity changes, and the action of various timers and counters defined in the rules sets. Outputs specified on state transitions result in AT commands to drive the behavior of the modem module 510.

The state machine is defined by the rules sets, which specify the state transition rules, and the actions to be taken in the event of radio network errors. If desired, there can be different rules sets for different types of applications (e.g. stationary vs. mobile device, roaming vs. non-roaming device, etc.).

Figure 6:
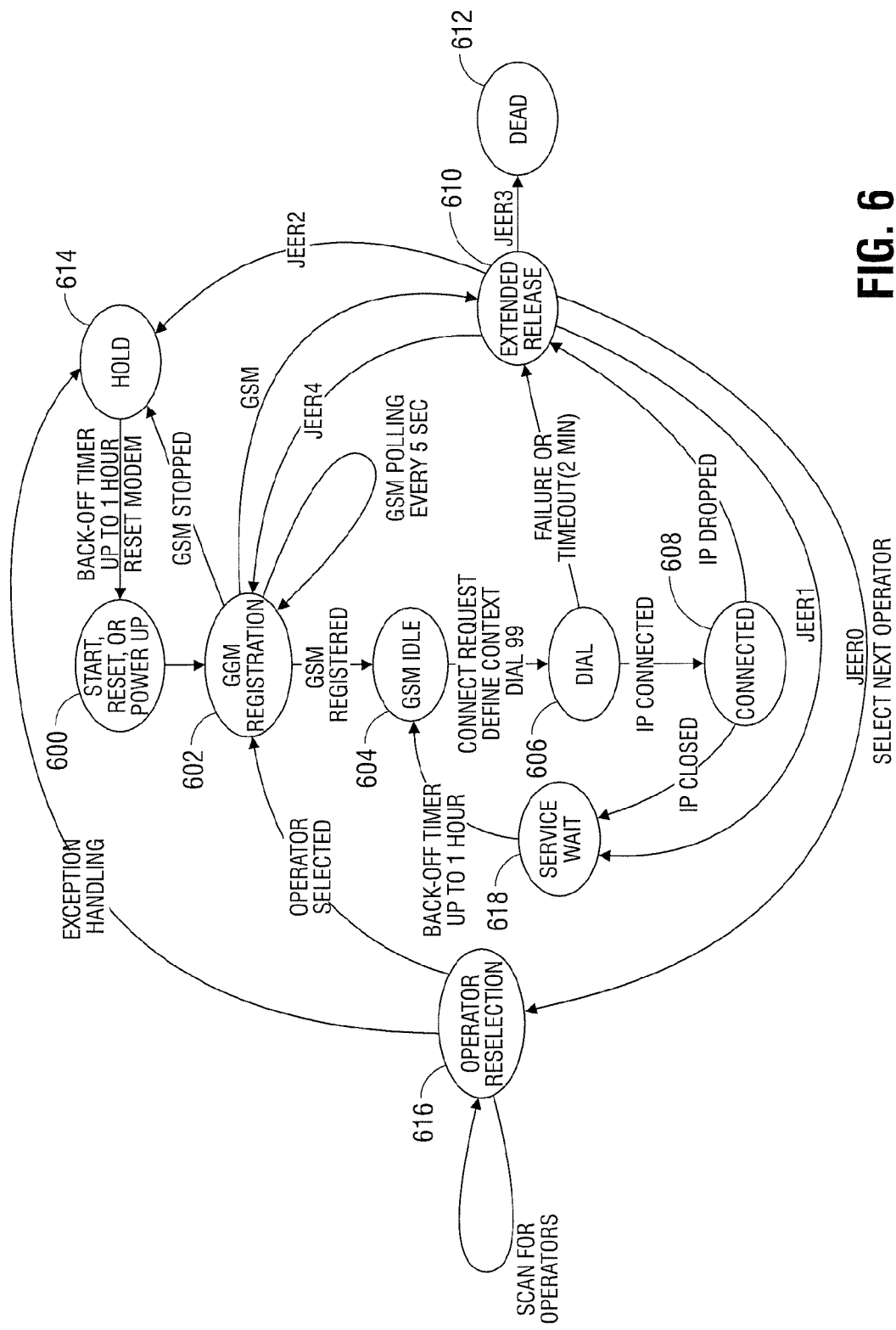
FIG. 6 illustrates a flow diagram for an implementation of a rules set according to an embodiment of the invention.

FIG. 6 illustrates a flow diagram for an implementation of a rules set according to an embodiment of the invention. The rules set contains communications logic/flow including back-off logic. The rules set establishes network connections, interprets responses from the module/modem or network, eliminates aggressive wireless device behavior, and may be module/modem specific.

In step 600, the mobile device 100 is powered up. In step 602, a modem 510 attempts a GSM registration. In step 604, after the mobile device is GSM registered the device is GSM idle. In step 606, the modem 510 receives a connect request for establishing a data connection and attempts a "dial" operation (establish a PDP context). In step 608, if the data connection is established the mobile device 100 is "connected". If the data connection is not established i.e. a "failure", in step 610 the SIM CMM 550 issues an AT command to the modem 510 requesting the "extended release" or "error code" (JEER0, JEER1, JEER2, JEER3, JEER4, etc.).

Depending on the type of "error code" returned by the modem 510, the SIM CMM 550 utilizes the Rules Engine Module 554 including the configurable state machine to determine the proper course of action. For example, if the error code is JEER 4, the SIM CMM 550 issues an AT command to the modem 510 to retry step 602 for GSM registration. If the error code is JEER 2, the SIM CMM 550 issues an AT command to the modem 510 to "hold" in step 614 for a length of time defined by a back-off timer before resetting the modem 510 in step 600. If the error code is JEER 0, the SIM CMM 550 issues an AT command to the modem 510 to try to establish a connection with a different operator in step 616 by starting over with a GSM registration in step 602. If the error code is JEER 1, the SIM CMM 550 issues an AT command to the modem 510 to "hold" or "service wait" in step 618 for a length of time defined by a back-off timer and instructs the modem 510 to remain in GSM idle in step 604 before re-trying to establish a data connection in step 606. If the error code is JEER 3, the SIM CMM 550 issues an AT command to the modem 510 to enter a "dead" state in step 612.

As shown in FIG. 6, the rules set comprises a collection of states, rules, timers and counters. The rules set is described by a binary file with a proprietary format. Rules sets may be very flexible and can define a wide range of logic to control the operation of the modem. There may be different strategies for managing the connectivity of a modem. For instance, one strategy might be to obtain a connection regardless of how long it takes. Another might be to obtain a connection as quickly as possible. Rules sets allow wide variation in the system logic to accommodate a large range of strategies.

States define arbitrary states in the Rules Engine Module 554 that may represent system states. Each state is defined by a name that is referenced by rules. Events are created by modem responses or expiration of timers and counters. Modem responses can be either normal or error responses to AT commands.

Timers are started on events and expire after their timeout value, creating timeout events. Timers can be defined to operate with a "back-off" mechanism, wherein the timeout period may increase after each expiration. The utilization of timers may prevent aggressive behaviors of the system where operations are retried frequently, causing unnecessary network traffic. Another feature of the timers is randomization, where part of the timeout value can be a random value. The utilization of randomization may prevent a large number of devices from attempting operations on the network at the same time. In one embodiment, a formula for calculating the next expiration value, T2, from the current value, T1 is: $T2=C+n*T1$, where C is a constant and n is a multiplier. If n is a positive value, the current timeout value is multiplied by n and added to C. If n is a negative number, a random value between 0 and the absolute value of n is calculated. Counters count events that occur in the system to allow the rules set logic to take action after a fixed number of events.

Rules define the transition from one state to another. They are triggered by events and create outputs on the transitions. These outputs can be modem commands, or starting or cancelling timers or counters. As the logic transitions from state to state within the rules set, the outputs' drive the modem to perform the actions that affect modem connectivity.

The SIM CMM 550 and the rules set are flexible in terms of how they handle the different radio network error and reject codes. For example, an event handled by the rules set may be a situation where the mobile device 100, while involved in or attempting a data session, receives a packet data protocol (PDP) reject cause code 33 from a network and the modem and/or SIM CMM 550 continues to receive PDP activation requests from the upper device application layer. The SIM CMM 550 can back-off and retry on the same carrier, back-off then reset the modem module 510, attempt to connect on another carrier or stop attempting.

In another example, if the mobile device 100 receives a GPRS attach reject with cause code 17, the SIM CMM 550 (in accordance to the rules set) will instruct the modem module 510 to attempt to connect on another carrier (e.g. a roaming partner).

In one embodiment, the SIM CMM 550 can issue an AT command (e.g., "CEER") to the modem module 510 to request for the extended release cause. The modem module 510 in return replies with an error code; e.g., JEER0, JEER1, JEER2, JEER3 or JEER4. Each error code indicates a distinct type of error that allows the SIM CMM 550 or the control center 280 to determine the cause of connection problems.

The control center 280 has the ability to "push" rules set files to mobile devices on the network. The control center 280 may initiate this function by sending an SMS message to the mobile app, modem, or SIM CMM 550. Upon receiving the message, the SIM CMM 550 establishes an IP connection via the wireless data network, retrieves the specified rules set, and disconnects. The SIM CMM 550 may utilize a command channel for such communication. The SIM CMM 550 may then restart or reboot using the new rules set. If the SIM CMM 550 encounters any errors in loading the new rules set, the SIM CMM 550 may revert to the last known good rules set.

The SIM CMM 550 interfaces with the mobile application 560 by utilizing the API 552. In one embodiment, a call back function is embedded in the mobile application 560 source code. This function can be called by the SIM CMM 550 whenever information is available. All data is delivered asynchronously using this mechanism. Network initiated connection requests are also communicated using the call back function. The mobile application 560 source code must complete the connection operations by calling the SIM CMM 550 in response to these requests. The SIM CMM 550 can be initialized by calling CMM Open ( ). After the initialization, the API 552 is utilized to connect, disconnect, request information, or send SMS messages. Calling CMM Close ( ) releases the resources used by the API 552.

The API 552 is a platform-independent interface consisting of methods for connecting, disconnecting, querying parameters, and sending SMS messages. The API 552 allows a developer to design and implement a mobile application utilizing existing operating systems such as Windows CE, VxWorks, MeeGo, and QNX, etc. In one embodiment, the mobile applications 560 written in C or C++ can utilize the API 552 directly. In another embodiment, a wrapper may be created for the mobile applications 560 written in other program language in order to utilize the API 552. The API 552 sends information to the mobile application 560 through an asynchronous notification mechanism. The API 552 may send the information synchronously as well. The mobile application 560 registers a call back function and the SIM CMM 550 calls this function any time there is information to communicate. This mechanism is used to deliver status messages from the SIM CMM 550, connection status information, and mobile terminated SMS messages.

The SIM CMM 550 drives the modem module 510 using all necessary AT commands and responses. In addition, the SIM CMM 550 provides and executes logic to handle the various modem module 510 and network error situations in ways that are compatible with the wireless network. The SIM CMM 550 ensures that the mobile device 100 connects to the wireless network when necessary and stays connected. The SIM CMM 550 manages intelligent re-tries when there are network related problems, selecting alternative networks when needed. The SIM CMM 550 may also enable alternative network selection in regards to international roaming which may be inherently less reliable than a native service. In particular, there is the so-called "stuck SIM" problem, an inherent weakness of GSM that can allow a mobile device to remain on a network that can provide GSM service, but is temporarily unable to provide GPRS service. In this situation, the SIM CMM 550 may ensure that an alternative network is selected and significantly improve the reliability of international roaming.

The SIM CMM 550 also provides a valuable diagnostic function. The SIM CMM 550 monitors the quality of wireless communications and makes the information available on demand for diagnostics purposes. The SIM CMM 550 remotely monitors performance of network data connections, checks for errors, and checks the signal strength at the device.

The SIM CMM 550 provides the ability to remotely cause the mobile device 100 to connect or disconnect. The control center 280 may also be used to initiate a connect or disconnect by sending SMS messages to the SIM CMM 550. The SIM CMM 550 may use the call back mechanism to notify the mobile application 560 of the request, and the mobile application 560 may complete the request by making API 552 calls to CMM Connect or CMM Disconnect.

The SIM CMM 550 maintains log files that record the activity of the SIM CMM 550. These log files may be uploaded and viewed in the control center 280. The control center 280 may initiate the request to upload the logs by sending an SMS message to the SIM CMM 550. Upon receiving the SMS message, the SIM CMM 550 may establish an IP connection via the wireless data network, upload the log files to the control center 280 and then disconnect.

In the illustrated embodiment, the service provider may be AT&T and the modem modules 510 include those wireless modules supported on the AT&T data network. For example, modem modules 510 may include a Cinterion MC55i, a Telit GE-865, a Siena Q2426, etc. However, the underlying principles of the invention are not limited to any particular service provider.

The above description relates to a SIM-based solution to aggressive behaviors. In an alternative embodiment, detecting and real-time blocking of aggressive behaviors can be performed by a network node; e.g., at an SS7 STP gateway. In this alternative embodiment, a software agent, such as the SIM CMM 550 described above, can be implemented in a network node; e.g., an STP. An example of an STP gateway is shown in FIG. 1B as STP 3471 and STP 3472. In one embodiment, this approach is based upon the assumption that the signature behavior of the mobile device is known from the self-certification process described above. The customer may agree that the signature behavior defines the acceptable behavior under the various scenarios that have been tested in the self-certification process. If the signature behavior of the mobile device is not known, a default signature behavior is applied to that device.

Alternatively, any other process may be used that characterizes and quantifies the aggressive behavior of a mobile device and creates a device signature.

Figure 7:
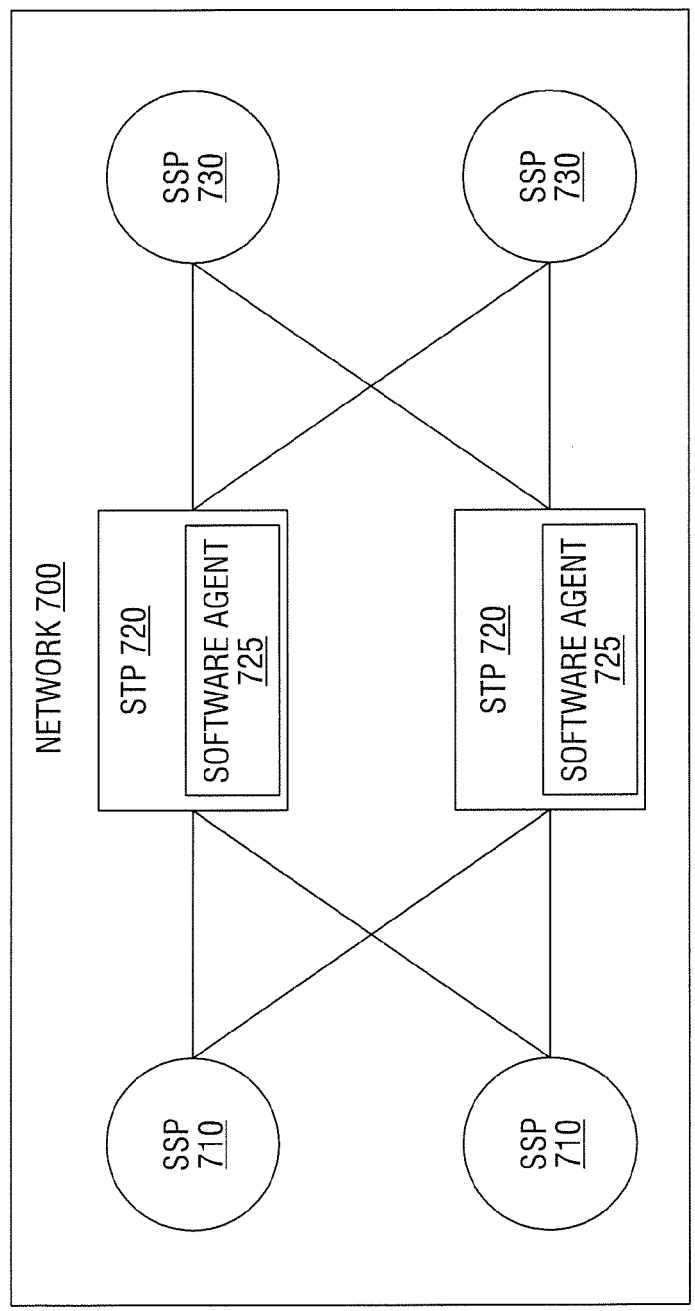
FIG. 7 is a block diagram of one embodiment of a Signal Transfer Point (STP) including a software agent.

Referring to the network architecture 700 of FIG. 7, a Signal Transfer Point (STP) 720 is a router that relays SS7 messages between signaling end-points (SEPs) and other signaling transfer points (STPs) 720. Typical SEPs include service switching points (SSPs) 710 and service control points (SCPs) 730. The STP 720 is connected to adjacent SEPs and adjacent STPs via signaling links. Based on the address fields of the SS7 messages, the STP 720 routes the messages to the appropriate outgoing signaling link. SEPs send signaling messages to other SEPs, but the messages are normally routed via the SEP's adjacent STPs. An STP's main function is to identify the best path for two SEPs to communicate.

In one embodiment, the STP 720 performs real-time detection against the device signature by leveraging a sliding window concept, which uses past behavior and expected behavior of the mobile device as a criterion for detection. When the detected behavior deviates from the signature behavior by a predetermined amount, the STP 720 blocks or throttles traffic from and to the Global Title (GT) per mobile device. A GT is a unique address used in Signaling Connection Control Part (SCCP) protocol for routing messages in telecommunication networks. A GT is equivalent to an IP address in the SS7 communication.

In one embodiment, the STP 720 includes a software agent 725, which includes a Rules Engine module and a Rules Set module performing the same functions as the Rules Engine module 554 and the Rules Set module 556 of FIG. 5. The Rule Set module in the STP 720 may define the same or similar states and state transitions per mobile device as shown in FIG. 6. In an alternative embodiment, the detection of the aggressive behavior may be performed by the mobile devices and/or control center 280. When an aggressive behavior of a mobile device is detected, the STP 720 is notified to block or throttle traffic to and from that mobile device.

In yet another embodiment, the aggressive behavior of a mobile device can be detected and managed by a control center platform (e.g., the control center 280 of FIG. 1B and FIG. 2). The control center platform 180, 280 uses the following data sources: HLR SS7 logs, Radius authentication logs, Radius accounting records, GGSN CDRs, SMSC SMS logs, and the SIM Status.

The HLR SS7 logs are sent from HLRs to control center in near real time. The HLR SS7 logs are stored in a control center Vault server, a database that tracks the historical statistics on each IMSI. The HLR SS7 logs provides MSC/SGSN Locations (Location Updates and Cancel Locations) for each IMSI, including the carrier that it has registered with and Triplet Requests i.e., GSM authentication requests for each IMSI.

The Radius authentication logs are sent from Radius servers to control center in near real time. The Radius authentication logs are stored in a control center Authentication Database. The Radius authentication logs provide GPRS authentication successes and failures for each IMSI.

The Radius accounting records are sent from Radius servers to control center in near real time. The Radius accounting records are stored in a control center Usage Database. The Radius accounting records provide GPRS session information, including In-Session Status, Device IP address, SGSN address, duration, up/down bytes.

The GGSN CDRs are sent from GGSN to control center in near real time. The GGSN CDRs are stored in the control center Usage Database. The GGSN CDRs provide the data usage, including partial records with the incremental data usage in the middle of a session.

The SMSC SMS logs are sent from SMSC to control center in near real time. The SMSC SMS logs are stored in the control center Usage Database. The SMSC SMS logs provide SMS statistics, including the number, size, frequency, and delivery status per IMSI.

The SIM Status is tracked by the control center. The SIM Status is stored in the control center Provisioning Database. The SIM Status provides the SIM activation status, suspend status, overage limit status.

These data sources are also used by other parts of the control center platform. For example, a Network Guard function uses the Radius authentication logs to identify abusive SIMs (currently defined as the IMSIs that had more than 60 GPRS authentication failures per hour) and automatically blocks them from the network.

The aggressive behaviors may be present when (1) the mobile device performs >100 SAI (Send Authentication Information) operations in a 24-hour period to HLR front end servers, and/or (2) the mobile device generates >50 Packet Data G-CDR (GGSN Call Data Records) in a 24-hour period.

With respect to the SAI operations, a control center database (vault) server monitors and tracks the numbers in the log files from all of the HLR servers to which the control center has access. These HLR log files contain 24/7 running records for each unique IMSI (subscriber) for the following HLR Map protocol operations: SAI, LU (Location Update), CL (Cancel Location) and the like. Therefore, if the daily agreed maximum number of authentication requests (i.e., SAI messages) towards any HLR is exceeded for a subscriber IMSI, the subscriber's IMSI will be flagged automatically and reported to the control center administrator. The data in the report contains the following: IMSI, ICCID, number of authentication requests, and SIM State (e.g., activated/purged/test ready, etc.). The account name can be gleaned by the account number and operator name. This data is made available for the administrator or operator to target and perform an action on either each ICCID (which identifies a subscriber), or for all offending IMSIs/ICCIDs by the account name. Alternatively, a control center processor or a rules engine (such as CSP engine 125 shown in FIG. 1A) may automatically implement a rule set based automated process to perform an action on either each ICCID (which identifies a subscriber), or for all offending IMSIs/ICCIDs by the account name.

The actions include, but are not limited to the following: (1) purge the subscriber profile in the HLR (subscriber deleted from HLR) via a control center API call to the HLR. (2) Change the subscriber profile to subscribe to "GSM only not GPRS" (i.e., Network Access Mode) via a control center API call to the HLR. (3) Change the subscriber profile to be network registration barred, which disallows location update via a control center API call to the HLR. (4) Amend the subscriber profile restriction to block certain MNC/MCC combinations to disallow roaming via a control center API call to the HLR. (5) Force the subscriber to enter a PIN to enable the SIM when the next location update attempt occurs by an over-the-air update via SMS, thus rendering the SIM useless until a correct PIN is manually entered via a control center API call.

With respect to the Packet Data G-CDR, the control center database (vault) server monitors and tracks the number of G-CDRs from all of the GGSNs to which the control center has access. The GGSN log files that are sent to the control center contain 24/7 running records for each unique IMSI/ICCID. Therefore, if the daily agreed maximum quantity of G-CDR generation is exceeded for a subscriber IMSI, the subscriber's IMSI/ICCID will be flagged and automatically reported to the control center administrator. The data in the report contains the following: IMSI, ICCID, quantity of G-CDRs, and SIM state (e.g., activated/purged/test ready, etc.). The account name can be gleaned by the account number and operator name. This data is made available for the administrator or operator to target and perform an action on either each IMSIs/ICCID (which identifies a subscriber), or for all offending IMSIs/ICCIDs by the account name. Alternatively, a control center processor or a rules engine may automatically implement a rule set based automated process to perform an action on either each ICCID (which identifies a subscriber), or for all offending IMSIs/ICCIDs by the account name. The actions include the five actions described above in connection with the SAI operations.

In one embodiment, a thumb rule can be provided to the control center processor or a rules engine and/or operators for any kind of network or connection failure at any stage of connection establishment. For example, it is acceptable for a mobile application to retry in case of connection or connectivity failure. However, the thumb rule may specify the following: the initial retries may be attempted no more frequently than once every minute, and no more than 4 times in succession; additional retries may occur at 15 minutes, 30 minutes, then every 60 minutes; i.e. at 1 (initial attempt), 2, 3, 4, 5, 15, 30, 60, 120, 180 minutes, etc.; and a mobile device cannot have more than four resets in sequence in 24 hours.

The field behaviors of mobile devices vary from one type/category of devices to another type/category of devices. For example, an M2M device category has a different behavior in field use from an emerging device category. Thus, the thumb rule is adapted to different categories of mobile devices.

Figure 8:
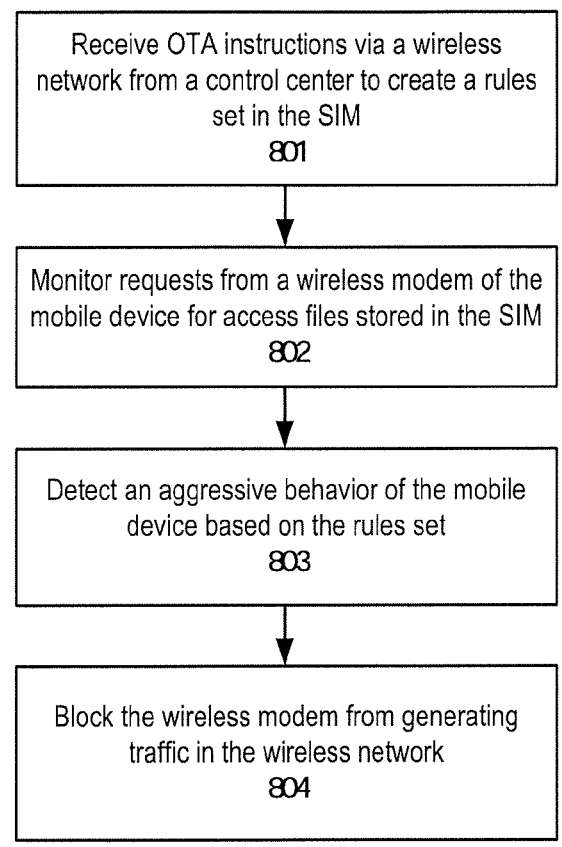
FIG. 8 is a flow diagram of one embodiment of a method for detecting and blocking the aggressive behavior of a mobile device.

FIG. 8 is a flow diagram illustrating a method for detecting and blocking the aggressive behavior of a mobile device according to one embodiment of the invention. The method may be performed by the mobile device (e.g., the mobile device 100 of FIG. 5). In one embodiment, the method may be performed by the SIM CMM 550 of FIG. 5. In alternative embodiments, the method may be implemented using different combinations of software, firmware, and/or hardware.

At step 801, the mobile device receives over-the-air instructions via a wireless network from a control center to create or modify a rules set in the SIM, where the rules set defines an acceptable behavior of the mobile device. At step 802, the mobile device (more specifically, the SIM) monitors requests from a wireless modem within the mobile device for access files stored in the SIM. At step 803, an aggressive behavior of the mobile device is detected based on the rules set. At step 804, the wireless modem is blocked from generating traffic in the wireless network.

The operations of the methods of FIGS. 4 and 8 have been described with reference to the exemplary embodiment of FIG. 5. However, it should be understood that the operations of the methods of FIGS. 4 and 8 can be performed by embodiments of the invention other than those discussed with reference to FIG. 5, and the embodiment discussed with reference to FIG. 5 can perform operations different from those discussed with reference to the methods of FIGS. 4 and 8. While the methods of FIGS. 4 and 8 show a particular order of operations performed by certain embodiments of the invention, it should be understood that such order is exemplary (e.g., alternative embodiments may perform the operations in a different order, combine certain operations, overlap certain operations, etc.).

Figure 9:
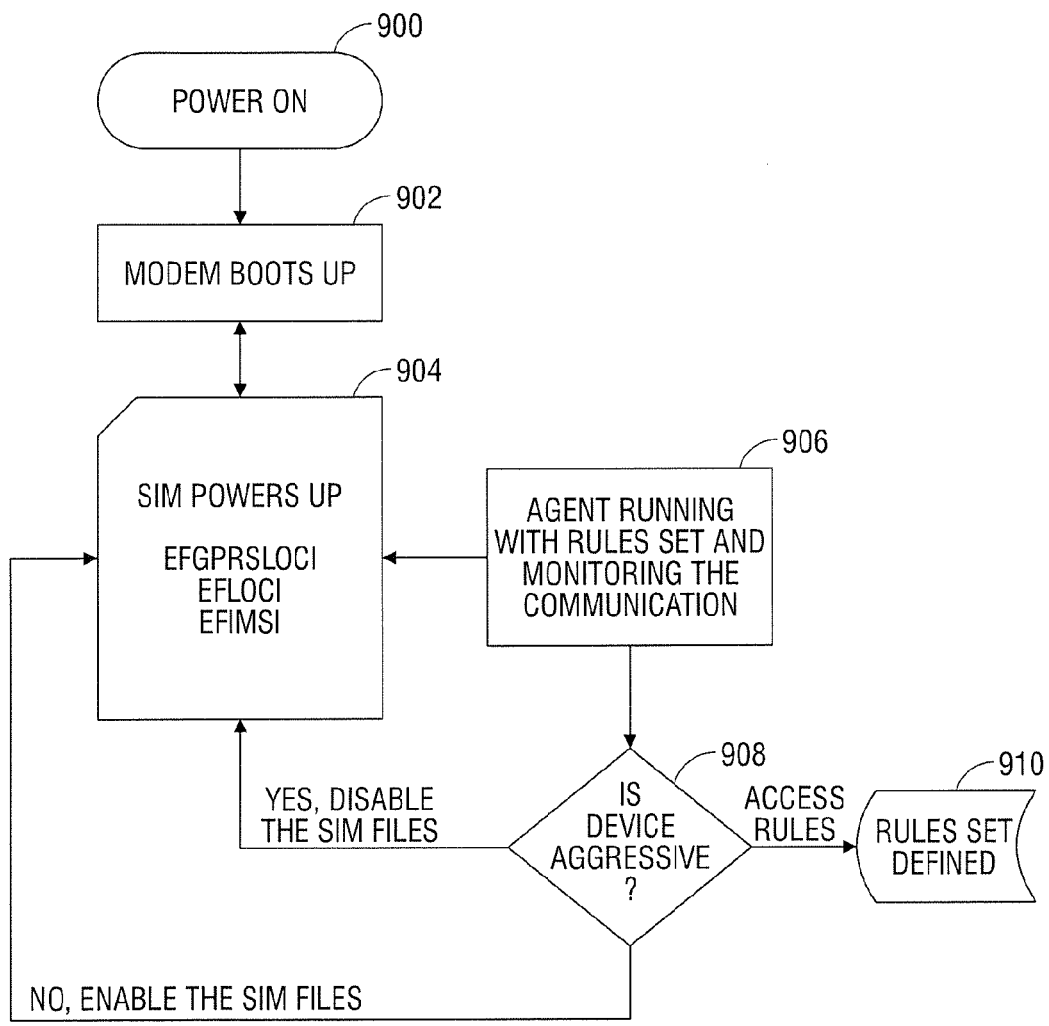
FIG. 9 is a flow diagram of one embodiment.

FIG. 9 is a high level flow diagram illustrating the operation of a SIM applet running or operating on a mobile device. At step 900 the mobile device is powered on. At 902 the mobile device modem boots up. At 904 the SIM powers up and a processor can access SIM files including EFgprsloci, EFloci, EFimsi, etc. At 906 the SIM applet/agent utilizing a rules set monitors communications between the modem and the SIM. During normal operation, the modem is accessing SIM files on a regular basis. An expected amount of access, or a threshold level, for each SIM file is predetermined for normal operation. At 908 the SIM agent determines if the mobile device is acting aggressively. The SIM agent is determining whether the modem is accessing certain SIM files beyond some expected level of operation, i.e. a predetermined threshold. At 910 the SIM agent may access the rules set for further information. If the SIM agent determines the mobile device is aggressive the SIM agent will disable the corresponding SIM file to prevent or throttle the aggressive behavior.

Figure 10:
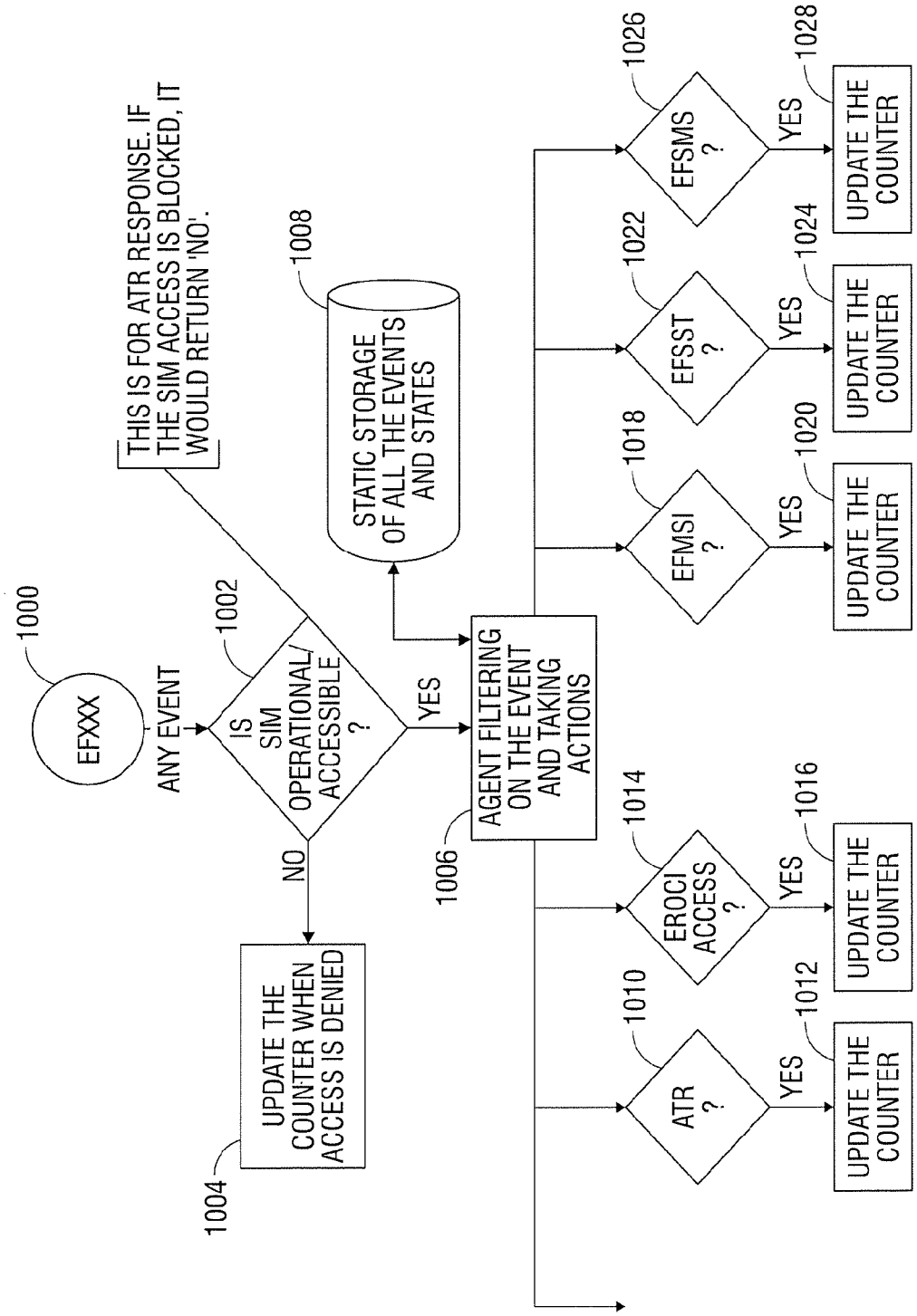
FIG. 10 is a flow diagram of one embodiment.

FIG. 10 is a flow diagram illustrating an embodiment of the operation of a SIM applet running on a mobile device. Aggressive behavior generally manifests itself in an abnormal amount of reset commands issued by the mobile application or OS. Typically M2M device developers employ logic that simply resets the modem in response to connectivity issues. For illustrative purposes, the logic of FIG. 10 is based on the modem attempting to access multiple SIM files (EFxxx) in response to an answer to reset (ATR) command issued by the mobile application or operating system.

In one embodiment, if the SIM applet determines that the mobile application or OS is acting aggressively, i.e., excessive resetting, the SIM applet may block access to SIM files. Thereafter, the SIM applet may employ a back-off counter and threshold mechanism that counts the number of ATR attempts while continuing to block access to SIM files until the count exceeds a threshold value, for example 20 counts. After 20 counts, any network related connectivity issue may have been resolved (network related connectivity issue is fixed) and the ATR can now then be allowed.

At step 1000 the modem requests access to multiple SIM files EFxxx. The SIM applet is constantly monitoring the pattern of accesses of SIM files by the modem. For example, the modem may access the EFimsi file every 30 seconds. The SIM applet would recognize abnormal or aggressive behavior if the modem attempts to access the EFimsi file beyond this expected pattern of operation.

At 1002 the SIM agent determines if the SIM is operational or accessible. If access to any of the SIM files has been previously blocked the SIM agent will determine that the SIM is not operational or accessible and in step 1004 the SIM agent will update a counter when the SIM access is denied, for example, previously determined aggressive ATR operations. For illustrative purposes, step 1004 may repeated several times when a back-off counter is employed in the case of previously determined aggressive ATRs. After a threshold count is exceeded for the back-off counter the SIM may now be flagged operational or accessible (step 1002).

If the SIM agent determines that the SIM is operational or accessible then the access to the SIM files proceeds and in step 1006 the SIM agent filters the specific access event and stores the event/access information in step 1008 in a static storage for all the events and states. In step 1010, if the access to multiple SIM files is in response to an ATR then a counter for the ATR is updated in step 1012. Exceeding a threshold count (or count/time period) for ATRs may trigger the SIM agent to determine aggressive behavior is present and that the SIM should now be flagged non-operational or not accessible (step 1002), then the next access to the SIM files should not proceed to step 1006 but diverts to step 1004 to implement the back-off counter.

Alternatively, in step 1014 if the access is to an EFloci file then a counter for the EFloci file is updated in step 1016. In step 1018, if the access is to an EFimsi file then a counter for the EFimsi file is updated in step 1020. In step 1022, if the access is to an EFsst file then a counter for the EFsst file is updated in step 1024. In step 1026, if the access is to an EFsms file then a counter for the EFsms file is updated in step 1028. The process is then repeated for access to any of the other EFxxx files.

The operations of the methods of FIGS. 9 and 10 have been described with reference to the exemplary embodiment of FIG. 5. However, it should be understood that the operations of the methods of FIGS. 9 and 10 can be performed by embodiments of the invention other than those discussed with reference to FIG. 5, and the embodiment discussed with reference to FIG. 5 can perform operations different from those discussed with reference to the methods of FIGS. 9 and 10. While the methods of FIGS. 9 and 10 show a particular order of operations performed by certain embodiments of the invention, it should be understood that such order is exemplary (e.g., alternative embodiments may perform the operations in a different order, combine certain operations, overlap certain operations, etc.).

This CIP application is based upon and claims the benefit of priority for prior U.S. patent application Ser. No. 12/387,962, now U.S. Pat. No. 8,391,161 filed on Mar. 7, 2009 the entire contents of which are incorporated herein by reference. U.S. Pat. No. 8,391,161 discloses a network status display system. In one embodiment, the network status display system comprises a processor 1406 further comprising diagnostic device software 1408 (see FIG. 14). In one embodiment, the network status display system may be a control center platform 180, 280 comprising hosted service platform 120 and CSP engines 125 (see FIGS. 1A, 1B) wherein processor 1406 and CSP engines 125 are equivalent.

The control center platform 180, 280 uses the following data sources: HLR SS7 logs, Radius authentication logs, Radius accounting records, GGSN CDRs, SMSC SMS logs, and the SIM Status.

The HLR SS7 logs are sent from HLRs to control center in near real time. The HLR SS7 logs are stored in a control center Vault server, a database that tracks the historical statistics on each IMSI. The HLR SS7 logs provides MSC/SGSN Locations (Location Updates and Cancel Locations) for each IMSI, including the carrier that it has registered with and Triplet Requests i.e., GSM authentication requests for each IMSI.

The Radius authentication logs are sent from Radius servers to control center in near real time. The Radius authentication logs are stored in a control center Authentication Database. The Radius authentication logs provide GPRS authentication successes and failures for each IMSI.

The Radius accounting records are sent from Radius servers to control center in near real time. The Radius accounting records are stored in a control center Usage Database. The Radius accounting records provide GPRS session information, including In-Session Status, Device IP address, SGSN address, duration, up/down bytes.

The GGSN CDRs are sent from GGSN to control center in near real time. The GGSN CDRs are stored in the control center Usage Database. The GGSN CDRs provide the data usage, including partial records with the incremental data usage in the middle of a session.

The SMSC SMS logs are sent from SMSC to control center in near real time. The SMSC SMS logs are stored in the control center Usage Database. The SMSC SMS logs provide SMS statistics, including the number, size, frequency, and delivery status per IMSI.

The SIM Status is tracked by the control center. The SIM Status is stored in the control center Provisioning Database. The SIM Status provides the SIM activation status, suspend status, overage limit status.

These data sources are also used by other parts of the control center platform. For example, a Network Guard function uses the Radius authentication logs to identify abusive SIMs (currently defined as the IMSIs that had more than 60 GPRS authentication failures per hour) and automatically blocks them from the network.

The network status display system comprises a display for correlating many types of historic events for a cellular device on a cellular network along a common timeline. Data is retrieved from a cellular device and from the systems that control the cellular network and is displayed in such a way so as to enable the user to identify problems, unusual behaviors, or inconsistencies. Controls on the network status display system additionally allow communication with the cellular device in order to gain (e.g., probe the system by actively controlling systems) further diagnostic information.

Figure 11:
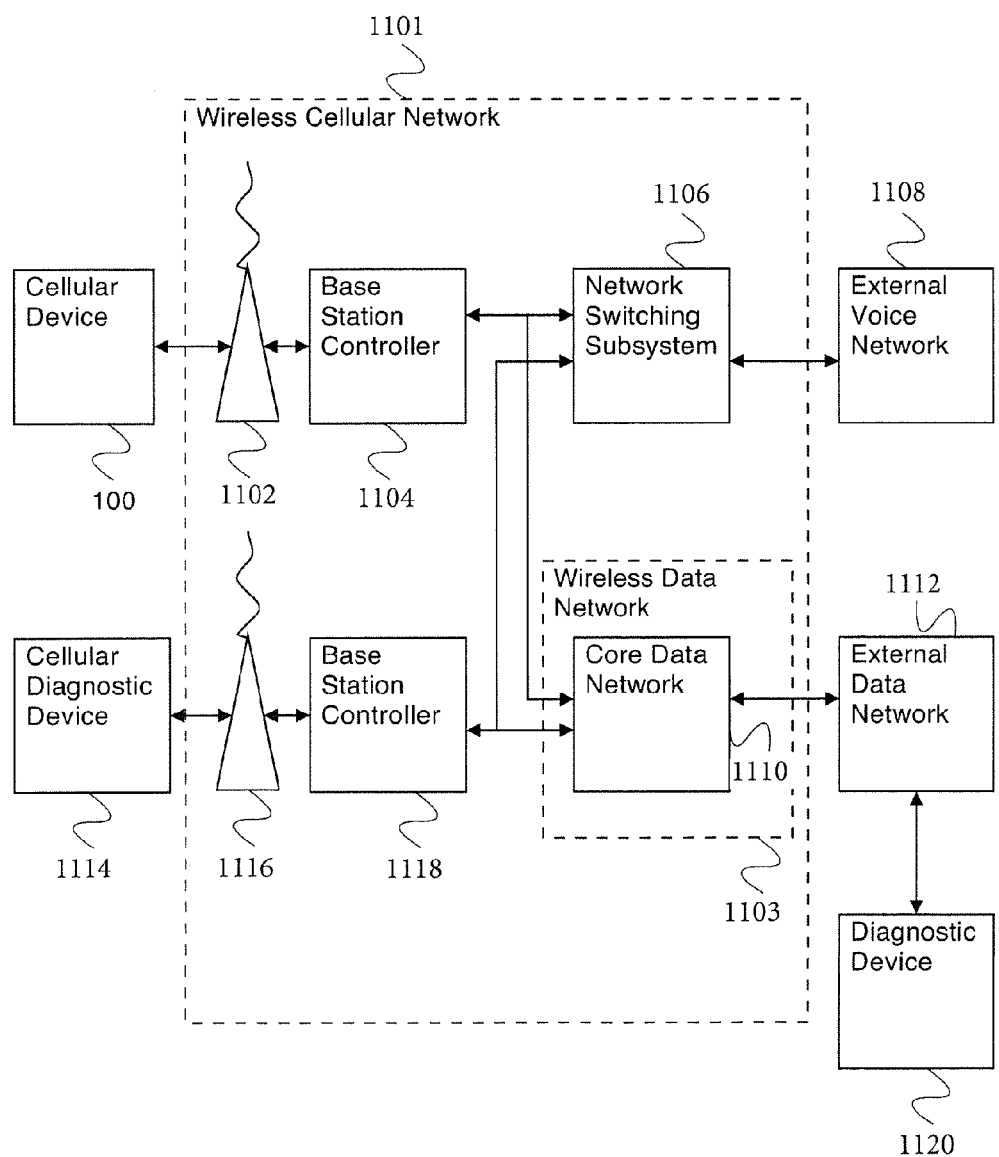
FIG. 11 is a block diagram illustrating an embodiment of a wireless cellular network with data network overlay.

FIG. 11 is a block diagram illustrating an embodiment of a wireless cellular network with data network overlay. In the example shown, cellular device 100 comprises a communications device that uses wireless cellular network 1101 and wireless data network 1103. In some embodiments, wireless cellular network 1101 comprises a global system for mobile communications (GSM) network and wireless data network 1103 comprises a general packet radio service (GPRS) network. In some embodiments, cellular network 1101 and data network 1103 comprise a cellular network and a data network other than a GSM network and a GPRS network. In various embodiments, cellular device 100 comprises a cellular telephone, a mobile smart phone with data transfer capability, a mobile data communications device, a network interface for a wireless data processing device, or any other appropriate mobile communications device. Wireless cellular network 1101 allows a user of cellular device 100 to engage in voice communications with devices accessed through external voice network 1108 and data communications with devices accessed through external data network 1112. Cellular device 100 communicates with wireless cellular network 1101 via cellular base station 1102. Base station 1102 contains a radio transmitter and receiver for communicating with cellular devices (e.g., cellular device 100) and a communications system for communicating with base station controller 1104. Base station controller 1104 controls base station 1102 and enables communication with external voice network 1108 via network switching subsystem 1106 and with external data network 1112 via core data network 1110. In various embodiments, base station controller controls one base station, two base stations, ten base stations, or any other appropriate number of base stations.

Network switching subsystem 1106 controls voice network switching, maintains a register of cellular device locations, and connects the GSM network with external voice network 1108. External voice network 1108 is a voice telephony network for connecting various voice telephony devices. In various embodiments, external voice network 1108 comprises a public switched telephone network, a private voice telephony network, or any other appropriate voice telephony network. By enabling cellular device 100 to connect to external voice network 108, a user of cellular device 100 is able to have a verbal conversation with another user of a device that is directly or indirectly connected to external voice network 1108 (e.g., a cell phone user, a wired telephone user, an internet telephone user—for example, a voice over internet protocol user). For example, a user can use cellular device 100 to make a telephone call to someone. Core data network 1110 controls data communications switching and connects cellular network 1101 with external data network 1112. External data network 1112 comprises a data communications network for connection various data communications devices. External data network 1112 comprises one or more of the following: a local area network, a wide area network, a wired network, a wireless network, the Internet, a fiber network, a storage area network, or any other appropriate network enabling communication. By enabling cellular device 100 to connect to external data network 1112, a user of cellular device 100 or cellular device 100 itself can interact with other devices or servers or applications running on other devices or servers via external data network 1112. For example, cellular device 100 can contact a server to inquire about a transaction (e.g., a credit card authorization for a purchase).

Cellular diagnostic device 1114 comprises a cellular device configured for diagnostic operations on a wireless network. Cellular diagnostic device 1114 communicates with wireless cellular network 1101 via base station 1116. In some embodiments, base station 1116 is the same base station as base station 1102. Base station controller 1118 controls base station 1116 and enables communication with external voice network 1108 via network switching subsystem 1106 and with external data network 1112 via core data network 1110. In some embodiments, base station controller 1118 is the same base station controller as base station controller 1104. Cellular diagnostic device 1114 is able to run diagnostic operations on a cellular device (e.g., cellular device 100) communicating with wireless cellular network 1101, and to display diagnostic information. In various embodiments, cellular diagnostic device 1114 comprises a cellular telephone, a mobile smart phone with data transfer capability, a mobile data communications device, a network interface for a wireless data processing device, or any other appropriate mobile communications device.

Diagnostic device 1120 communicates with wireless cellular network 1101 via external data network 1112 and core data network 1110. Diagnostic device 1120 is able to run diagnostic operations on a cellular device (e.g., cellular device 100) communicating with wireless cellular network 1101, and to display diagnostic information. In various embodiments, diagnostic device 1120 comprises a computer, a network enabled data device, a network appliance, or any other appropriate network enabled device.

Figure 12:
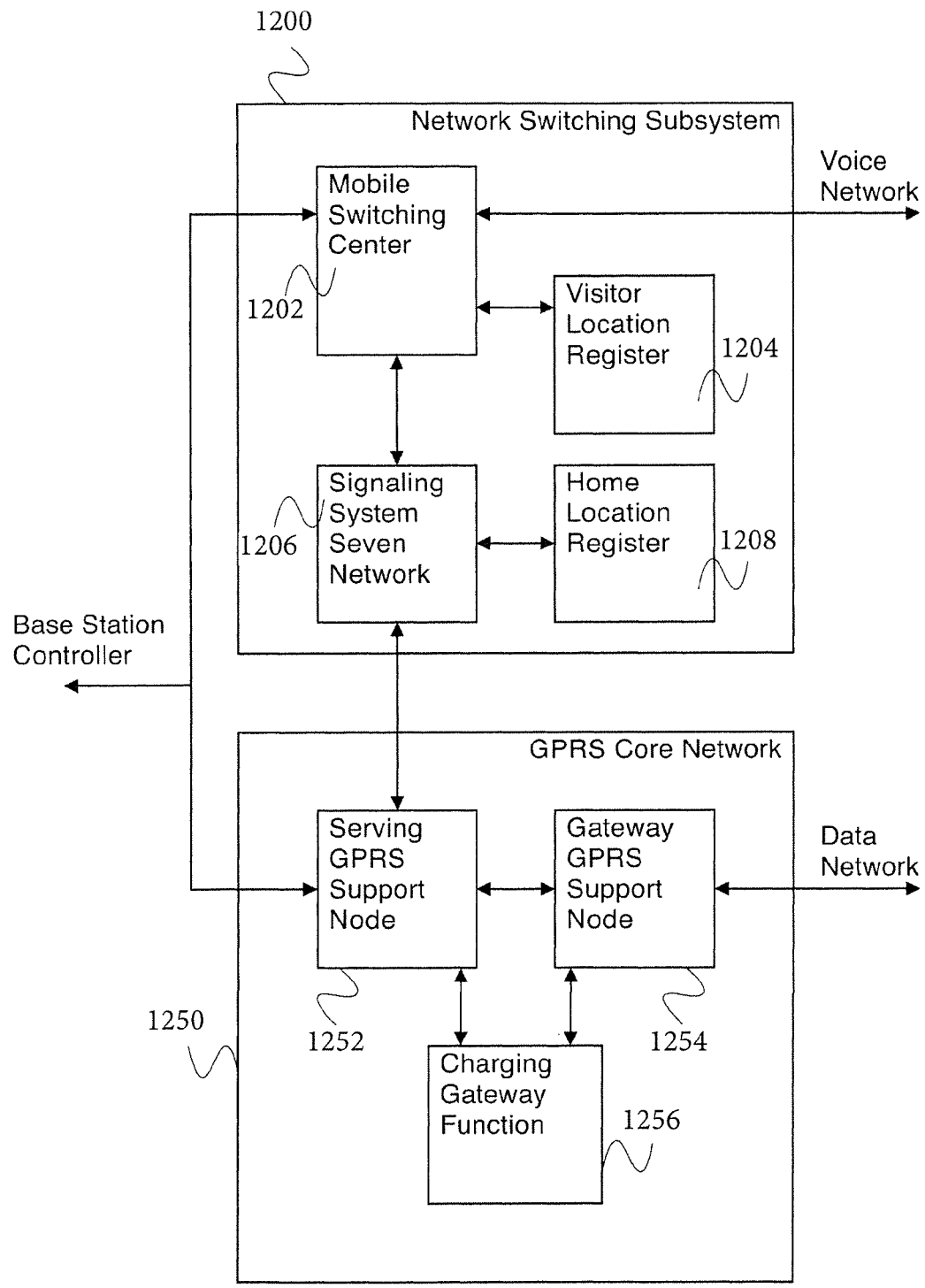
FIG. 12 is a block diagram illustrating an embodiment of a network switching subsystem.

FIG. 12 is a block diagram illustrating an embodiment of a network switching subsystem. In some embodiments, network switching subsystem 1200 implements network switching subsystem 1106 of FIG. 11. In the example shown, network switching subsystem 1200 comprises mobile switching center 1202, signaling system seven network 1204, visitor location register 1206, and home location register 1208. Mobile switching center 1202 controls (e.g., maintains the connection as a cellular device moves between base stations), sets up (e.g., accesses an external network to create a connection) and releases (e.g., accesses an external network to destroy a connection) a voice connection between a cellular device (e.g., cellular device 100 of FIG. 11) and another voice communication device (e.g., a voice communication device accessed through external voice network 1108 of FIG. 11). In some embodiments, mobile switching center 1202 additionally tracks the time of the voice connection for the purpose of charging cellular device 100. Visitor location register 1204 communicates with mobile switching center 1202. In some embodiments, visitor location register 1204 is integrated as a part of mobile switching center 1202. Visitor location register 1204 maintains a list of cellular devices that have roamed into the area served by mobile switching center 1202 along with a set of attributes describing each cellular device. In the event that a connection needs to be made to a cellular device while it is roaming in the network served by mobile switching center 1202 (e.g., the cellular device receives a phone call) the device attributes (e.g., type of device, current device location, device account type) are retrieved from visitor location register 1204 in order to properly make the connection. Home location register 1208 maintains a list of cellular devices whose home network is that of network switching system 1200. In various embodiments, a cellular device home network comprises the network served by a single base station (e.g., base station 1102 of FIG. 11), the network served by a single base station controller (e.g., base station controller 1104 of FIG. 11), the network served by a plurality of base station controllers, the entire network of a cellular carrier, or any other appropriate network. When a device leaves its home network, the visitor location register for the network the device has roamed to communicates with the home location register in the home network for the device via signaling system seven network 1206. When home location register 1208 of the home network of the cellular device has confirmed to visitor location register 1204 of the network the device has roamed to that it can allow the device to use its network (e.g., the network associated with home location register 1208), the device is added to visitor location register 1204, and mobile switching center 1202 sets up the communication.

In some embodiments, GPRS core network 1250 implements GPRS core network 1110 of FIG. 11. In the example shown, GPRS core network 1205 comprises serving GPRS support node (SGSN) 1252, gateway GPRS support node (GGSN) 1254, and charging gateway function 1256. SGSN 1252 sends data packets to and receives data packets from a cellular device (e.g., cellular device 100 of FIG. 11) and communicates data with GGSN 1254. SGSN 1252 also retrieves information about roaming devices by contacting home location register 1208 of the home network of the roaming device, via signaling system seven network 1206. GGSN 1254 serves as an interface between GPRS core network 1250 and an external data network (e.g., external data network 1112 of FIG. 1). GGSN 1254 communicates with SGSN 1252 and with the external data network, and translates the data packets into the appropriate formats for the devices on each side. In some embodiments, there is more than one GGSN in a given GPRS core network, each GGSN connecting to the same SGSN. In some embodiments, each GGSN connects to the same external data network. In some embodiments, a plurality of GGSNs connect to one or more different data networks. Charging gateway function 1256 communicates with SGSN 1252 and GGSN 1254 and tracks the total amount to charge each cellular device connected to GPRS core network 1250. A charging session by a charging gateway function is known as a charging data record (CDR). In some embodiments, a single data session can be charged as a plurality of sequential CDRs.

Figure 13:
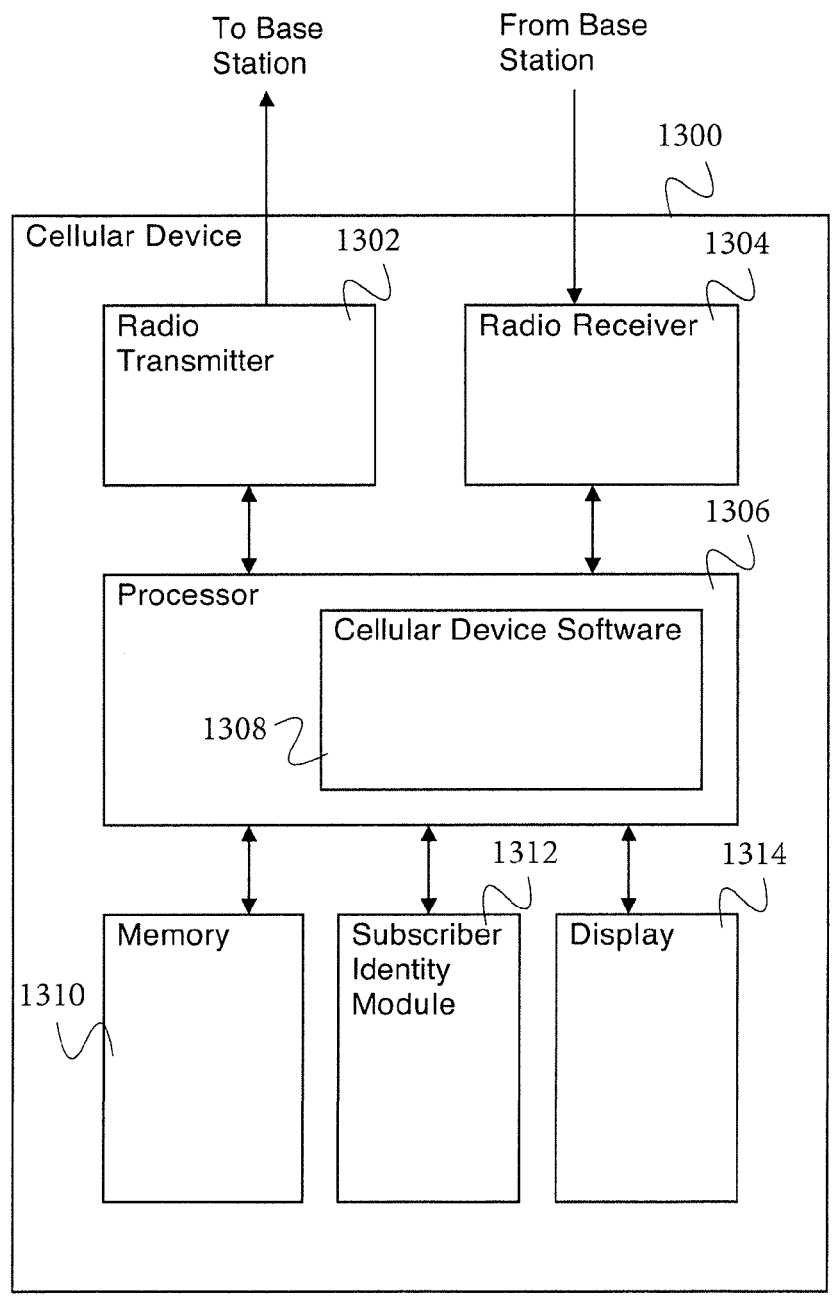
FIG. 13 is a block diagram illustrating an embodiment of a cellular device.

FIG. 13 is a block diagram illustrating an embodiment of a cellular device 1300. In some embodiments, cellular device 1300 comprises cellular device 100 of FIG. 11 and mobile device 100 of FIGS. 1A and 1B and FIG. 5. In some embodiments, cellular device 1300 comprises the SIM 311 further comprising the SIM files 530 and SIM connection manager module 550 shown in mobile device 100 of FIG. 5. In one embodiment, all of the previous description and discussion of the functionality of the mobile device 100 applies to the cellular device 1300.

In the example shown, cellular device 1300 comprises radio transmitter 1302, radio receiver 1304, processor 1306, memory 1310, subscriber identity module 1312, and display 1314. Radio transmitter 1302 and radio receiver 1304 communicate with a base station (e.g., base station 1102 of FIG. 11) using wireless radio communication. For example, radio transmitter 1302 and radio receiver 1304 communicate according to the GSM standard. In various embodiments, radio transmitter 1302 and/or radio receiver 1304 communicate using frequency modulated signals, phase modulated signals, amplitude modulated signals, time division multiplexing signals, code division multiplexing signals, or signals encoded using any other appropriate communication scheme or protocol. In various embodiments, radio transmitter 1302 and/or radio receiver 1304 communicate in the medium frequency band, the high frequency band, the very high frequency band, the ultra-high frequency band, or any other appropriate frequency band. In various embodiments, radio transmitter 1302 and/or radio receiver 1304 communicate voice signals, data signals, text signals (e.g., short message service (SMS)), configuration and/or registration signals, or any other appropriate kinds of signals. Radio transmitter 1302 and radio receiver 1304 receive instructions and communicate data with the rest of cellular device 1300 via processor 1306. Processor 1306 controls cellular device 1300. Processor 1306 communicates with radio transmitter 1302 and radio receiver 1304, as well as with memory 1310, subscriber identity module 1312, and display 1314. Processor 1306 executes a set of instructions to control the device—for example, instructions in the form of software or code (e.g., designated as cellular device software 1308 in FIG. 13). In some embodiments, cellular device software 1308 is stored in digital memory (e.g., random access memory, read only memory, programmable read only memory, memory 1310, or any other appropriate storage for storing software for processing by a processor). Memory 1310 acts as temporary and/or long-term information storage for processor 1306 as it is controlling cellular device 1300. Subscriber identity module (SIM) 1312 comprises a removable module for an identifying number that cellular device 1300 uses to identify the user of cellular device 1300 to the network. In one embodiment, SIM 1312 comprises SIM 311 of FIG. 5. In various embodiments, SIM 1312 stores an international subscriber identity module (IMSI) number, an integrated circuit card identifier (ICCID) number, a serial number, or any other appropriate identifying number. Display 1314 comprises a display for displaying information to a user. In various embodiments, information comprises device status information, user interface information, diagnostic information, network information, SMS information, or any other appropriate information.

In some embodiments, cellular device 1300 comprises a cellular diagnostic device (e.g., cellular diagnostic device 1114 of FIG. 11), and cellular device software 1308 comprises cellular diagnostic software. In various embodiments, cellular diagnostic software comprises software for determining the status of a cellular network (e.g., cellular network 1101 of FIG. 11), software for determining the status of a cellular device (e.g., cellular device 100 of FIG. 11), software for sending diagnostic messages to a cellular device, software for displaying the status of a cellular network, software for displaying the status of a cellular device, or any other appropriate cellular diagnostic software. In some embodiments, cellular device software 1308 comprises software for a network status display. In some embodiments, display 1314 comprises a diagnostic display. In various embodiments, a diagnostic display comprises a display for displaying the status of a cellular network, a display for displaying the status of a cellular device, a display for displaying user interface information for diagnostic software, or a display for any other appropriate diagnostic information. In some embodiments, display 1314 comprises a network status display.

Figure 14:
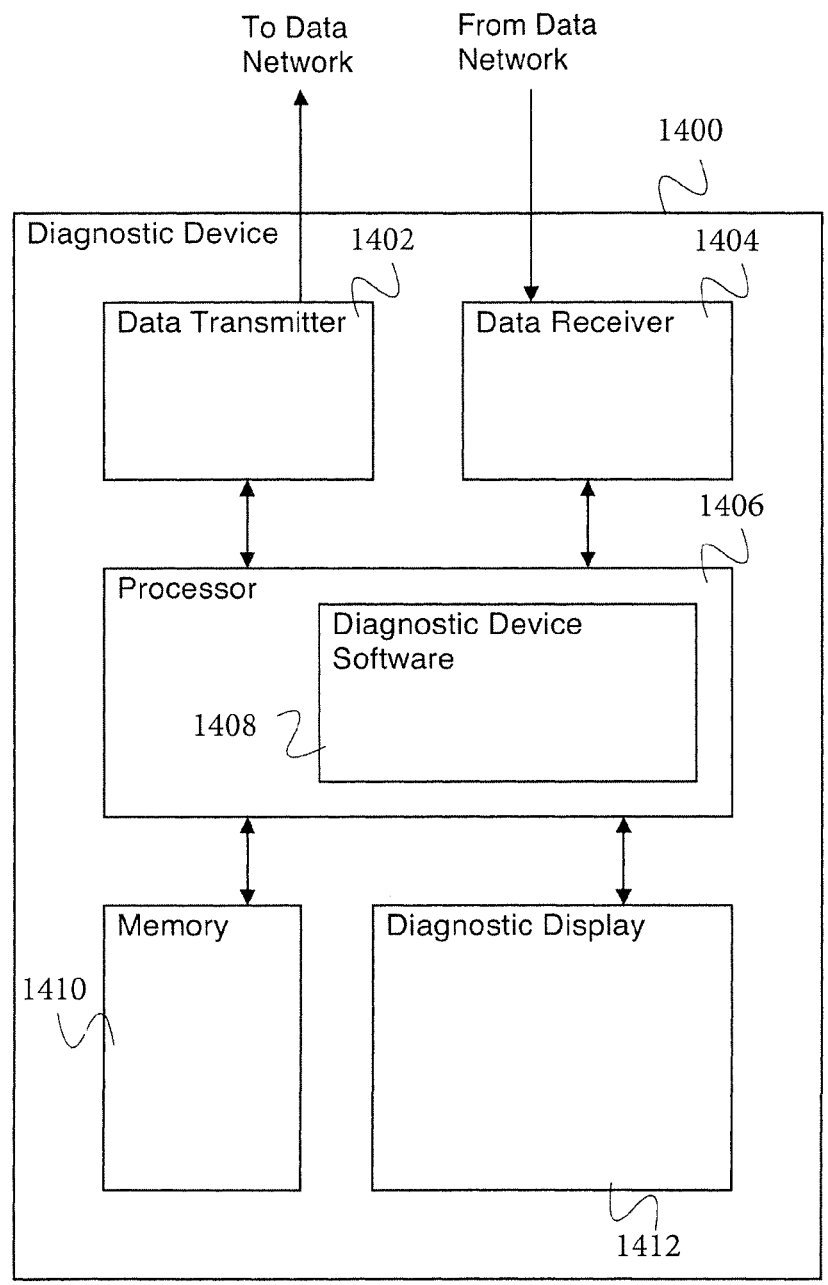
FIG. 14 is a block diagram illustrating an embodiment of a diagnostic device.

FIG. 14 is a block diagram illustrating an embodiment of a diagnostic device. In some embodiments, diagnostic device 1400 comprises diagnostic device 1120 of FIG. 11. In one embodiment, diagnostic device 1400 comprises a control center 180, 280 comprising hosted service platform 120 and CSP engines 125 (see FIGS. 1A, 1B) wherein processor 1406 and CSP engines 125 are equivalent. In the example shown, diagnostic device 1400 comprises data transmitter 1402, data receiver 1404, processor 1406, memory 1410, and diagnostic display 1412. Data transmitter 1402 and data receiver 1404 communicate with a wireless network (e.g., wireless cellular network 1101 of FIG. 11) via a data network (e.g., external data network 1112 of FIG. 11). In some embodiments, diagnostic device 1400 uses data transmitter 1402 and data receiver 1404 to communicate with a cellular device (e.g., cellular device 100) via a wireless network. In various embodiments, data transmitter 1402 and/or data receiver 1404 communicate data signals, voice signals, text signals (e.g., short message service (SMS)), configuration and/or registration signals, or any other appropriate kinds of signals. Data transmitter 1402 and data receiver 1404 receive instructions and communicate data with the rest of diagnostic device 1400 via processor 1406. Processor 1406 controls diagnostic device 1400. Processor 1406 communicates with data transmitter 1402 and data receiver 1404, as well as with memory 1410 and display 1412. Processor 1406 executes a set of instructions to control the device—for example, instructions in the form of software or code (e.g., designated as diagnostic device software 1408 in FIG. 14). In some embodiments, diagnostic device software 1408 is stored in digital memory (e.g., random access memory, read only memory, programmable read only memory, memory 1410, or any other appropriate storage for storing software for processing by a processor). Memory 1410 acts as temporary and/or long-term information storage for processor 1406 as it is controlling diagnostic device 1400. Diagnostic display 1414 comprises a display for displaying information to a user. In various embodiments, information comprises device status information, user interface information, diagnostic information, network information, SMS information, or any other appropriate information.

In various embodiments, diagnostic device software comprises software for determining the status of a cellular network (e.g., cellular network 1101 of FIG. 11), software for determining the status of a cellular device (e.g., cellular device 100 of FIG. 11), software for sending diagnostic messages to a cellular device, software for displaying the status of a cellular network, software for displaying the status of a cellular device, or any other appropriate cellular diagnostic software. In some embodiments, diagnostic device software 1408 comprises software for a network status display. In various embodiments, a diagnostic display comprises a display for displaying the status of a cellular network, a display for displaying the status of a cellular device, a display for displaying user interface information for diagnostic software, or a display for any other appropriate diagnostic information. In some embodiments, display 1412 comprises a network status display.

Figure 15A:
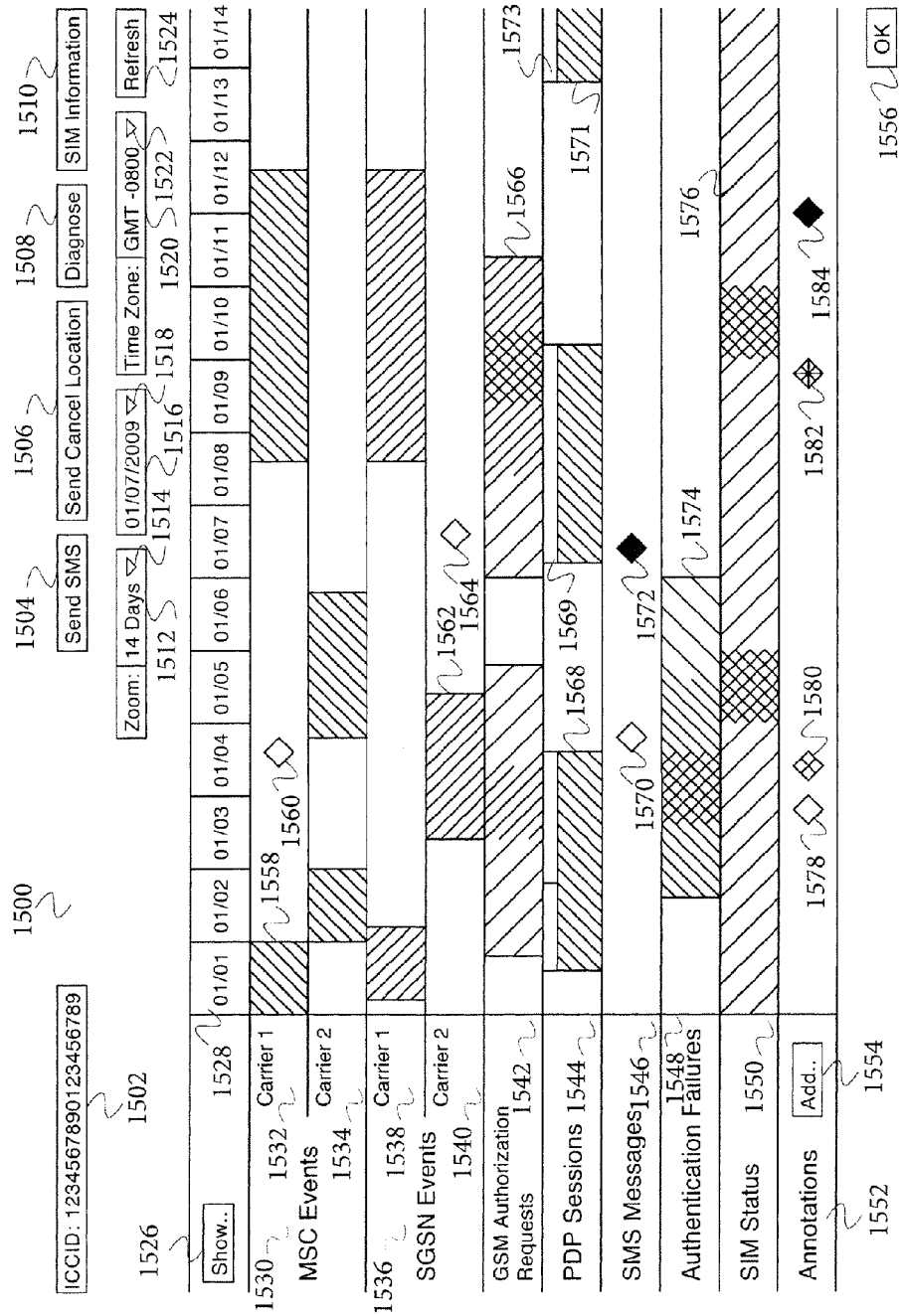
FIG. 15A is a diagram illustrating an embodiment of a network diagnostic display.

FIG. 15A is a diagram illustrating an embodiment of a network diagnostic display. In some embodiments, the network diagnostic display is part of the graphical user interface for displaying information of communication data streams as time-correlated lanes. In some embodiments, the network diagnostic display 1500 displays the status of cellular device 100 of FIG. 11, identified by its SIM (e.g., SIM 1312 of FIG. 13). In some embodiments, network diagnostic display 1500 is displayed on a diagnostic device (e.g., cellular diagnostic device 1114 of FIG. 11 or diagnostic device 1120 of FIG. 11), on a diagnostic display (e.g., display 1314 of FIG. 13 or diagnostic display 1412 of FIG. 14). In the example shown, network diagnostic display 1500 comprises displayed data and user interaction controls. Displayed data comprises ICCID 1502, zoom display 1512, date display 1516, time zone display 1520, dates 1528, mobile switching center (MSC) events data 1530, SGSN events data 1536, GSM Authorization requests data 1542, packet data protocol (PDP) sessions data 1544, SMS messages data 1546, PDP Context failures data 1548, SIM status data 1550, and annotations data 1552. User interaction controls comprise send SMS button 1504, send cancel location 1506 button, diagnose button 1508, SIM information button 1510, zoom menu button 1514, date menu button 1518, time zone menu button 1522, refresh button 1524, show rows button 1526, add annotation button 1554, and OK button 1556.

ICCID 1502 comprises the ICCID for the SIM (e.g., SIM 1312 of FIG. 13) associated with the cellular device whose data is displayed in display 1500. Dates 1528 comprise the dates over which data is displayed in the data rows. The range of dates 1528 over which data is displayed is displayed in zoom display 1512 and can be modified by a user by clicking on zoom menu button 1514. In some embodiments, the available date ranges comprise 30 days, 14 days, 7 days, 3 days, 1 day, 12 hours, 4 hours, 30 minutes, and 5 minutes. In various embodiments, available date ranges include any other date ranges, include date ranges input by the user, or include date ranges set in any other appropriate way. In some embodiments, the default date range is one day. In some embodiments, the user interface also includes zoom in and zoom out buttons. Zoom in and zoom out buttons raise or lower the zoom level to the next appropriate zoom level with a single click by the user. In some embodiments, double clicking in a window is associated with a zoom in or zoom out command. The date upon which range of dates 1528 is centered is displayed in date display 1516 and can be modified by a user by clicking on date menu button 1518. In some embodiments, clicking and dragging on the background of display 1500 can modify the center of range of dates 1528. In some embodiments, range of dates 1528 defaults to display the most recently acquired data. The time zone to which range of dates 1528 is referred is displayed in time zone display 1520 and can be modified by a user by clicking on time zone menu button 1522. In some embodiments, the time zone to which range of dates 1528 is referred defaults to the current time zone in the physical location of the user. Data displayed in display 1500 can be refreshed to the current time by clicking on refresh button 1524.

In the example shown, display 1500 includes one or more rows of data. The rows of data can include MSC Events data 1530, SGSN Events data 1536, GSM Authorization Requests data 1542, PDP Sessions data 1544, SMS Messages data 1546, Radius Failures data 1548, SIM Status data 1550, and Annotations data 1552. A user can modify the set of rows displayed by clicking on show button 1526. Show button 1526 brings up a menu of data rows and allows the user to select whether each row should be displayed. MSC Events row 1530 displays location updates for any MSCs (e.g. MSC 1202 of FIG. 12) on which the SIM has registered in the currently displayed time range. If the SIM has registered with multiple MSCs during the displayed time range, one sub-row (e.g., sub-row 1532 or sub-row 1534) is displayed for each MSC the SIM has registered with. Each MSC Events data sub-row displays shaded areas (e.g., shaded area 1558) corresponding to times when the SIM has been registered with the associated MSC. Each MSC Events data sub-row additionally displays icons (e.g., icon 1560) corresponding to points in time when an unmatched register or disconnect event is found (e.g., a register or disconnect event without a disconnect or register event to match it to). SGSN Events row 1536 displays location updates for any SGSNs (e.g., SGSN 1252 of FIG. 12) on which the SIM has registered in the currently displayed time range. If the SIM has registered with multiple SGSNs during the displayed time range, one sub-row (e.g., sub-row 1538 or sub-row 1540) is displayed for each SGSN the SIM has registered with. Each SGSN Events data sub-row displays shaded areas (e.g., shaded area 1562) corresponding to times when the SIM has been registered with the associated SGSN. Each SGSN Events data sub-row may additionally display icons (e.g., icon 1564) corresponding to points in time when an unmatched register or disconnect event is found (e.g., a register or disconnect event without a disconnect or register event to match it to).

GSM Authorization Requests data row 1542 displays GSM Authorization requests made during the displayed time range. A GSM Authorization request is a connection request made to an HLR (e.g., HLR 1208 of FIG. 12). The GSM Authorization Requests data row displays shaded areas (e.g., shaded area 1566) or colored areas corresponding to times where GSM Authorization requests are made. The shade or color of the shaded or colored area corresponds to the number of GSM Authorization requests made in the displayed time period. In some embodiments, a light shade or a green color corresponds to between 1 and 30 requests made in the time period, a medium shade or a yellow color corresponds to between 31 and 100 requests made in the time period, and a dark shade or a red color corresponds to more than 100 requests made in the time period.

PDP Sessions data row 1544 displays PDP sessions established for the SIM within the displayed time range. The PDP Sessions data row displays shaded areas (e.g., shaded area 1568) corresponding to open PDP sessions for the SIM during the currently displayed time range. The PDP Sessions data row also displays boxes (e.g., box 1569) overlaid with the shaded areas corresponding to call detail records (CDR's) (e.g., CDR's established by charging gateway function 1256 of FIG. 12). If multiple CDR's exist for a single PDP sessions, boxes corresponding to the multiple CDR's are drawn adjacent to one another. Open PDP session box 1571 corresponds to a currently open PDP session, and open CDR session 1573 corresponds to its associated open CDR. SMS Messages data row 1546 displays SMS (e.g., short message service) messages sent to or from the SIM within the displayed time range. The SMS Messages data row displays icons (e.g., icon 1570 or icon 1572) corresponding to sent or received SMS messages. In some embodiments, an empty or white icon (e.g., icon 1570) corresponds to a sent SMS message and a filled or blue icon (e.g., icon 1572) corresponds to a received SMS message. Authentication Failures data row 1548 displays failed attempts to establish data sessions during the time range. The Authentication Failures data row displays shaded areas (e.g., shaded area 1574) or colored areas corresponding to failed attempts to establish data sessions. In some embodiments, a light shade or a green color corresponds to between 1 and 10 authentication failures within a given time period, a medium shade or a yellow color corresponds to between 10 and 30 authentication failures within a given time period, and a dark shade or a red bar corresponds to more than 30 authentication failures within a given time period.

SIM Status data row 1550 displays the ability of the SIM to establish a data session within the displayed time range. The SIM Status data row displays shaded areas (e.g., shaded area 1576) or colored areas corresponding to the ability of the SIM to establish a data session. In some embodiments, a light shade or a green color corresponds to the SIM having the ability to establish a data session, and a dark shade or a red color corresponds to the SIM not having the ability to establish a data session. Annotations data row 1552 displays notes describing event history made at given points in time. The Annotations data row displays icons (e.g., icon 1578, icon 1580, icon 1582, or icon 1584) corresponding to notes describing event history. In some embodiments, a filled or blue icon (e.g., icon 1584) corresponds to a manual annotation, an empty or white icon (e.g., icon 1578) corresponds to automatically retrieved SIM information, a lightly shaded or green icon (e.g., icon 1580) corresponds to a diagnostic result with no expected connectivity issues, and a darkly shaded or red icon (e.g., icon 1582) corresponds to a diagnostic result with expected connectivity issues. A user can add a manual annotation to Annotations data row 1552 by clicking Add button 1554.

A user of the display system can send an SMS message to the cellular device associated with the SIM by clicking Send SMS button 1504. In various embodiments, an SMS message can be used for communication with the person possessing the cellular device, to test communication with the cellular device, to send a diagnostic message to the device, or for any other appropriate purpose. A user of the display system can send a cancel location message to the cellular device associated with the SIM by clicking Cancel Location button 1506. The cancel location message causes the cellular device to cancel its current MSC location registration. A user of the display system can start a diagnostic process on the cellular device associated with the SIM by clicking Diagnose button 1508. The diagnostic is an automatic process on the cellular device for determining connectivity problems. In some embodiments, the diagnostic process requires additional information from the user of the display system and prompts the user for the required information. The user can request attribute information from the cellular device associated with the SIM by clicking SIM Information button 1510. Clicking the button displays the last known values of SIM attributes and allows the user to request them to be updated. In some embodiments, the SIM attributes comprise forbidden public land mobile networks (FPLMN), location information for the global packet radio system (LOCIGPRS), location information (LOCI,) and public land mobile network selector (PLMNsel).

FIG. 15B is a diagram illustrating an embodiment of a table of communication data stream information. In some embodiments, the table of FIG. 15B is a table for displaying information extracted from one or more communications data streams. In the example shown, the table includes column 1500 (e.g., with label Time), column 1502 (e.g., with label Event Type), column 1504 (e.g., with label Device), column 1506 (e.g., with label Network Element), and column 1508 (e.g., with label Comments). The table includes row 1510 (e.g., with label 12:30 PM on Jan. 1, 1901), row 1512 (e.g., with label 12:45 PM on Jan. 1, 1901), and row 1514 (e.g., with label 12:30 PM on Jan. 1, 1901), Column 1502 entries are: A for row 1510, B for row 1512, and A for row 1514. Column 1504 entries are: 1 for row 1510, 1 for row 1512, and 2 for row 1514. There are no entries for column 1508 in row 1510, row 1512, or row 1514.

Figure 16:
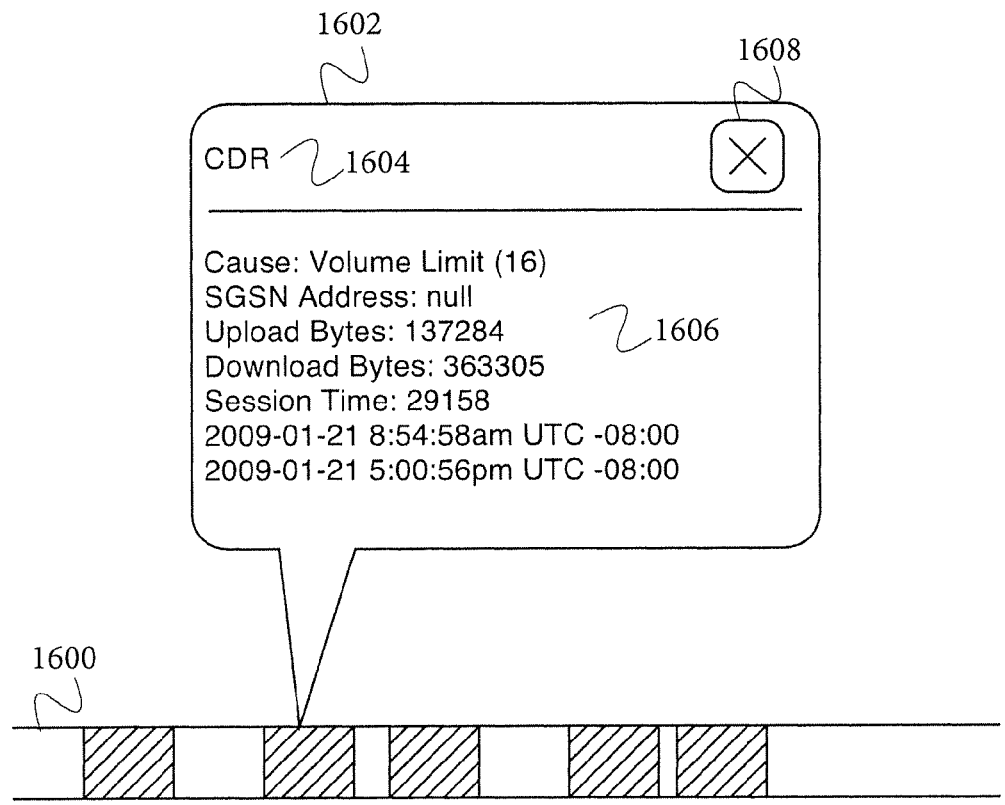
FIG. 16 is a diagram illustrating an embodiment of a data popup window.

FIG. 16 is a diagram illustrating an embodiment of a data popup window. In the example shown, data row 1600 is a data row (e.g., MSC Events data row 1530 of FIG. 15A, SGSN Events data row 1536 of FIG. 15A, HLR Requests data row 1542 of FIG. 15A, PDP Sessions data row 1544 of FIG. 15A, SMS Messages data row 1546 of FIG. 15A, Authentication Failures data row 1548 of FIG. 15A, SIM Status data row 1550 of FIG. 15A, or Annotations data row 1552 of FIG. 15A). Data popup window 1602 displays data. In some embodiments, data row 1600 and data popup window 1602 are part of a network diagnostic display (e.g., network diagnostic display 1500 of FIG. 15A). In some embodiments, data popup window 1602 is displayed when a user clicks on an event in data row 1600. In some embodiments, data popup window 1602 displays attributes of the clicked event. In the example shown, title 1604 comprises a title for a set of attributes of a clicked event, and data1 1606 comprises a set of attributes of a clicked event. Close box1 1608 causes the popup window to close when it is clicked.

In some embodiments, data row 1600 comprises MSC Events data row 1530 of FIG. 15. If a user clicks on a shaded area (e.g., shaded area 1558 of FIG. 15A) in MSC Events data row 1530 of FIG. 15A, a popup window (e.g., popup window 1602) is displayed. The title of the popup window comprises the global title (GT) address of the session, and the data in the popup window comprises the event type (e.g., "Location Update"), the carrier, the GT address, the IMSI number, the initial location update date and time, and the cancel location date and time. If the user clicks on an icon (e.g., icon 1560 of FIG. 15A) in MSC Events data row 1530 of FIG. 15A, a popup window is displayed. The title of the popup window comprises the GT address of the session, and the data in the popup window comprises the event type (e.g., "Location Update"), the carrier, the GT address, the IMSI number, and the event date and time.

In some embodiments, data row 1600 comprises SGSN Events data row 1536 of FIG. 15A. If a user clicks on a shaded area (e.g., shaded area 1562 of FIG. 15A) in SGSN Events data row 1536 of FIG. 15A, a popup window (e.g., popup window 1602) is displayed. The title of the popup window comprises the GT address of the session, and the data in the popup window comprises the event type (e.g., "Location Update"), the carrier, the GT address, the IMSI number, the initial location update date and time, and the cancel location date and time. If the user clicks on an icon (e.g., icon 1564 of FIG. 15A) in SGSN Events data row 1536 of FIG. 15A, a popup window is displayed. The title of the popup window comprises the GT address of the session, and the data in the popup window comprises the event type (e.g., "Location Update"), the carrier, the GT address, the IMSI number, and the event date and time.

In some embodiments, data row 1600 comprises GSM Authorization Requests data row 1542 of FIG. 15A. If a user clicks on a shaded area (e.g., shaded area 1566 of FIG. 15A) in MSC Events data row 1530 of FIG. 15A, a popup window (e.g., popup window 1602) is displayed. The title of the popup window comprises the number of GSM Authorization requests in the displayed time period, and the data in the popup window comprises the GSM Authorization request limit for the displayed color, the start date and time for the displayed time period, and the end date and time for the displayed time period.

In some embodiments, data row 1600 comprises PDP Sessions data row 1544 of FIG. 15A. If a user clicks on a shaded area (e.g., shaded area 1568 of FIG. 15A) in PDP Sessions data row 1544 of FIG. 15A, a popup window (e.g., popup window 1602) is displayed. The title of the popup window comprises the number of GSM Authorization requests in the displayed time period, and the data in the popup window comprises the GSM Authorization request limit for the displayed color, the start date and time for the displayed time period, and the end date and time for the displayed time period. If a user clicks on a box corresponding to a CDR (e.g., box 1569 of FIG. 15A), a popup window is displayed. The title of the popup window comprises the text "CDR", and the data in the popup window comprises the cause for the CDR closing, the SGSN GT address, the number of upload bytes during the CDR, the number of download bytes during the CDR, the session duration, the CDR start date and time, and the CDR end date and time.

In some embodiments, data row 1600 comprises SMS Messages data row 1546 of FIG. 15A. If a user clicks on an icon (e.g., icon 1570 or icon 1572 of FIG. 15A), a popup window (e.g., popup window 1602) is displayed. The title of the popup window comprises the text "SMS MO" for an outgoing SMS message, and the title of the popup window comprises the text "SMS MT" for an incoming SMS message. The data in the popup window comprises the message status, the MSISDN to which the message was sent, the MSISDN from which the message was sent, and the date and time the message was sent.

In some embodiments, data row 1600 comprises Authentication Failures data row 1548 of FIG. 15A. If a user clicks on a shaded area (e.g., shaded area 1574 of FIG. 15A), a popup window (e.g., popup window 1602) is displayed. The title of the popup window comprises the number of authentication failures in the displayed time period, and the data in the popup window comprises the authentication failure limit for the displayed color, the start date and time for the displayed time period, and the end date and time for the displayed time period.

In some embodiments, data row 1600 comprises SIM Status data row 1550 of FIG. 15A. If a user clicks on a shaded area (e.g., shaded area 1576 of FIG. 15A), a popup window (e.g., popup window 1602) is displayed. The title of the popup window comprises the text "SIM Status", and the data in the popup window comprises the status of the SIM state at the time corresponding to the click, the status of the suspended state at the time corresponding to the click, the status of the overage limit at the time corresponding to the click, the status of the overage limit override at the time corresponding to the click, the date and time when this combination of settings took effect, and the date and time when this combination of settings changed.

In some embodiments, data row 1600 comprises Annotations data row 1552 of FIG. 15A. If a user clicks on an icon (e.g., icon 1578, icon 1580, icon 1582, or icon 1584 of FIG. 15A), a popup window (e.g., popup window 1602) is displayed. The title of the popup window comprises the text "Annotation", and the data in the popup window comprises the text of the annotation. The popup window additionally comprises links that allow a user to delete or edit the annotation.

Figure 17A:
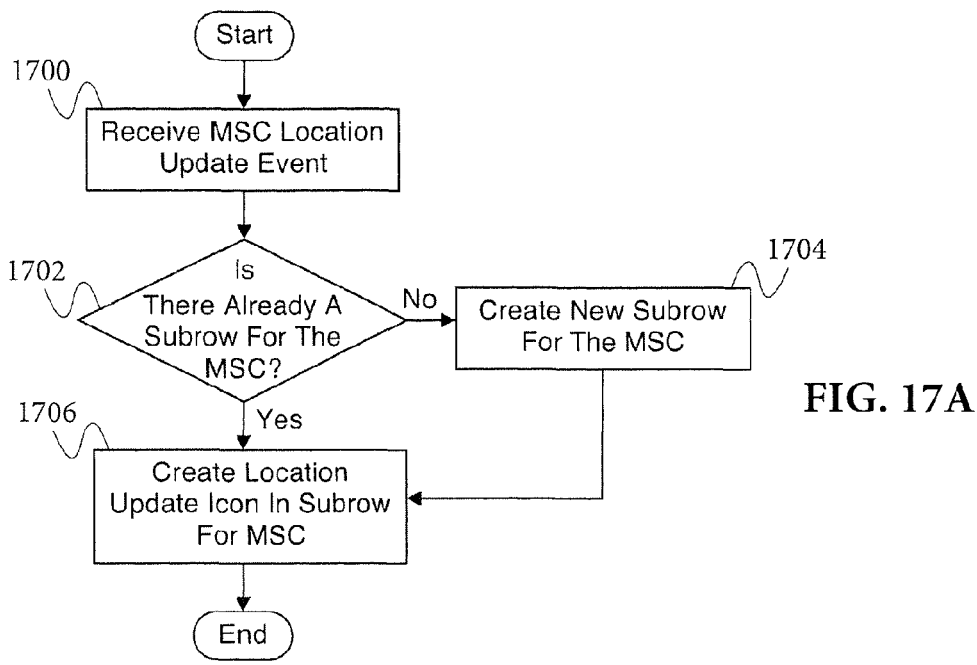
FIG. 17A is a flow diagram illustrating an embodiment of a process for updating a network status display in response to an MSC location update event.

FIG. 17A is a flow diagram illustrating an embodiment of a process for updating network status display in response to an MSC location update event. In some embodiments, the network status display is network status display 1500 of FIG. 15A. In the example shown, in 1700, an MSC location update event is received. In 1702, it is determined if there is already a subrow in the network status display for the MSC associated with the MSC location update event. If there is not already a subrow in the network status display for the MSC associated with the MSC location update event, control passes to 1704, where a new subrow in the network status display is created. The new subrow in the network status display is for the MSC associated with the MSC location update event. Control then passes to 1706. If there is already a subrow in the network status display for the MSC associated with the MSC location update event, control passes directly to 1706. In 1706, a location update icon (e.g., icon 1560 of FIG. 15A) is created in the subrow for the MSC associated with the MSC location update event (e.g., subrow 1532 of MSC Events data row 1530 of FIG. 15A), and the process ends.

Figure 17B:
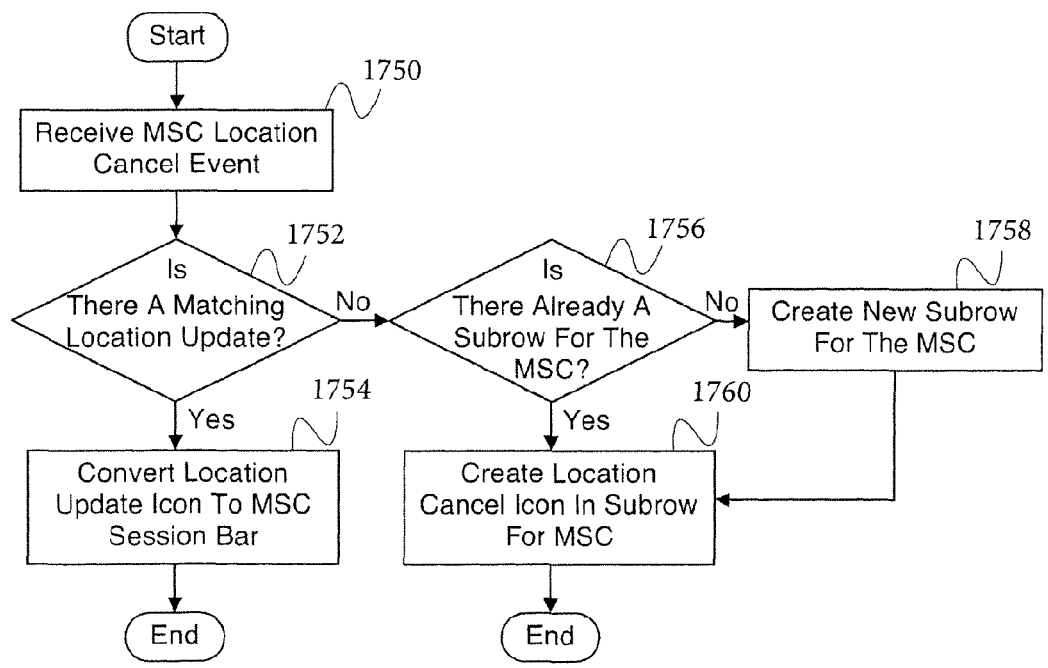
FIG. 17B is a flow diagram illustrating an embodiment of a process for updating a network status display in response to an MSC location cancel event.

FIG. 17B is a flow diagram illustrating an embodiment of a process for updating a network status display in response to an MSC location cancel event. In some embodiments, the network status display is network status display 1500 of FIG. 15A. In the example shown, in 1700, an MSC location cancel event is received. In 1752, it is determined if there is a matching location update. If there is a location update event that can be matched to the location cancel event to form an MSC session, control passes to 1754. In 1754, the location update icon is converted to an MSC session bar (e.g., MSC session bar 1558 of FIG. 15A). The MSC session bar begins at the point of the location update icon and ends at the time associated with the MSC location cancel event. If a matching location update is not found in 1752, control passes to 1756. In 1756, it is determined if there is already a subrow in the network status display for the MSC associated with the MSC location cancel event. If there is not already a subrow in the network status display for the MSC associated with the MSC location cancel event, control passes to 1758, where a new subrow in the network status display is created. The new subrow in the network status display is for the MSC associated with the MSC location cancel event. Control then passes to 1760. If there is already a subrow in the network status display for the MSC associated with the MSC location cancel event, control passes directly to 1760. In 1760, a location cancel icon (e.g., icon 1560 of FIG. 15A) is created in the subrow for the MSC associated with the MSC location update event (e.g., subrow 1532 of MSC Events data row 1530 of FIG. 15A), and the process ends.

Figure 18A:
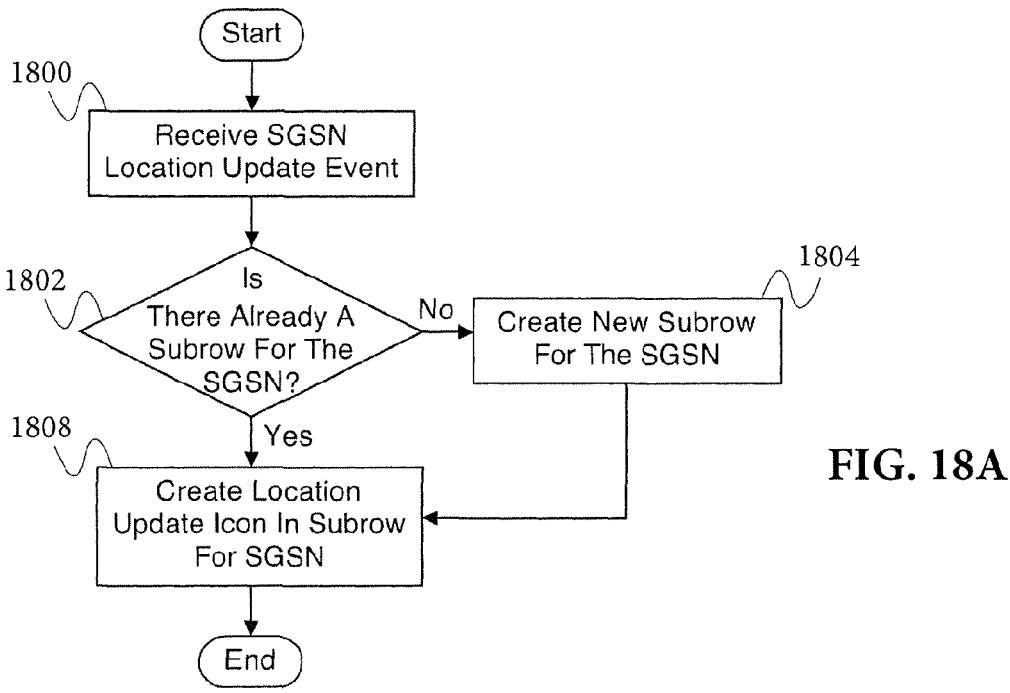
FIG. 18A is a flow diagram illustrating an embodiment of a process for updating a network status display in response to an SGSN location update event.

FIG. 18A is a flow diagram illustrating an embodiment of a process for updating a network status display in response to an SGSN location update event. In some embodiments, the network status display is network status display 1500 of FIG. 15A. In the example shown, in 1800, an SGSN location update event is received. In 1802, it is determined if there is already a subrow in the network status display for the SGSN associated with the SGSN location update event. If there is not already a subrow in the network status display for the SGSN associated with the SGSN location update event, control passes to 1804, where a new subrow in the network status display is created. The new subrow in the network status display is for the SGSN associated with the SGSN location update event. Control then passes to 1806. If there is already a subrow in the network status display for the SGSN associated with the SGSN location update event, control passes directly to 1806. In 1806, a location update icon (e.g., icon 1564 of FIG. 15A) is created in the subrow for the SGSN associated with the SGSN location update event (e.g., subrow 1540 of SGSN Events data row 1546 of FIG. 15A), and the process ends.

Figure 18B:
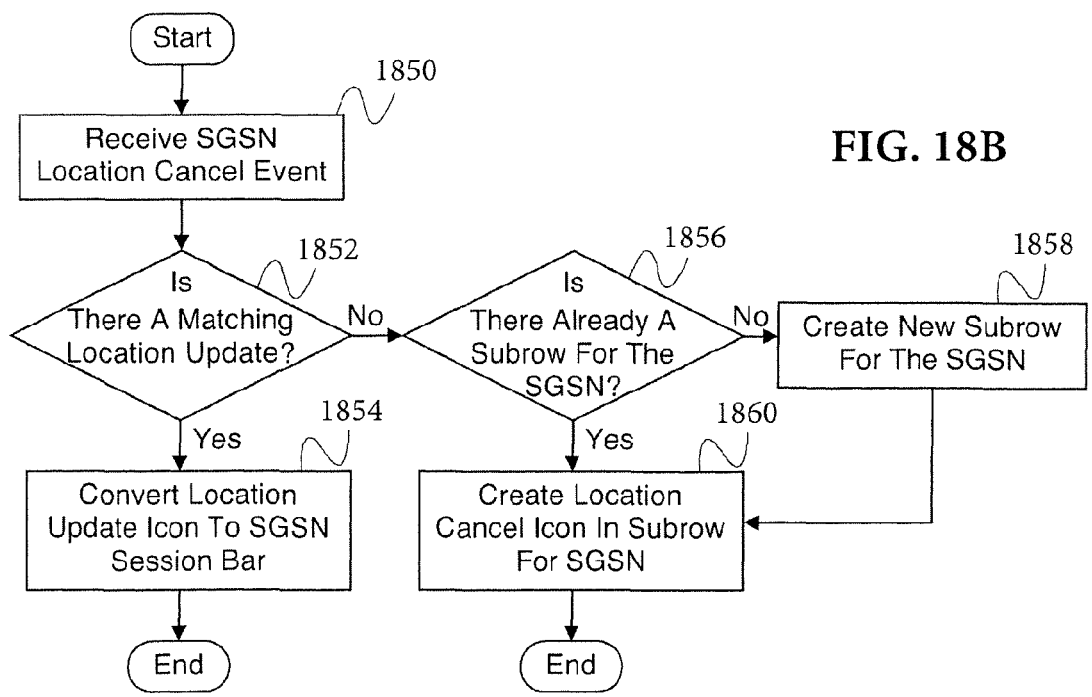
FIG. 18B is a flow diagram illustrating an embodiment of a process for updating a network status display in response to an SGSN location cancel event.

FIG. 18B is a flow diagram illustrating an embodiment of a process for updating a network status display in response to an SGSN location cancel event. In some embodiments, the network status display is network status display 1500 of FIG. 15A. In the example shown, in 1800, an SGSN location cancel event is received. In 1852, it is determined if there is a matching location update. If there is a location update event that can be matched to the location cancel event to form an SGSN session, control passes to 1854. In 1854, the location update icon is converted to an SGSN session bar (e.g., SGSN session bar 1562 of FIG. 15A). The SGSN session bar begins at the point of the location update icon and ends at the time associated with the SGSN location cancel event. If a matching location update is not found in 1852, control passes to 1856. In 1856, it is determined if there is already a subrow in the network status display for the SGSN associated with the SGSN location cancel event. If there is not already a subrow in the network status display for the SGSN associated with the SGSN location cancel event, control passes to 1858, where a new subrow in the network status display is created. The new subrow in the network status display is for the SGSN associated with the SGSN location cancel event. Control then passes to 1860. If there is already a subrow in the network status display for the SGSN associated with the SGSN location cancel event, control passes directly to 1860. In 1860, a location cancel icon (e.g., icon 1564 of FIG. 15A) is created in the subrow for the SGSN associated with the SGSN location update event (e.g., subrow 1540 of SGSN Events data row 1546 of FIG. 15A), and the process ends.

Figure 19:
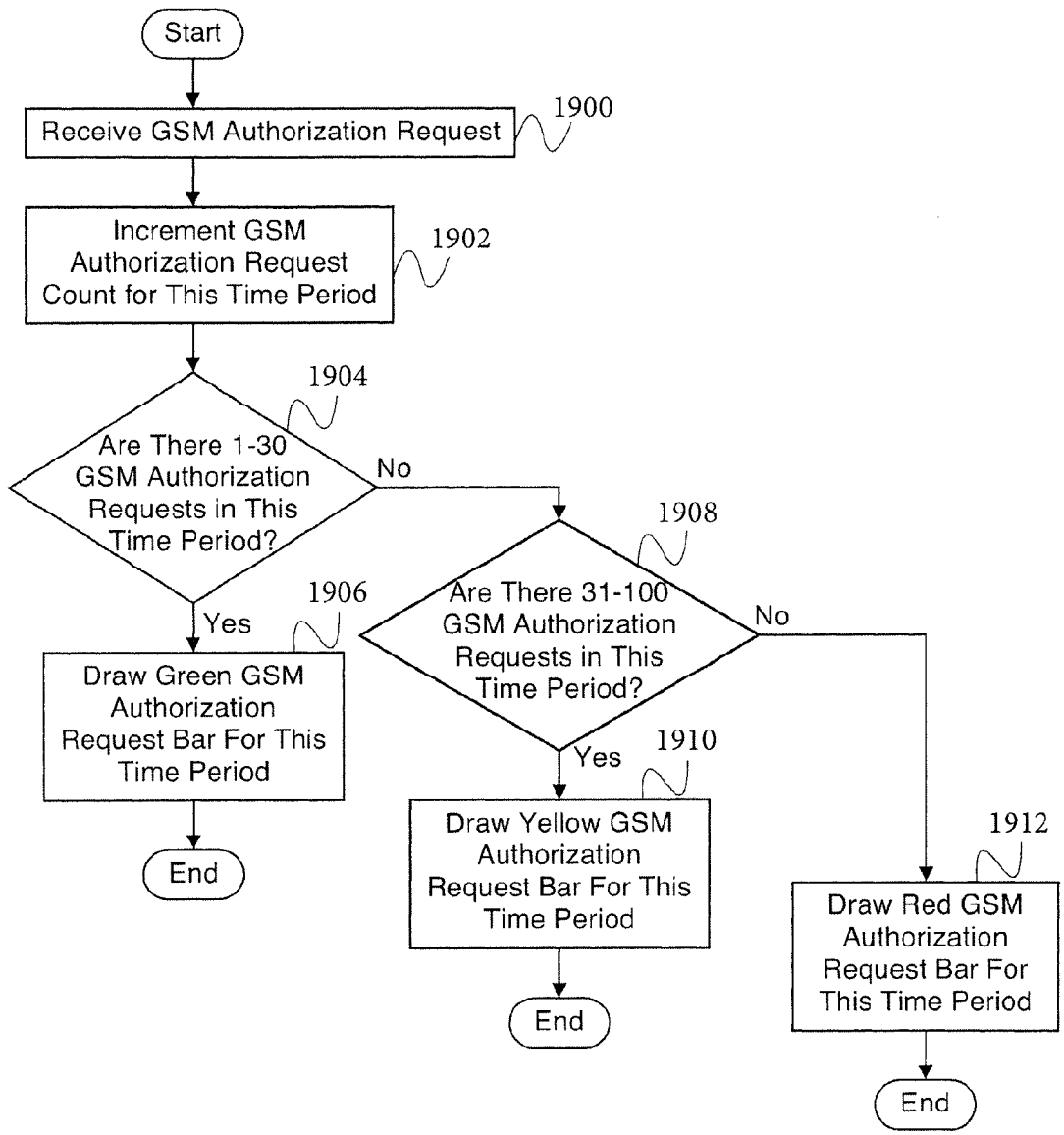
FIG. 19 is a flow diagram illustrating an embodiment of a process for updating a network status display in response to a GSM Authorization request.

FIG. 19 is a flow diagram illustrating an embodiment of a process for updating a network status display in response to a GSM Authorization request. In some embodiments, the network status display is network status display 1500 of FIG. 15A. In the example shown, in 1900, a GSM Authorization request is received. In 1902, the GSM Authorization request count is incremented for this time period. In 1904, the GSM Authorization request count is checked to see if there are between 1 and 30 GSM Authorization requests in this time period. If there are between 1 and 30 GSM Authorization requests in this time period, control passes to 1906. In 1906, a green GSM Authorization request bar (e.g., GSM Authorization request bar 1566 of FIG. 15A) is drawn for this time period in the GSM Authorization Requests data row (e.g., GSM Authorization Requests data row 1542 of FIG. 15A), and the process ends. If there are not between 1-30 GSM Authorization requests in this time period, control passes to 1908. In 1908, the GSM Authorization request count is checked to see if there are between 31 and 100 GSM Authorization requests in this time period. If there are between 31 and 100 GSM Authorization requests in this time period, control passes to 1910. In 1910, a yellow GSM Authorization request bar is drawn for this time period in the GSM Authorization Requests data row, and the process ends. If there are not between 31-100 GSM Authorization requests in this time period, control passes to 1912. In 1912, there must be more than 100 GSM Authorization requests in this time period. A red GSM Authorization request bar is drawn for this time period in the GSM Authorization Requests data row, and the process ends.

Figure 20A:
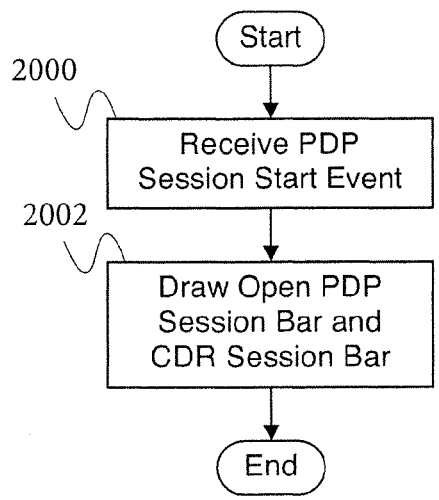
FIG. 20A is a flow diagram illustrating an embodiment of a process for updating a network status display in response to a PDP session start event.

FIG. 20A is a flow diagram illustrating an embodiment of a process for updating a network status display in response to a PDP session start event. In some embodiments, the network status display is network status display 1500 of FIG. 15A. In the example shown, in 2000, a PDP session start event is received. In 2002, an open PDP session bar and CDR session bar (e.g., open PDP session bar 1571 of FIG. 15A) are drawn in the PDP sessions data row (e.g., PDP sessions data row 1544 of FIG. 15A), and the process ends.

Figure 20B:
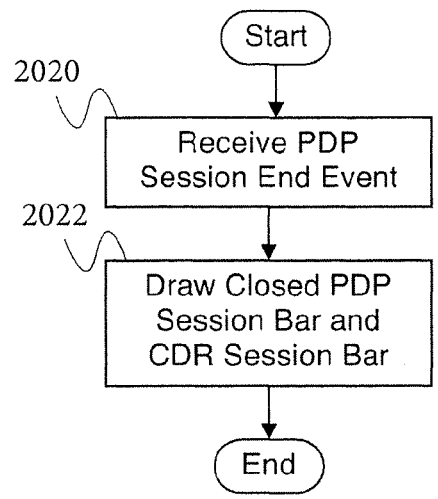
FIG. 20B is a flow diagram illustrating an embodiment of a process for updating a network status display in response to a PDP session end event.

FIG. 20B is a flow diagram illustrating an embodiment of a process for updating a network status display in response to a PDP session end event. In some embodiments, the network status display is network status display 1500 of FIG. 15A. In the example shown, in 2020, a PDP session end event is received. In 2022, a closed PDP session bar and CDR session bar (e.g., PDP session bar 1568 of FIG. 15A) are drawn in the PDP sessions data row (e.g., PDP sessions data row 1544 of FIG. 15A), and the process ends.

Figure 20C:
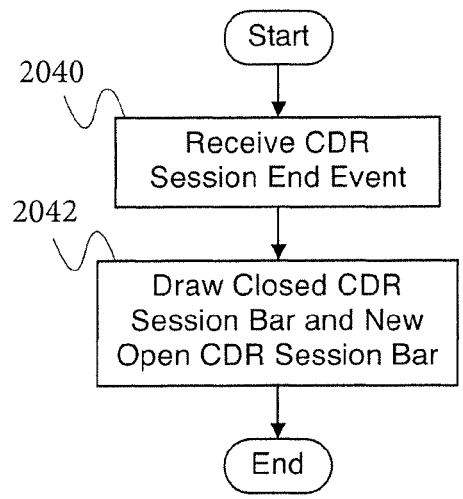
FIG. 20C is a flow diagram illustrating an embodiment of a process for updating a network status display in response to a CRD session end event.

FIG. 20C is a flow diagram illustrating an embodiment of a process for updating a network status display in response to a CRD session end event. In some embodiments, the network status display is network status display 1500 of FIG. 15A. In the example shown, in 2040, a CDR session end event is received. In 2042, a closed CDR session bar (e.g., closed CDR session bar 1569 of FIG. 15A) and a new open CDR session bar (e.g., open CDR session bar 1573 of FIG. 15A) are drawn in the PDP sessions data row (e.g., PDP sessions data row 1544 of FIG. 15A), and the process ends.

Figure 21A:
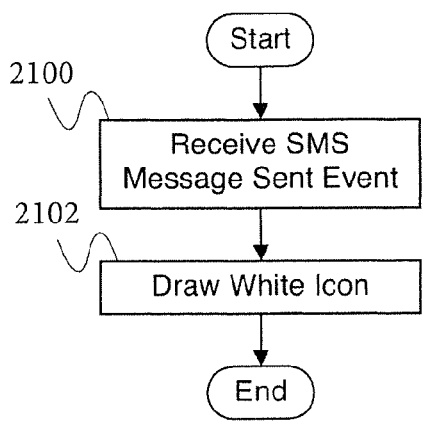
FIG. 21A is a flow diagram illustrating an embodiment of a process for updating a network status display in response to a SMS message received event.

FIG. 21A is a flow diagram illustrating an embodiment of a process for updating a network status display in response to a SMS message received event. In some embodiments, the network status display is network status display 1500 of FIG. 15A. In the example shown, in 2100, a SMS message sent event is received. In 2102, a white icon (e.g., icon 1570 of FIG. 15A) is drawn in the SMS Messages received data row (e.g., SMS Messages received data row 1546 of FIG. 15A), and the process ends.

Figure 21B:
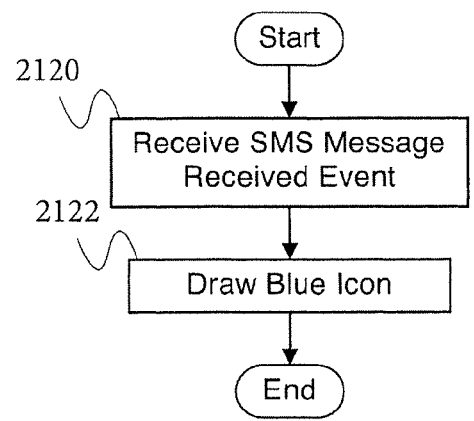
FIG. 21B is a flow diagram illustrating an embodiment of a process for updating a network status display in response to a SMS message sent event.

FIG. 21B is a flow diagram illustrating an embodiment of a process for updating a network status display in response to a SMS message sent event. In some embodiments, the network status display is network status display 1500 of FIG. 15A. In the example shown, in 2120, a SMS message received event is received. In 2122, a blue icon (e.g., icon 1572 of FIG. 15A) is drawn in the SMS Messages received data row (e.g., SMS Messages received data row 1546 of FIG. 15A), and the process ends.

Figure 22:
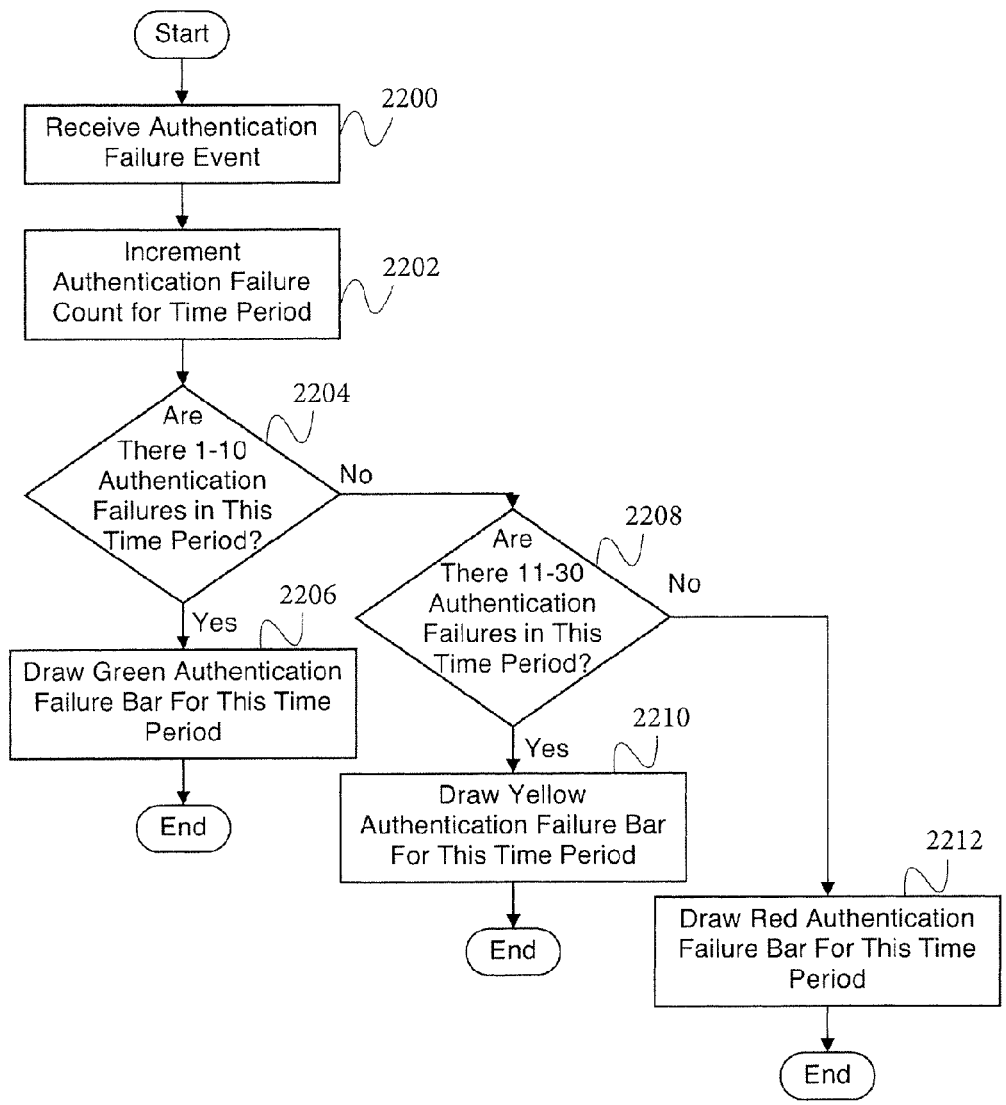
FIG. 22 is a flow diagram illustrating an embodiment of a process for updating a network status display in response to an authentication failure event.

FIG. 22 is a flow diagram illustrating an embodiment of a process for updating a network status display in response to an authentication failure event. In some embodiments, the network status display is network status display 1500 of FIG. 15A. In the example shown, in 2200, an authentication failure event is received. In 2202, the authentication failure count is incremented for this time period. In 2204, the authentication failure count is checked to see if there are between 1 and 10 authentication failures in this time period. If there are between 1 and 10 authentication failures in this time period, control passes to 2206. In 2206, a green authentication failure bar (e.g., authentication failure bar 1574 of FIG. 15A) is drawn for this time period in the Authentication Failures data row (e.g., Authentication Failures data row 1548 of FIG. 15), and the process ends. If there are not between 1-10 authentication failures in this time period, control passes to 1208. In 1208, the authentication failures count is checked to see if there are between 11 and 30 authentication failures in this time period. If there are between 11 and 30 authentication failures in this time period, control passes to 2210. In 2210, a yellow authentication failure bar is drawn for this time period in the Authentication Failures data row, and the process ends. If there are not between 11-30 authentication failures in this time period, control passes to 2212. In 2212, there must be more than 30 authentication failures in this time period. A red authentication failures bar is drawn for this time period in the Authentication Failures data row, and the process ends.

Figure 23:
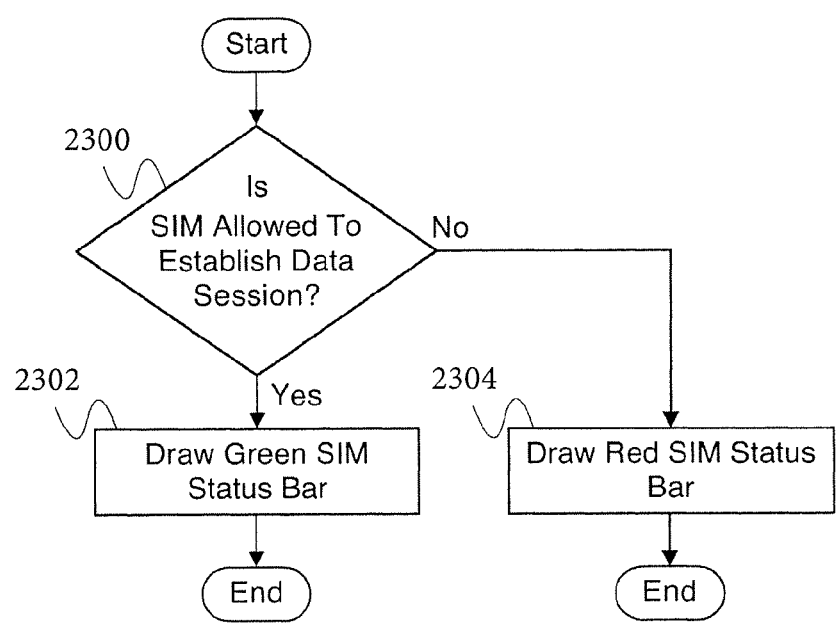
FIG. 23 is a flow diagram illustrating an embodiment of a process for updating a network status display with the current SIM status.

FIG. 23 is a flow diagram illustrating an embodiment of a process for updating a network status display with the current SIM status. In some embodiments, the network status display is network status display 1500 of FIG. 15A. In the example shown, in 2300, the SIM status is checked to determine if the SIM is allowed to establish a data session. If the SIM is allowed to establish a data session, control passes to 1302. In 2302, a green SIM status bar (e.g., SIM status bar 1576 of FIG. 15A) is drawn in the SIM Status data row (e.g., SIM Status data row 1550 of FIG. 15A), and the process ends. In 2300, if the SIM is determined to not be allowed to establish a data session, control passes to 2304. In 2304, a red SIM status bar is drawn in the SIM Status data row, and the process ends.

Figure 24:
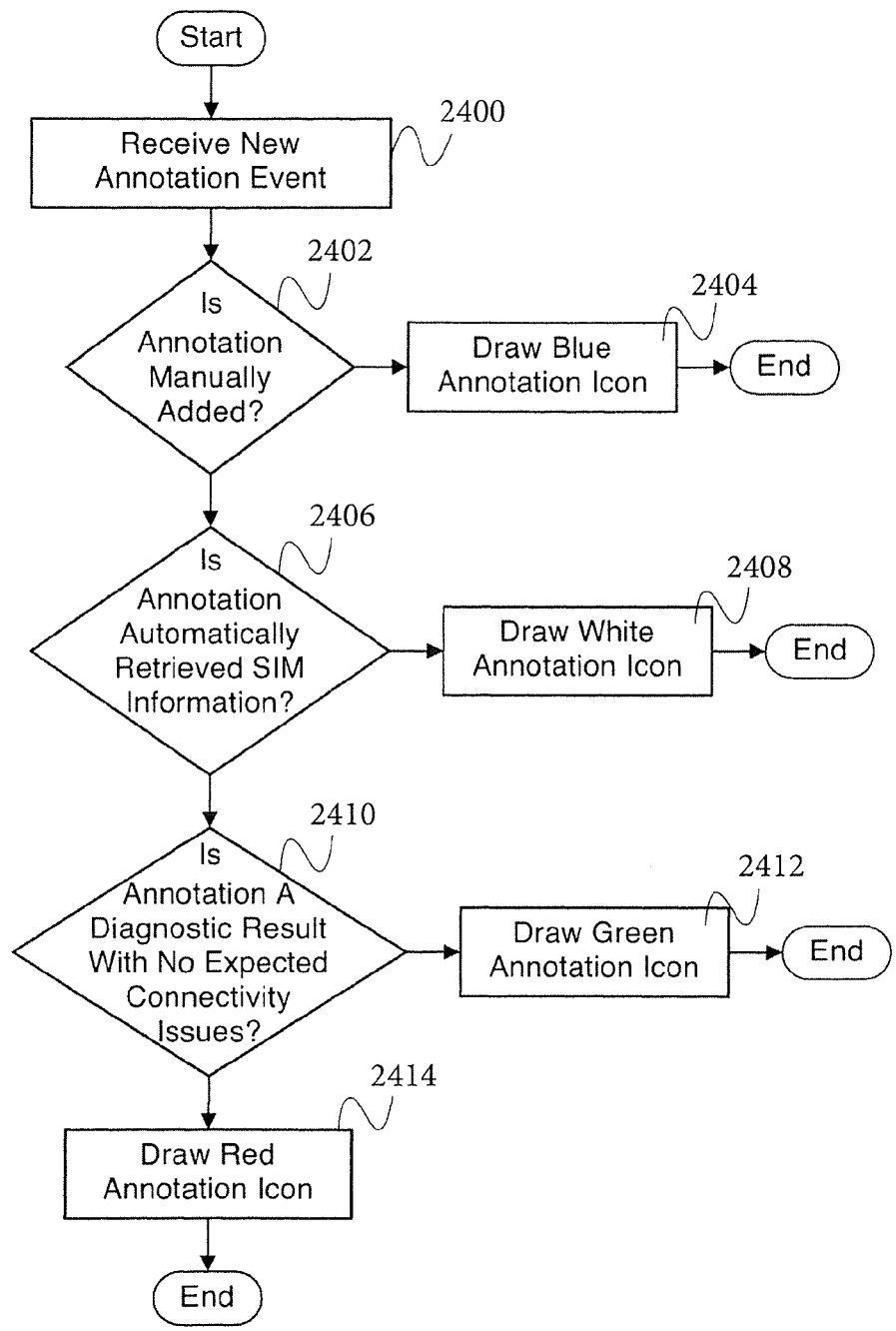
FIG. 24 is a flow diagram illustrating an embodiment of a process for updating a network status display in response to an annotation event.

FIG. 24 is a flow diagram illustrating an embodiment of a process for updating a network status display in response to an annotation event. In some embodiments, the network status display is network status display 1500 of FIG. 15A. In the example shown, in 2400, a new annotation event is received. In 2402, the annotation is checked to see if it is manually added. If the annotation was determined to be manually added, control passes to 2404. In 2404, a blue annotation icon (e.g., annotation icon 1584 of FIG. 15A) is drawn in the Annotations data row (e.g., Annotations data row 1552 of FIG. 15), and the process ends. If the annotation was not determined to be manually added in 2402, control passes to 2406. In 2406, the annotation is checked to see if it is automatically retrieved SIM information. If the annotation is determined to be automatically retrieved SIM information, control passes to 2408. In 2408, a white annotation icon (e.g., annotation icon 1578 of FIG. 15A) is drawn in the Annotations data row, and the process ends. If the annotation is not determined to be automatically retrieved SIM information in 2406, control passes to 2410. In 2410, the annotation is checked to see if it is a diagnostic result with no expected connectivity issues. If the annotation is determined to be a diagnostic result with no expected connectivity issues, control passes to 2412. In 2412, a green annotation icon (e.g., annotation icon 1580 of FIG. 15A) is drawn in the Annotations data row, and the process ends. If the annotation is not determined to be a diagnostic result with no expected connectivity issues, control passes to 2414. The annotation is then determined to be a diagnostic result with expected connectivity issues. In 2414, a red annotation icon (e.g., annotation 1582 of FIG. 15A) is drawn in the Annotations data row, and the process ends.

Figure 25:
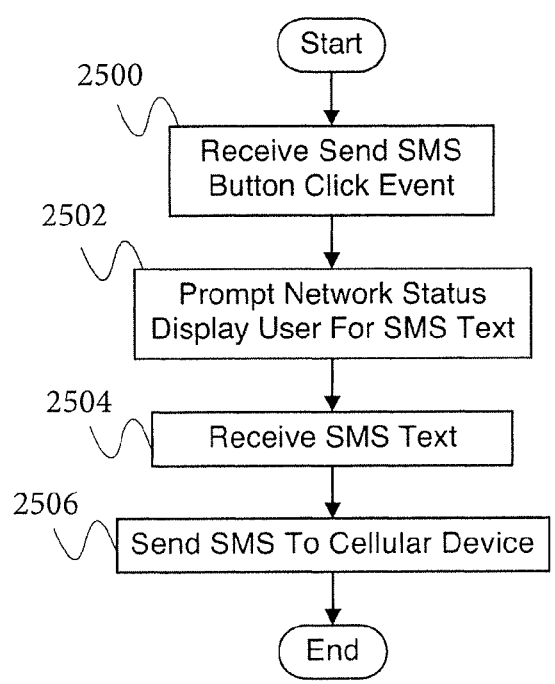
FIG. 25 is a flow diagram illustrating an embodiment of a process for a network status display to respond to a send SMS button click event.

FIG. 25 is a flow diagram illustrating an embodiment of a process for a network status display to respond to a send SMS button click event. In some embodiments, the network status display is network status display 1500 of FIG. 15A. In some embodiments, the send SMS button is send SMS button 504 of FIG. 15A. In the example shown, in 2500, a send SMS button click event is received. In 2502, the network status display user is prompted for the SMS text. In 2504, the SMS text is received. In 2506, an SMS is sent to the cellular device associated with the network status display (e.g., cellular device 100 of FIG. 1) containing the received text, and the process ends.

Figure 26:
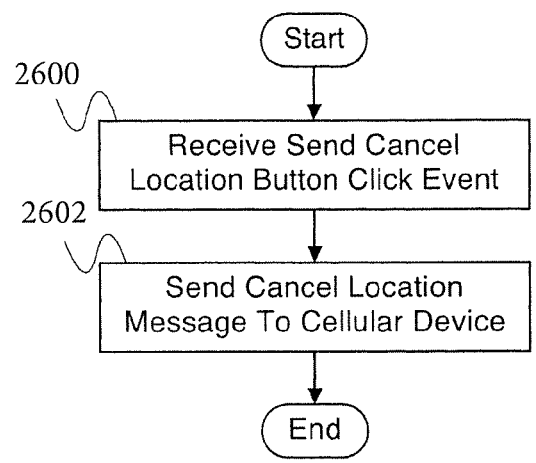
FIG. 26 is a flow diagram illustrating an embodiment of a process for a network status display to respond to a send cancel location button click event.

FIG. 26 is a flow diagram illustrating an embodiment of a process for a network status display to respond to a send cancel location button click event. In some embodiments, the network status display is network status display 1500 of FIG. 15A. In some embodiments, the send cancel location button is send cancel location button 1506 of FIG. 15A. In the example shown, in 2600, a send cancel location button click event is received. In 2602, a cancel location message is sent to the cellular device associated with the network status display (e.g., cellular device 100 of FIG. 11), and the process ends.

Figure 27:
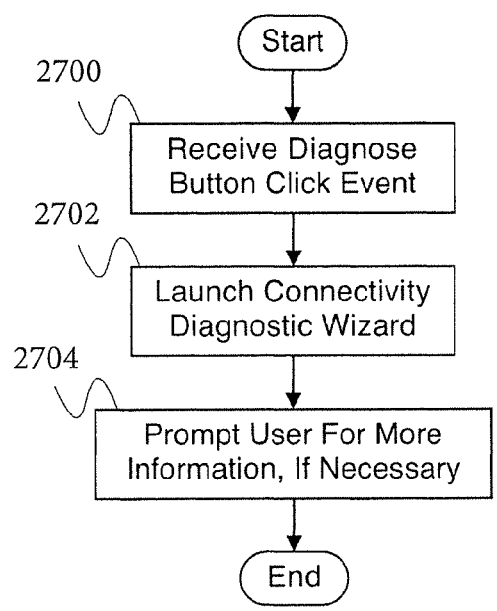
FIG. 27 is a flow diagram illustrating an embodiment of a process for a network status display to respond to a diagnose button click event.

FIG. 27 is a flow diagram illustrating an embodiment of a process for a network status display to respond to a diagnose button click event. In some embodiments, the network status display is network status display 1500 of FIG. 15A. In some embodiments, the diagnose button is diagnose button 1508 of FIG. 15A. In the example shown, in 2700, a diagnose button click event is received. In 2702, a connectivity diagnostic wizard is launched by the network status display. In some embodiments, the connectivity diagnostic wizard contains automated logic for assessing the ability to connect of the cellular device associated with the network status display (e.g., cellular device 100 of FIG. 11). In 2704, the user is prompted for more information, if necessary, and the process ends.

Figure 28:
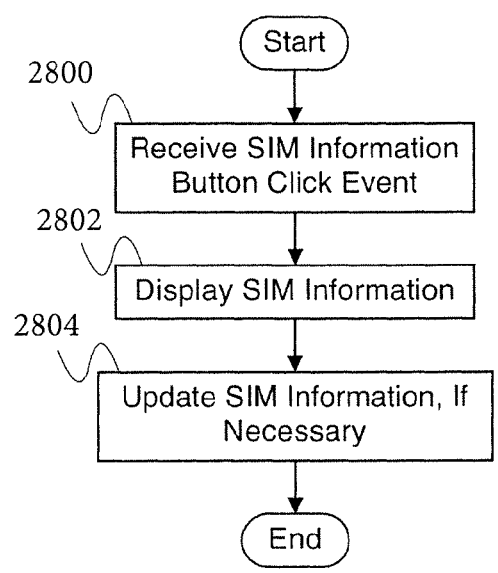
FIG. 28 is a flow diagram illustrating an embodiment of a process for a network status display to respond to a SIM information button click event.

FIG. 28 is a flow diagram illustrating an embodiment of a process for a network status display to respond to a SIM information button click event. In some embodiments, the network status display is network status display 1500 of FIG. 15A. In some embodiments, the SIM information button is SIM information button 1510 of FIG. 15A. In the example shown, in 2800, a SIM information button click event is received. In 2802, SIM information is displayed. In some embodiments, SIM information comprises values for a forbidden public land mobile network (FPLMN), location information for general packet radio service (LOCIGPRS), location information (LOCI), and a public land mobile network selector (PLMNsel). The network status display user may then request the SIM information to be updated. In 1804, the SIM information is updated, if necessary, and the process ends.

Figure 29:
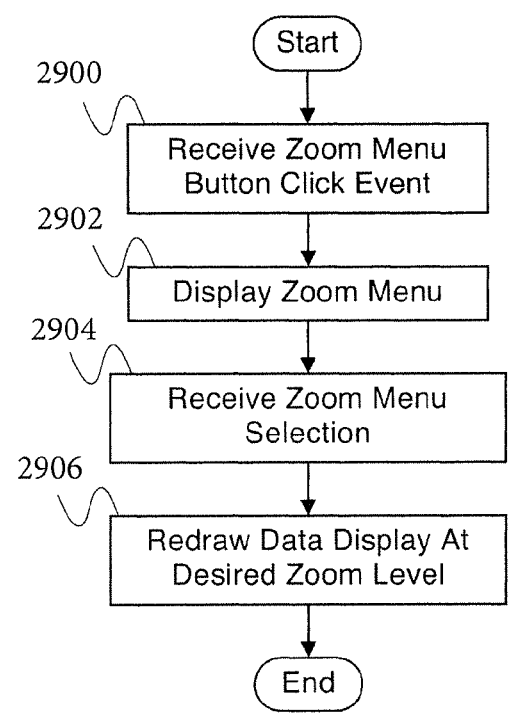
FIG. 29 is a flow diagram illustrating an embodiment of a process for a network status display to respond to a zoom menu button click event.

FIG. 29 is a flow diagram illustrating an embodiment of a process for a network status display to respond to a zoom menu button click event. In some embodiments, the network status display is network status display 1500 of FIG. 15A. In some embodiments, the zoom menu button is zoom menu button 1514 of FIG. 15A. In the example shown, in 2900, a zoom menu button click event is received. In 2902, the zoom menu is displayed. The zoom menu comprises one or more possible zoom levels at which the data in the network status display can be displayed. In some embodiments, the possible zoom levels comprise 30 days, 14 days, 7 days, 3 days, 1 day, 12 hours, 4 hours, 30 minutes, and 5 minutes. In 2904, a zoom menu selection is received. In 2906, the data display is redrawn at the desired zoom level, and the process ends.

Figure 30:
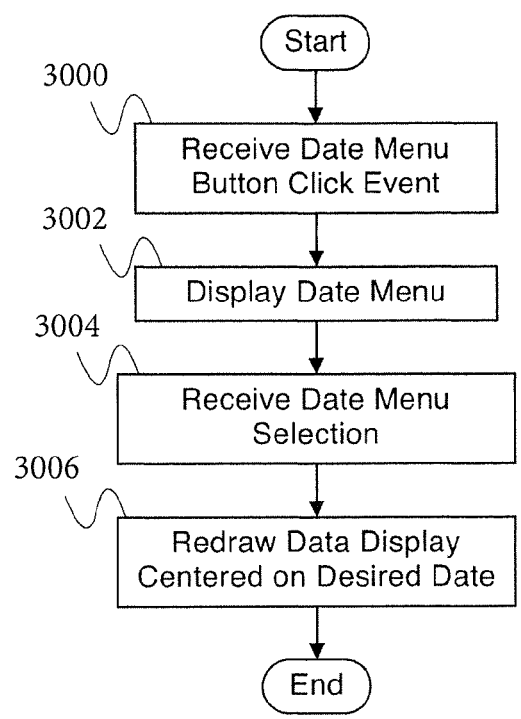
FIG. 30 is a flow diagram illustrating an embodiment of a process for a network status display to respond to a date menu button click event.

FIG. 30 is a flow diagram illustrating an embodiment of a process for a network status display to respond to a date menu button click event. In some embodiments, the network status display is network status display 1500 of FIG. 15A. In some embodiments, the date menu button is date menu button 1518 of FIG. 15A. In the example shown, in 3000, a date menu button click event is received. In 3002, the date menu is displayed. The date menu comprises one or more possible dates around which the data in the network status display can be centered. In 3004, a date menu selection is received. In 3006, the data display is redrawn centered on the desired date, and the process ends.

Figure 31:
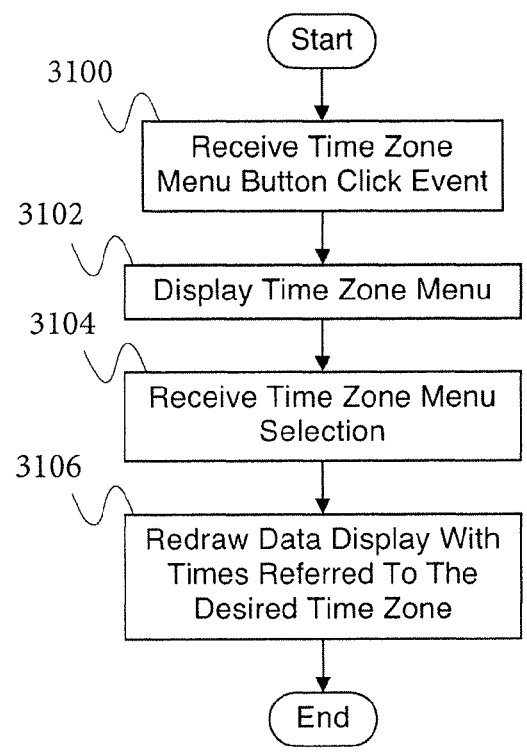
FIG. 31 is a flow diagram illustrating an embodiment of a process for a network status display to respond to a time zone menu button click event.

FIG. 31 is a flow diagram illustrating an embodiment of a process for a network status display to respond to a time zone menu button click event. In some embodiments, the network status display is network status display 1500 of FIG. 15A. In some embodiments, the time zone menu button is time zone menu button 1522 of FIG. 15A. In the example shown, in 3100, a time zone menu button click event is received. In 3102, the time zone menu is displayed. The zoom menu comprises one or more possible time zones to which the times in the network status display can be referred. In 3104, a time zone menu selection is received. In 3106, the data display is redrawn with times referred to the desired time zone, and the process ends.

Figure 32:
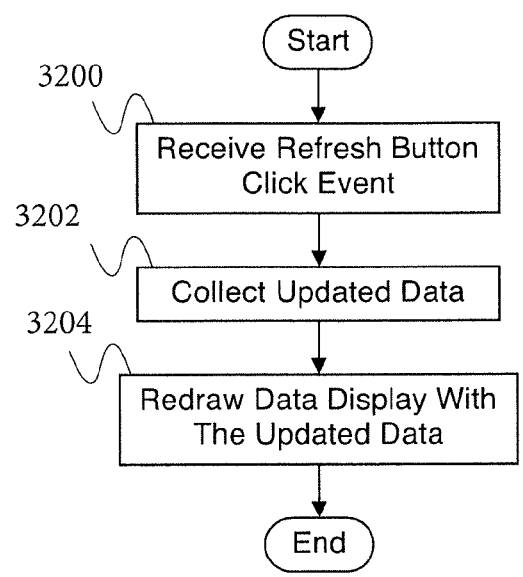
FIG. 32 is a flow diagram illustrating an embodiment of a process for a network status display to respond to a refresh button click event.

FIG. 32 is a flow diagram illustrating an embodiment of a process for a network status display to respond to a refresh button click event. In some embodiments, the network status display is network status display 1500 of FIG. 15A. In some embodiments, the refresh button is refresh button 1524 of FIG. 15A. In the example shown, in 3200, a refresh button click event is received. In 3202, updated data is collected. In various embodiments, updated data is collected from the cellular device associated with the network status display. (e.g., cellular device 100 of FIG. 11), from the wireless cellular network (e.g., wireless cellular network 1101 of FIG. 11), or from any other appropriate device. In 3204, the data display is redrawn with the updated data, and the process ends.

Figure 33:
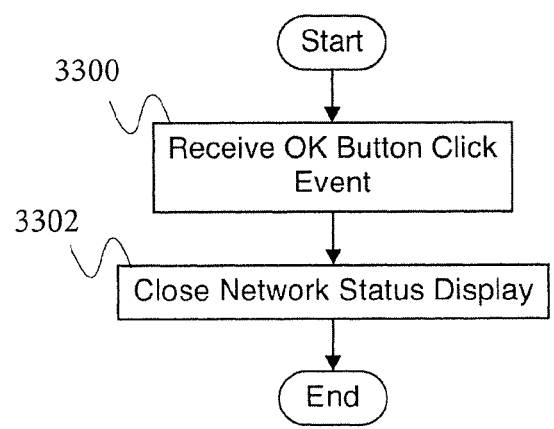
FIG. 33 is a flow diagram illustrating an embodiment of a process for a network status display to respond to an OK button click event.

FIG. 33 is a flow diagram illustrating an embodiment of a process for a network status display to respond to an OK button click event. In some embodiments, the network status display is network status display 1500 of FIG. 15A. In some embodiments, the OK button is OK button 1556 of FIG. 15A. In the example shown, in 3300, an OK button click event is received. In 3302, the network status display is closed, and the process ends.

Figure 34:
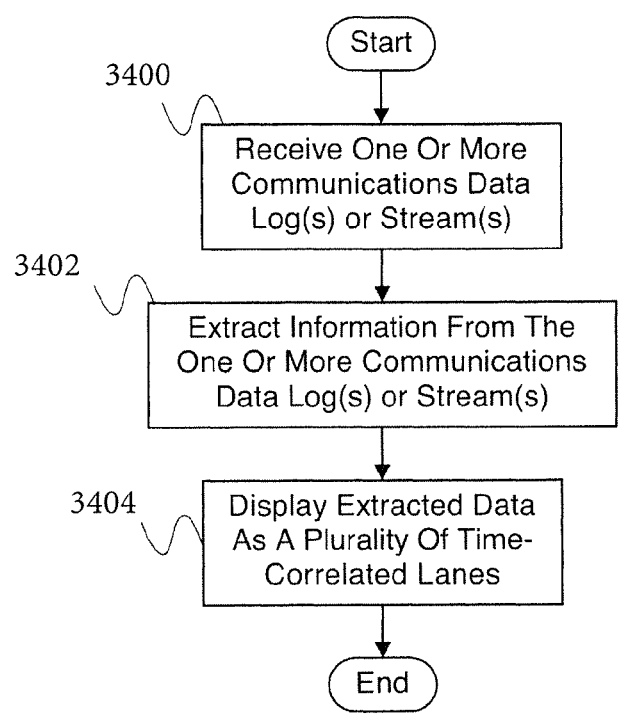
FIG. 34 is a flow diagram illustrating an embodiment of a process for a system for diagnosing wireless communication systems.

FIG. 34 is a flow diagram illustrating an embodiment of a process for a system for diagnosing wireless communication systems. In some embodiments, the process of FIG. 34 is implemented using diagnostic software 1408 of FIG. 14 and executed using processor 1406 of FIG. 14. In some embodiments, a mobile diagnostic device implements the process of FIG. 34 using software (e.g., 1308 of FIG. 13) and executes the process using a processor (e.g., 1306 of FIG. 13). In the example shown, in 3400 one or more communication data log(s) or stream(s) are received. In some embodiments, communication data log(s) or streams(s) come from a plurality of communication systems. In various embodiments, a plurality of communication systems comprises one or more of an HLR system, a radius system, an SMSC system, a SIM system, an MSC system, an SGSN system, a GSM Authorization request system, an authentication failure system, a data session system, a PDP system, or an SMS system. In various embodiments, communication data log(s) or stream(s) comprise HLR log(s) or stream(s), radius accounting log(s) or stream(s), short message service center (SMSC) log(s) or stream(s), SIM audit trail log(s) or stream(s), or any other appropriate log(s) or stream(s). In various embodiments, data extracted from HLR log(s) or stream(s) comprises MSC location history, SGSN location history, GSM Authorization request history, authentication failure history, or any other appropriate data. In various embodiments, data extracted from radius accounting log(s) or stream(s) comprises data session history (e.g., PDP contexts), or any other appropriate data. In various embodiments, data extracted from SMSC log(s) or stream(s) comprises SMS message history, or any other appropriate data. In various embodiments, data extracted from SIM audit trail log(s) or stream(s) comprises SIM status history, or any other appropriate data. In some embodiments, the processor is also for combining the one or more communications data log(s) or stream(s). In some embodiments, the processor is also for correlating the one or more communications data log(s) or stream(s).

In 3402, data (e.g. information) is extracted from the one or more communication data log(s) or stream(s). In 3404, extracted data (e.g., information) is displayed as a plurality of time-correlated lanes. For example, data is displayed using swim lanes or pop ups of a diagnostic display (e.g., a display like in FIG. 15A). In various embodiments, swim lanes have information displayed as shaded or colored bars and/or shaded or colored point events, or any other appropriate display of information. In some embodiments, data (e.g., information) is displayed as plurality of time-correlated lanes in a graphical user interface. In some embodiments, displaying information as a plurality of time-correlated lanes is managed by a role-based access control protocol. In some embodiments, access control for displaying information as a plurality of time-correlated lanes is based at least in part of an organization associated with a user.

In some embodiments, the graphical user interface is also for providing a control for changing a time zone associated with the displayed information. For example, a user selects that all times associated with lanes of displayed information are displayed in local time to a wireless cellular device, in local time for a user, in Greenwich Mean Time (GMT), or any other appropriate time. In some embodiments, the graphical user interface is also for providing a control for changing a time scale associated with the displayed information. For example, the time scale is set to show information within a few hours, one hour, a day, a half day, or any other appropriate time scale. In some embodiments, providing a control for changing a time scale includes providing a control for zooming in or zooming out, and/or a control for displaying the information at multiple time-scales (e.g., some sections with longer time scales and some sections with shorter time scales—a zoomed in section). In some embodiments, the graphical user interface is also for providing a control for displaying by a desired time or a desired date. In some embodiments, the graphical user interface is also for providing a control for displaying by scrolling or panning a time window associated with the desired information. In some embodiments, a control for displaying by scrolling or panning is provided for ease of navigation. In some embodiments, a click in a window centers a display (e.g., a click on a time centers the time in the window). In some embodiments, the graphical user interface is also for providing a control for a user to add a time-based annotation (e.g., a note of explanation). In some embodiments, the graphical user interface is also for providing a control for a user to edit a time-based annotation. In some embodiments, the graphical user interface is also for providing a control for a user to share a time-based annotation. In some embodiments, the graphical user interface is also for providing a control for selecting a format for displaying the information, wherein the format comprises one or more of the following: Event format (e.g., displays icons corresponding to events, e.g. icon 1560 of FIG. 15A), Time bar format (e.g., displays time bars corresponding to events with duration, e.g. shaded area 1558 of FIG. 15A), Heat map format (e.g., displays bars colored or patterned or shaded or grey-scaled to correspond to density of events, e.g. shaded area 1566 of FIG. 15A), and Annotations (e.g., icons corresponding to human or machine created annotations, e.g. icon 1578 of FIG. 15A). In some embodiments, the format adjusts automatically depending on the data content. In various embodiments, the format adjusts automatically by switching from one format to another format (e.g., from Event format to Heat map format or from Time bar format to Event format), by automatically scaling the time axis, by automatically scaling the density of events displayed, by automatically changing the color of the bars in the Heat map format, by automatically changing the size or shape of the icons in Event format or any other display feature, or in any other appropriate way. In some embodiments, the graphical user interface is also for providing a control for displaying additional information in response to a user click or hover. In some embodiments, a user click or hover causes an interaction with a server to obtain the additional information. In some embodiments, the graphical user interface is also for providing a control for selecting one or more time correlated lanes of the plurality of time-correlated lanes to display or hide. In some embodiments, information from one of the plurality of communication systems is displayed or associated with more than one of the plurality of time-correlated lanes. In some embodiments, a user selects which of the plurality of time-correlated lanes the information is associated with. In some embodiments, a selection of which of the plurality of time-correlated lanes the information is associated with is based at least in part on distinguishing attributes of the information displayed. In some embodiments, a user selects one or more criteria for deciding which of the plurality of time-correlated lanes each of the information elements is associated with and the associating is achieved automatically based at least in part on the one or more criteria. In various embodiments, distinguishing attributes of information displayed comprise time since information update, total information received in the displayed time period, total information received in a user defined time period, access control properties of the display user, externally defined information priority, or any other appropriate attributes. In some embodiments, the graphical user interface is also for providing a control for searching for a specific pattern in one or more of the plurality of time-correlated lanes. In some embodiments, the graphical user interface is also for providing a control for filtering out a specific pattern in one or more of the plurality of time-correlated lanes. In some embodiments, the graphical user interface is also for automatically highlighting a specific pattern in one or more of the plurality of time-correlated lanes. In some embodiments, the graphical user interface is also for automatically adding an annotation to a specific pattern in one or more of the plurality of time-correlated lanes.

In some embodiments, the graphical user interface is also for providing an active control. In some embodiments, the active control comprises sends an SMS message, wherein the sent SMS message sends a text message to a SIM. In some embodiments, the active control comprises a control that when activated sends a cancel location command, wherein the cancel location command sends a cancel location command to a SIM. In some embodiments, the active control comprises a control that when activated sends a diagnose command, wherein the diagnose control assess a SIM's ability to connect to a wireless network. In various embodiments, the active control comprises a control that when activated retrieves SIM information from one or more of the following: a SIM, a SIM database, a HLR, or any other appropriate SIM information source. In various embodiments, SIM information comprises one or more of the following: last known value or last update date or time for a SGSN, a MSC, a FPLMN, A LOCIGPRS, a LOCI, or any other appropriate SIM information. In some embodiments, an active control comprises an update (e.g., an update for a value associated with a SGSN, a MSC, a FPLMN, A LOCIGPRS, a LOCI, etc.).

In some embodiments, the display also includes active controls—for example, send SMS, send cancel location, diagnose, SIM information.

Different embodiments of the invention may be implemented using different combinations of software, firmware, and/or hardware. Thus, the techniques shown in the figures can be implemented using code and data stored and executed on one or more electronic devices (e.g., computers, servers, mobile devices, etc.). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

While the invention has been described in terms of several embodiments, those skilled in the art will recognize that the invention is not limited to the embodiments described and can be practiced with modification and alteration within the spirit and scope of the appended claims. The description is thus to be regarded as illustrative instead of limiting.

What is claimed is:

1. A system comprising a control center server for managing aggressive behavior of a wireless device in a wireless network, the system comprising:
the control center server comprising:
a processor; and
a memory coupled with the processor, wherein the memory is configured to provide the processor with instructions which when executed cause the processor to perform operations to:
determine that the wireless device is an aggressive wireless device, wherein the aggressive wireless device is present when the wireless device repeatedly retries, in response to network denials, to perform a network signaling in a time frame such that a threshold for the retries is exceeded;
retrieve at least one data log from at least one network element comprising at least one of a diagnostic device, the HLR, a Mobile Switching Center (MSC), a Gateway GPRS Support Node (GGSN), a Serving GPRS Support Node (SGSN), a Short Message Service Center (SMSC), a signal transfer point (STP) node, or a Remote Authentication Dial In User Service (RADIUS) server by utilizing a wireless device identifier;
determine that the threshold for the retries is exceeded in the time frame; and
transmit a provisioning instruction to provision at least one of the HLR, the MSC, the GGSN, the SGSN, the SMSC, the STP node, or the RADIUS server for real-time throttling, re-directing or blocking of the network signaling transmitted from the wireless device.

2. The system of claim 1, wherein the wireless device identifier is an International Mobile Subscriber Identity (IMSI) or an MSISDN.

3. The system of claim 1, wherein the at least one data log comprises at least one of: multiple GSM authorization requests, multiple MSC location updates, multiple SGSN location updates, multiple RADIUS logs, multiple SMS messages, multiple packet data protocol (PDP) sessions/reject messages, and multiple GPRS attach/reject messages.

4. The system of claim 1, wherein the control center server identifies the network signaling as aggressive behavior signals when the wireless device generates more than a threshold number of authentication failures per time unit.

5. The system of claim 1, wherein the control center server identifies the network signaling as aggressive behavior signals when the wireless device sends more than a threshold number of authentication requests in a time period towards a HLR.

6. The system of claim 1, wherein the control center server identifies the network signaling as aggressive behavior signals when the wireless device generates more than a threshold number of Packet Data GGSN Call Data Records (G-CDR) in a time period.

7. A method performed by a control center server for managing aggressive behavior of a wireless device in a wireless network, the method comprising:
   determining that the wireless device is an aggressive wireless device, wherein the aggressive wireless device is present when the wireless device repeatedly retries, responsive to network denials or rejections, to perform a network signaling in a time frame such that a threshold for the retries is exceeded;
   retrieving at least one data log from at least one network element comprising at least one of a diagnostic device, the HLR, a Mobile Switching Center (MSC), a Gateway GPRS Support Node (GGSN), a Serving GPRS Support Node (SGSN), a Short Message Service Center (SMSC), a signal transfer point (STP) node, or a Remote Authentication Dial In User Service (RADIUS) server by utilizing a wireless device identifier;
   determining that the threshold for the retries is exceeded in the time frame; and
   transmitting a provisioning instruction to provision at least one of the HLR, the MSC, the GGSN, the SGSN, the SMSC, the STP node, or the RADIUS server for real-time throttling, re-directing or blocking of the network signaling transmitted from the wireless device.

8. The method of claim 7, wherein the wireless device identifier is an International Mobile Subscriber Identity (IMSI) or an MSISDN.

9. The method of claim 7, wherein the at least one data log comprises at least one of: multiple GSM authorization requests, multiple MSC location updates, multiple SGSN location updates, multiple RADIUS logs, multiple SMS messages, multiple packet data protocol (PDP) sessions/reject messages, and multiple GPRS attach/reject messages.

10. The method of claim 7, wherein the control center server identifies the network signaling as aggressive behavior signals when the wireless device generates more than a threshold number of authentication failures per time unit.

11. The method of claim 7, wherein the control center server identifies the network signaling as aggressive behavior signals when the wireless device sends more than a threshold number of authentication requests in a time period towards a HLR.

12. A system apparatus for use in managing aggressive behavior of a wireless device in a wireless network, the system apparatus comprising:
   a control center server comprising:
      a processor; and
      a memory coupled with the processor, wherein the memory is configured to provide the processor with instructions which when executed cause the processor to perform operations to:
         determine that the wireless device is an aggressive wireless device, wherein the aggressive wireless device is present when the wireless device repeatedly retries to register with, authenticate with, or access the network or service in a time frame such that a threshold for the retries is exceeded;
         retrieve at least one data log from at least one network element comprising at least one of a diagnostic device, the HLR, a Mobile Switching Center (MSC), a Gateway GPRS Support Node (GGSN), a Serving GPRS Support Node (SGSN), a Short Message Service Center (SMSC), a signal transfer point (STP) node, or a Remote Authentication Dial In User Service (RADIUS) server by utilizing a wireless device identifier;
         determine that the threshold for the retries is exceeded in the time frame; and
         transmit a provisioning instruction to provision at least one of the HLR, the MSC, the GGSN, the SGSN, the SMSC, the STP node, or the RADIUS server for real-time throttling, re-directing or blocking of the network signaling transmitted from the wireless device.

* * * * *

UNITED STATES PATENT AND TRADEMARK OFFICE
CERTIFICATE OF CORRECTION

PATENT NO. : 9,756,014 B2
APPLICATION NO. : 14/881641
DATED : September 5, 2017
INVENTOR(S) : Daniel Collins et al.

Page 1 of 1

It is certified that error appears in the above-identified patent and that said Letters Patent is hereby corrected as shown below:

In the Specification

In Column 24, Line 39, should read:
MC55i, a Telit GE-865, a Sierra Q2426, etc. However, the Signed and Sealed this
Twelfth Day of January, 2021

Andrei Iancu
*Director of the United States Patent and Trademark Office*